US012812153B2

(12) United States Patent
Jhu et al.

(10) Patent No.: US 12,812,153 B2
(45) Date of Patent: Nov. 24, 2026

(54) CROSS-COMPONENT PREDICTION FOR VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Che-Wei Kuo, San Diego, CA (US); Xiaoyu Xiu, San Diego, CA (US); Ning Yan, San Diego, CA (US); Wei Chen, San Diego, CA (US); Xianglin Wang, San Diego, CA (US); Bing Yu, San Diego, CA (US)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 18/946,757

(22) Filed: Nov. 13, 2024

(65) Prior Publication Data

US 2025/0080764 A1 Mar. 6, 2025

Related U.S. Application Data

(63) Continuation of application No. PCT/US2023/022412, filed on May 16, 2023.

(Continued)

(51) Int. Cl.

*H04N 19/44* (2014.01)
*H04N 19/132* (2014.01)

(Continued)

(52) U.S. Cl.

CPC ........... *H04N 19/44* (2014.11); *H04N 19/132* (2014.11); *H04N 19/176* (2014.11); *H04N 19/186* (2014.11)

(58) Field of Classification Search

CPC .... H04N 19/44; H04N 19/132; H04N 19/176; H04N 19/186; H04N 19/105; H04N 19/82

(Continued)

(56) References Cited

U.S. PATENT DOCUMENTS

| | | | | |
|---|---|---|---|---|
| 2021/0136409 | A1 | 5/2021 | Ma et al. | |
| 2021/0314575 | A1 * | 10/2021 | Li | H04N 19/593 |

(Continued)

FOREIGN PATENT DOCUMENTS

| | | | |
|---|---|---|---|
| WO | 2020192642 | A1 | 10/2020 |
| WO | 2021207026 | A1 | 10/2021 |

OTHER PUBLICATIONS

Chen et al., "CE3-related: Simplification of LM Mode", Joint Video Experts Team (JVET) of ITU-T SG 16 WP 3 and 1 ISO/IEC JTC 1/SC 29/WG 11, 13th Meeting: Marrakech, MA, Jan. 9-18, 2019, 4 pages.

(Continued)

*Primary Examiner* — Marnie A Matt

(74) *Attorney, Agent, or Firm* — Seed IP Law Group LLP

(57) ABSTRACT

A method for video decoding is provided. The method includes obtaining, from a video bitstream, a coding unit in a current picture, wherein the coding unit comprises a luma block and at least one chroma block; and in response to a determination that reconstructed luma samples in the luma block are not to be down-sampled: determining one or more cross-component prediction models based on a luma filter, wherein the one or more cross-component prediction models comprise a convolutional cross-component model (CCCM); obtaining, based on the luma filter, at least one reconstructed luma sample in the luma block that corresponds to a chroma sample in the at least one chroma block; and applying at least one of the one or more cross-component prediction (Continued)

models to the at least one reconstructed luma sample to predict the chroma sample.

20 Claims, 27 Drawing Sheets

Related U.S. Application Data

(60) Provisional application No. 63/342,575, filed on May 16, 2022.

(51) Int. Cl.
*H04N 19/176* (2014.01)
*H04N 19/186* (2014.01)

(58) Field of Classification Search
USPC .................................................... 375/240.25
See application file for complete search history.

(56) References Cited

U.S. PATENT DOCUMENTS

| | | | | |
|---|---|---|---|---|
| 2021/0400260 | A1* | 12/2021 | Zhang | H04N 19/159 |
| 2022/0150538 | A1 | 5/2022 | Choi et al. | |
| 2022/0279187 | A1* | 9/2022 | Sim | H04N 19/157 |
| 2022/0337847 | A1* | 10/2022 | Chen | H04N 19/167 |
| 2025/0267285 | A1* | 8/2025 | Choi | H04N 19/196 |
| 2025/0267303 | A1* | 8/2025 | Ma | H04N 19/132 |

OTHER PUBLICATIONS

Che-Wei Kuo et al., “AHG12: Enhanced CCLM,” JVET-Z0140-v2, Joint Video Experts Team (JVET) of ITU-T SG 16 WP 3 and ISO/IEC JTC 1/SC 29, 26th Meeting, by teleconference, pp. 1-5, Apr. 27, 2022.
Vadim Seregin et al., “Exploration Experiment on Enhanced Compression Beyond VVC Capability (EE2),” JVET-Z2024-v1, Joint Video Experts Team (JVET) of ITU-T SG 16 WP 3 and ISO/IEC JTC 1/SC 29, 26th Meeting, by teleconference, pp. 1-11, Apr. 29, 2022.

* cited by examiner

CROSS-COMPONENT PREDICTION FOR VIDEO CODING

CROSS-REFERENCE TO RELATED APPLICATION

This application is a continuation application of International Application No. PCT/US2023/022412, filed on May 16, 2023, which is based upon and claims priority to Provisional Application No. 63/342,575, filed on May 16, 2022, both disclosures of which are incorporated herein by reference in their entireties for all purposes.

TECHNICAL FIELD

This application is related to image/video coding and compression. More specifically, this application relates to method and apparatus on improving the coding efficiency of the image/video blocks.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Embodiments of the present disclosure provide methods and apparatus for video coding.

According to a first aspect of the present disclosure, a method for video decoding is provided. The method includes obtaining, from a video bitstream, a coding unit in a current picture, where the coding unit includes a luma block and at least one chroma block; and in response to a determination that reconstructed luma samples in the luma block are not to be down-sampled: determining one or more cross-component prediction models based on a luma filter, wherein the one or more cross-component prediction models comprise a convolutional cross-component model (CCCM); obtaining, based on the luma filter, at least one reconstructed luma sample in the luma block that corresponds to a chroma sample in the at least one chroma block; and applying at least one of the one or more cross-component prediction models to the at least one reconstructed luma sample, to predict the chroma sample.

According to a second aspect of the present disclosure, a method for video encoding is provided. The method includes partitioning a video frame into multiple coding units, wherein a coding unit of the multiple coding units comprises a luma block and at least one chroma block; and in response to a determination that reconstructed luma samples in the luma block are not to be down-sampled: determining one or more cross-component prediction models based on a luma filter, wherein the one or more cross-component prediction models comprise a convolutional cross-component model (CCCM); obtaining, based on the luma filter, at least one reconstructed luma sample in the luma block that corresponds to a chroma sample in the at least one chroma block; and applying at least one of the one or more cross-component prediction models to the at least one reconstructed luma sample to predict the chroma sample.

According to a third aspect of the present disclosure, an electronic apparatus is provided. The electronic apparatus includes one or more processors; memory coupled to the one or more processors; and a plurality of programs stored in the memory that, when executed by the one or more processors, cause the electronic apparatus to receive a video bitstream to perform the method according to the embodiments of the present application or cause the electronic apparatus to perform the method according to the embodiments of the present application to generate a video bitstream.

According to a fourth aspect of the present disclosure, a non-transitory computer readable storage medium is provided. The non-transitory computer readable storage medium stores a plurality of programs for execution by an electronic apparatus having one or more processors, wherein the plurality of programs, when executed by the one or more processors, cause the electronic apparatus to perform the method according to the embodiments of the present application to process a video bitstream and store the processed video bitstream in the non-transitory computer readable storage medium, or cause the electronic apparatus to perform the method according to the embodiments of the present application to generate a video bitstream and store the generated video bitstream in the non-transitory computer readable storage medium.

According to a fifth aspect of the present disclosure, a computer program product is provided. The computer program product includes instructions that, when executed by one or more processors of an electronic apparatus, cause the electronic apparatus to receive a video bitstream to perform the method according to the embodiments of the present application or cause the electronic apparatus to perform the method according to the embodiments of the present application to generate a video bitstream.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
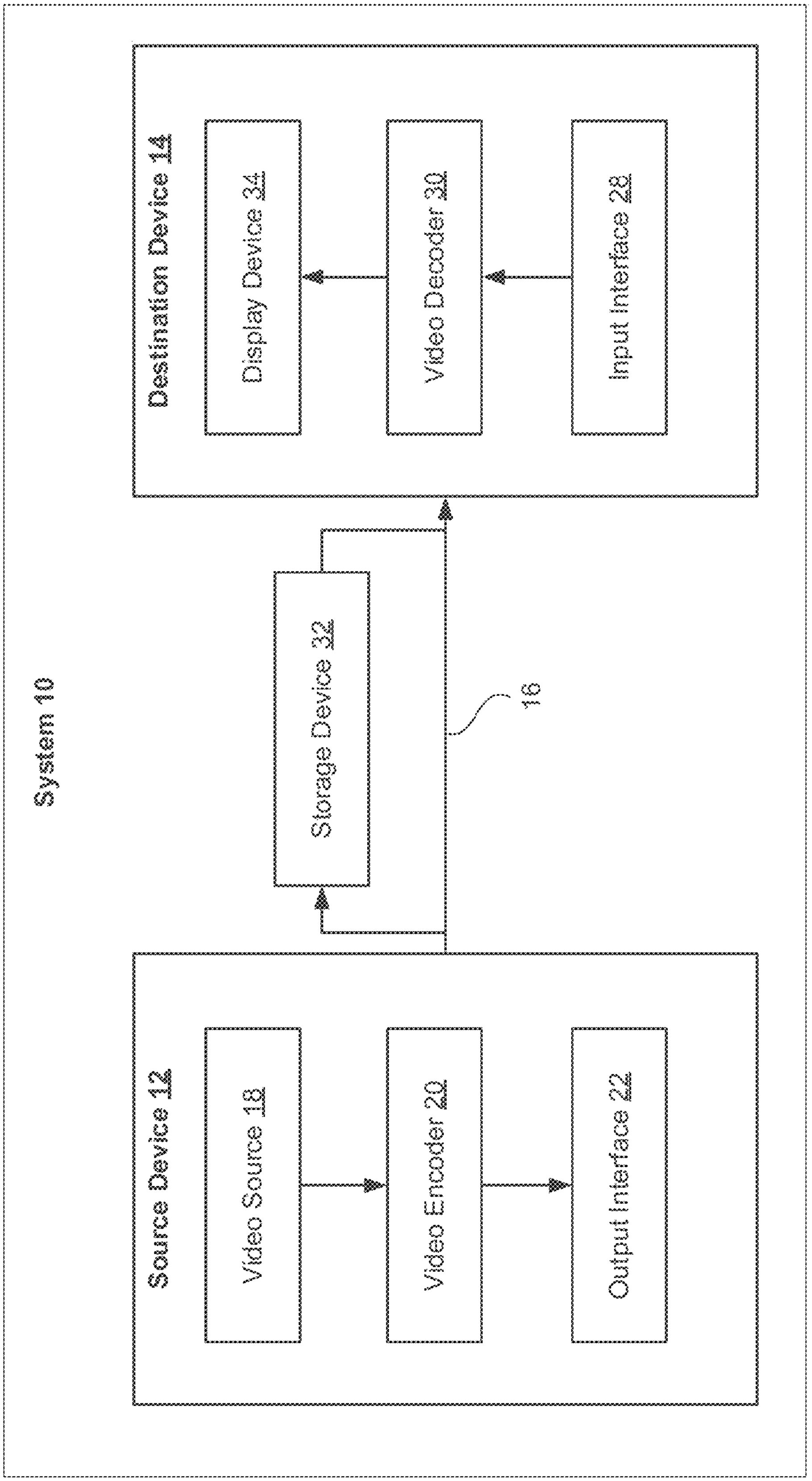
FIG. 1 is a block diagram illustrating an example system for encoding and decoding video blocks in accordance with some implementations of the present disclosure.

Reference will now be made in detail to various implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be appreciated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Various video coding techniques may be used to compress video data. Video coding is performed according to one or more video coding standards. For example, video coding standards include versatile video coding (VVC), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently, Joint Video Exploration Team (JVET) under the collaboration of ITU-T VCEG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

Similar to all the preceding video coding standards, the ECM is built upon the block-based hybrid video coding framework. The input video signal is processed block by block (called coding units (CUs)). In ECM-1.0, a CU can be up to 128×128 pixels. However, same to the VVC, one coding tree unit (CTU) is split into CUs to adapt to varying local characteristics based on quad/binary/ternary-tree. In the multi-type tree structure, one CTU is firstly partitioned by a quad-tree structure. Then, each quad-tree leaf node can be further partitioned by a binary and ternary tree structure.

FIG. 1 is a block diagram illustrating an example system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Example file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
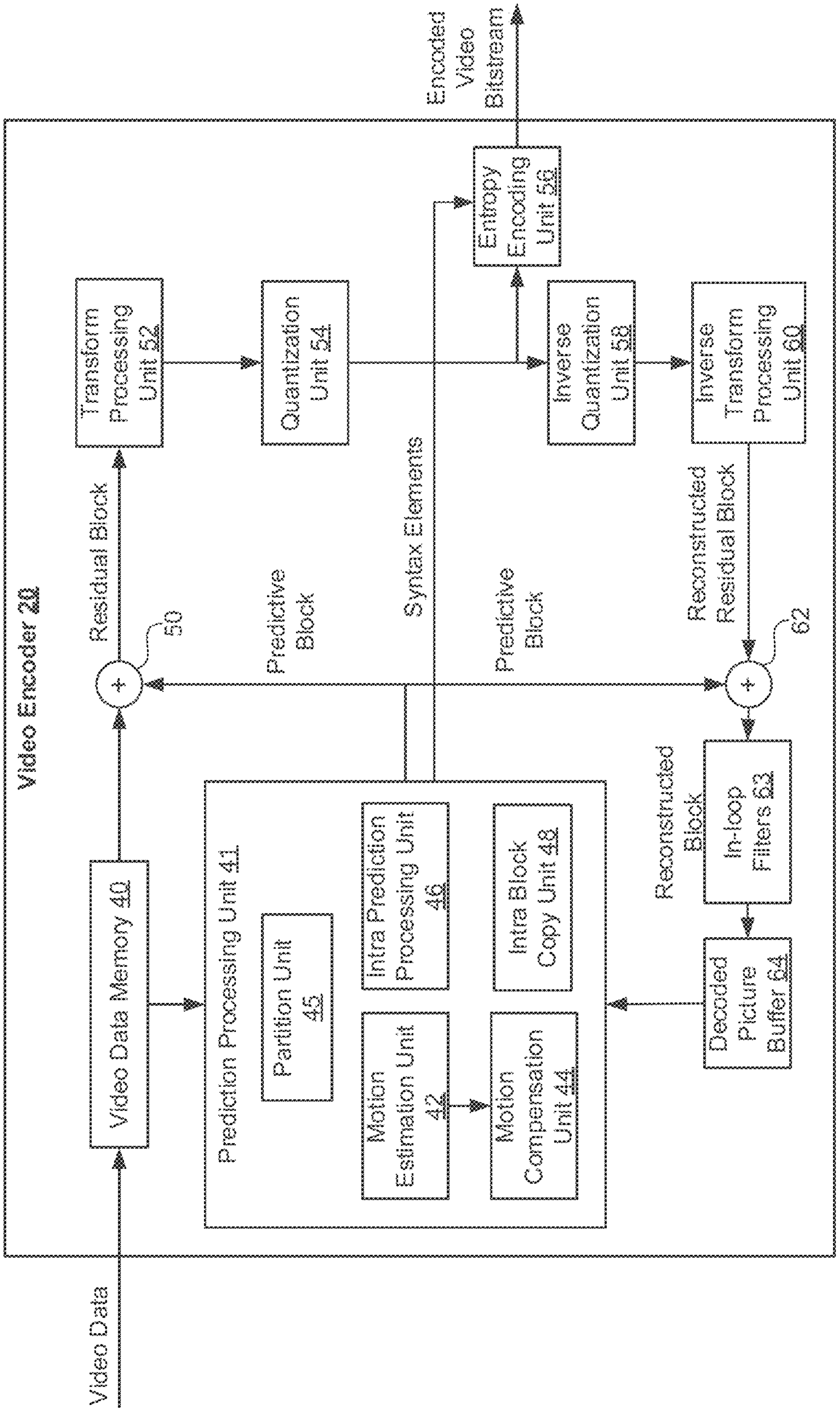
FIG. 2 is a block diagram illustrating an example video encoder in accordance with some implementations of the present disclosure.

FIG. 2 is a block diagram illustrating an example video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter, Cross Component Sample Adaptive Offset (CCSAO) filter and/or Adaptive in-Loop Filter (ALF), may also be used in addition to the deblocking filter to filter an output of the summer 62. It should be illustrated that for the CCSAO technique, the present application is not limited to the embodiments described herein, and instead, the application may be applied to a situation where an offset is selected for any of a luma component, a Cb chroma component and a Cr chroma component according to any other of the luma component, the Cb chroma component and the Cr chroma component to modify said any component based on the selected offset. Further, it should also be illustrated that a first component mentioned herein may be any of the luma component, the Cb chroma component and the Cr chroma component, a second component mentioned herein may be any other of the luma component, the Cb chroma component and the Cr chroma component, and a third component mentioned herein may be a remaining one of the luma component, the Cb chroma component and the Cr chroma component. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g. a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In some examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
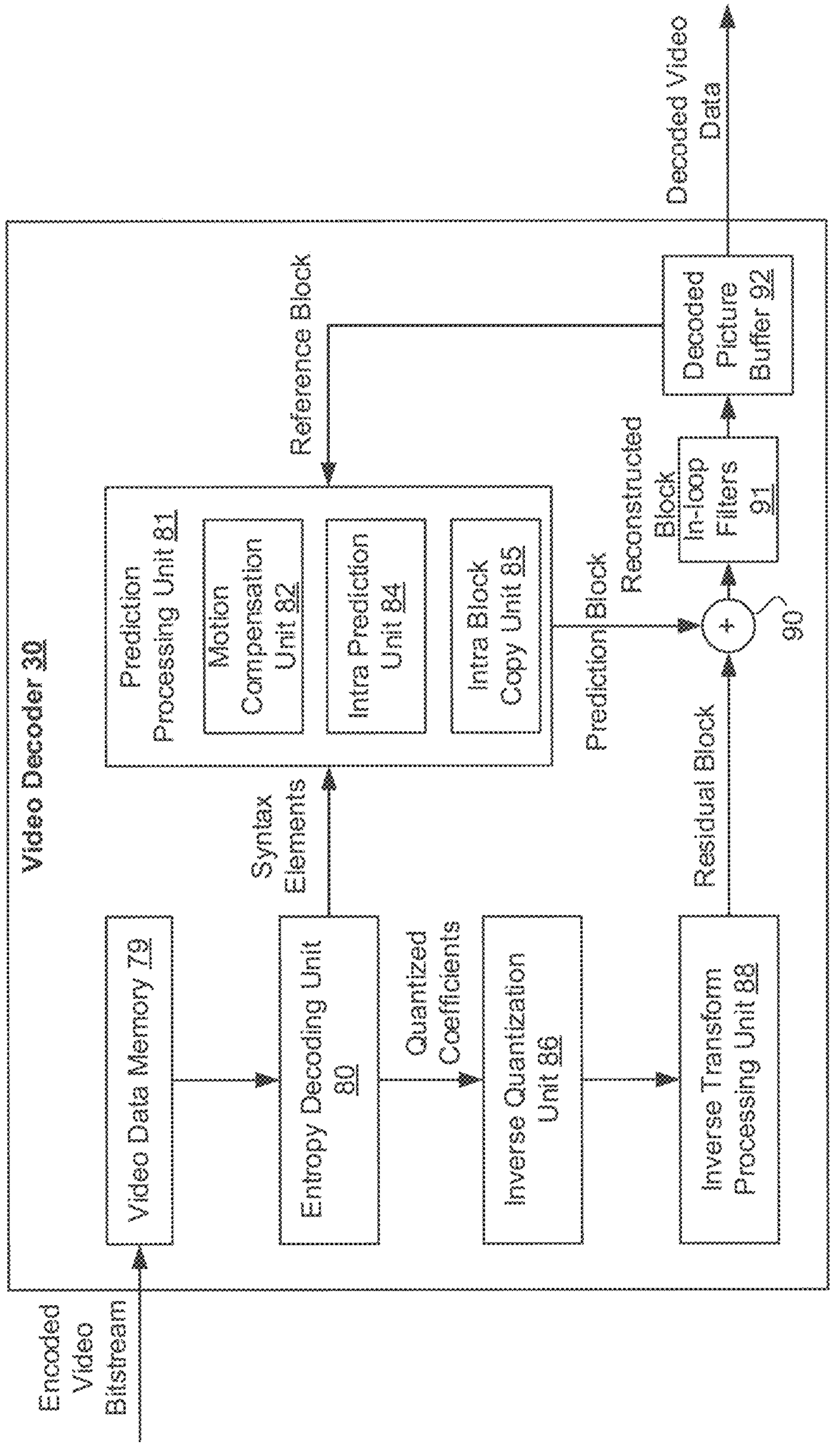
FIG. 3 is a block diagram illustrating an example video decoder in accordance with some implementations of the present disclosure.

FIG. 3 is a block diagram illustrating an example video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter, CCSAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
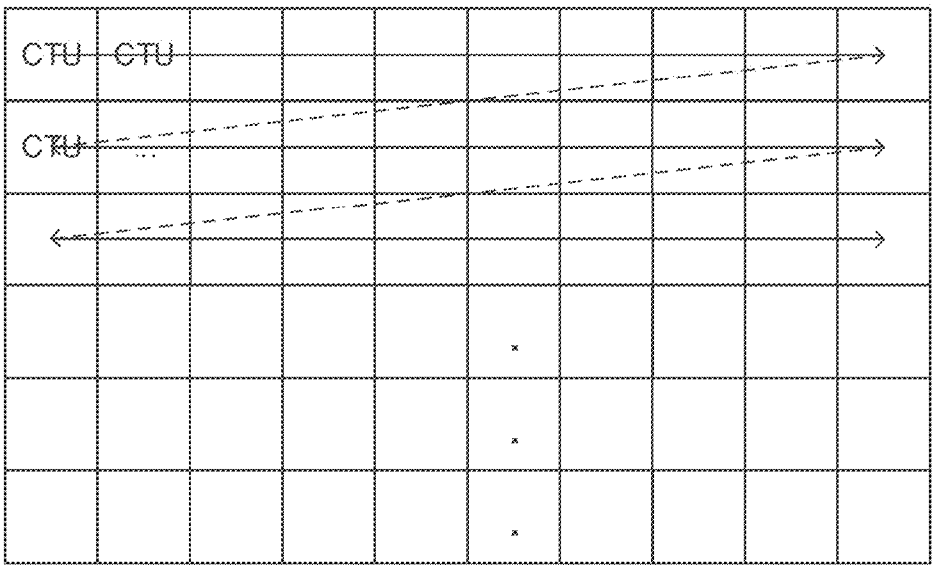
FIGS. 4A through 4E are block diagrams illustrating how a frame is recursively partitioned into multiple video blocks of different sizes and shapes in accordance with some implementations of the present disclosure.
Figure 4B:
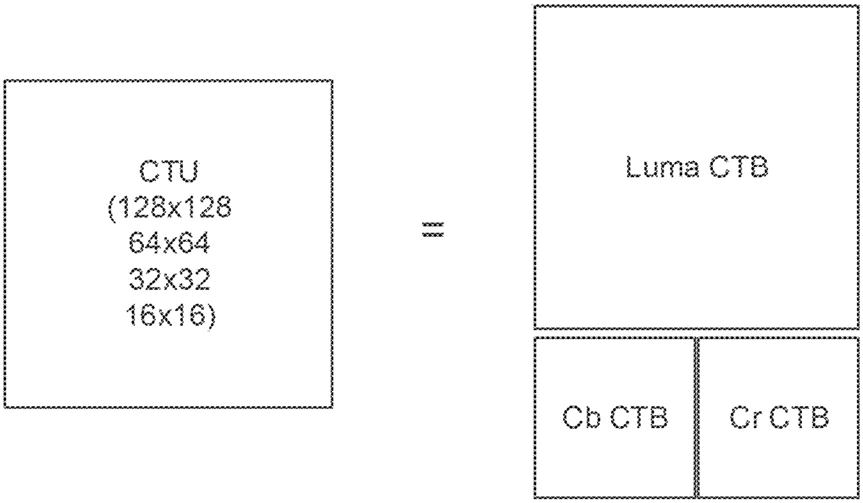

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
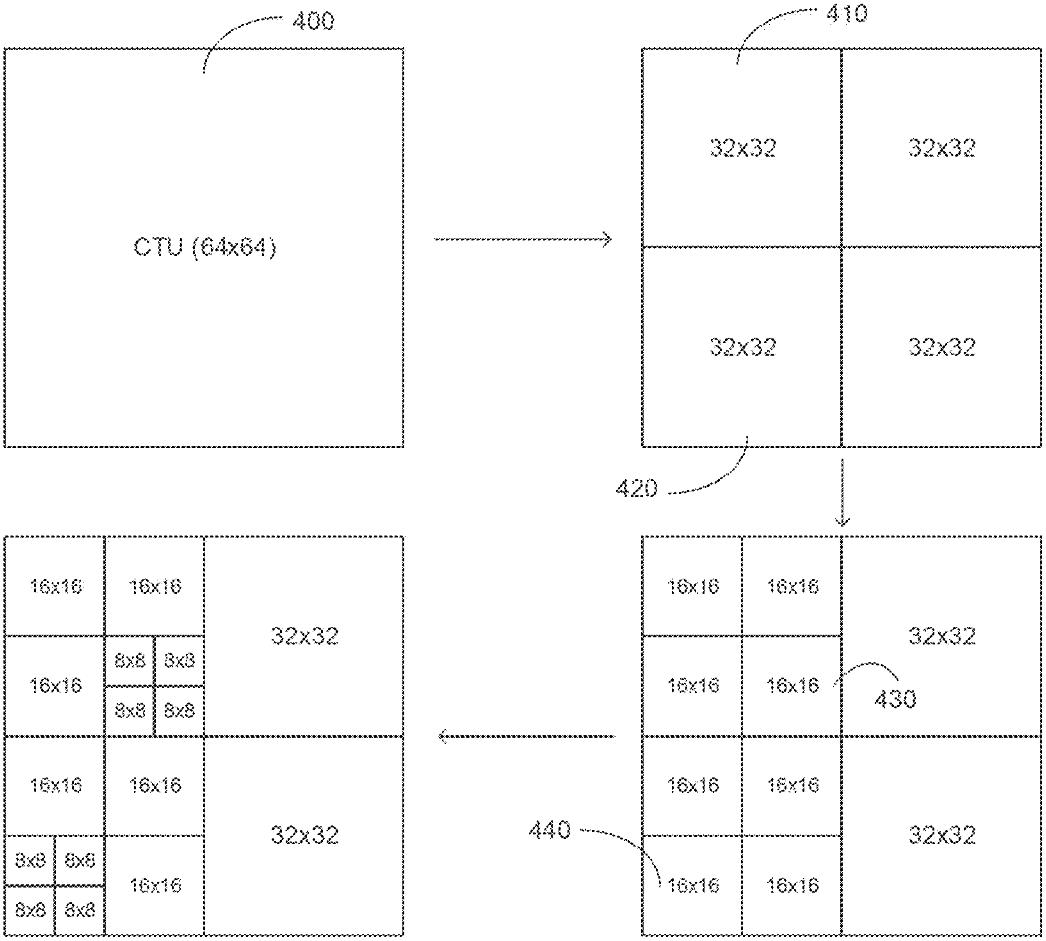
Figure 4D:
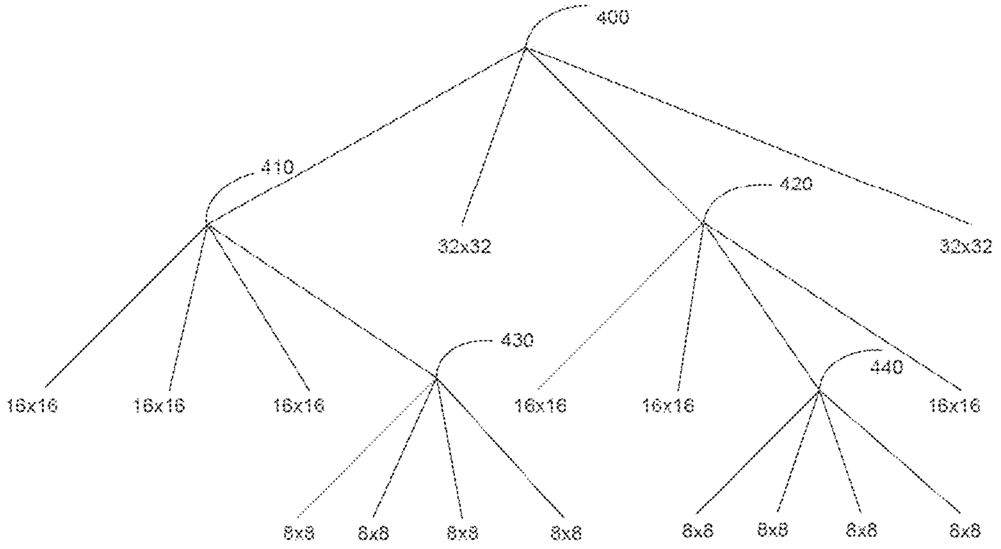
Figure 4E:
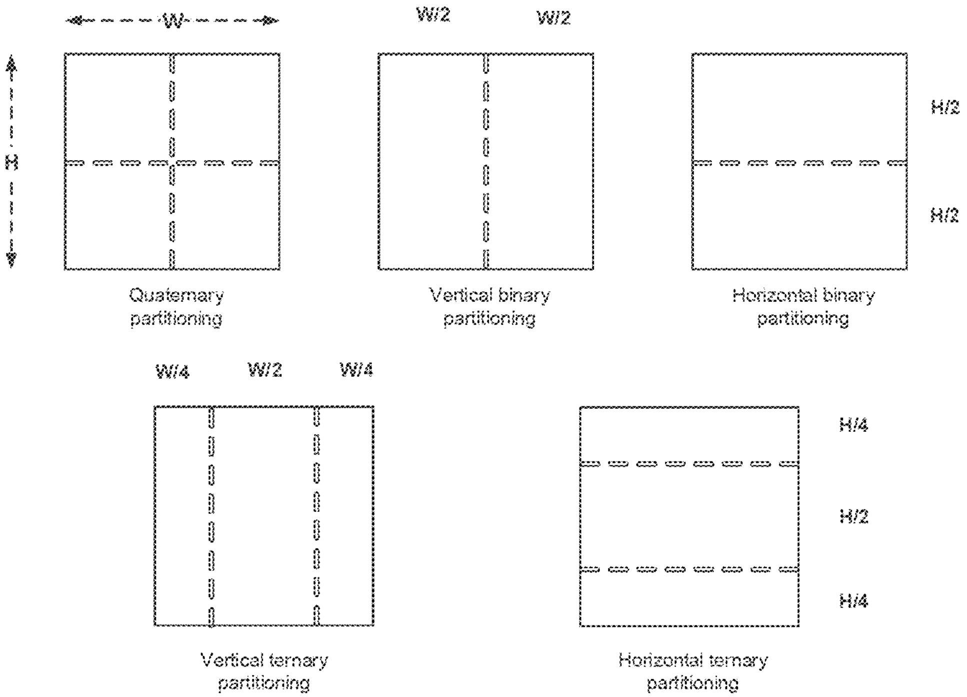

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 2, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

The main focus of this application is to further enhance the coding efficiency of the coding tool of cross-component prediction, cross-component linear model (CCLM), that is applied in the ECM. In this application, some related coding tools in the ECM are briefly reviewed. After that, some deficiencies in the existing design of CCLM are discussed. Finally, the solutions are provided to improve the existing CCLM prediction design.

Cross-Component Linear Model Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, j) = \alpha \cdot rec'_L(i, j) + \beta \tag{1}$$

where $pred_C(i,j)$ represents the predicted chroma samples in a CU and $rec_L(i,j)$ represents the downsampled reconstructed luma samples of the same CU.

The CCLM parameters (α and β) are derived with at most four neighboring chroma samples and their corresponding down-sampled luma samples. Suppose the current chroma block dimensions are W×H, then W" and H' are set as:

W'=W, H'=H when LM mode is applied;

W'=W+H when LM-A mode is applied;

H'=H+W when LM-L mode is applied;

The above neighboring positions are denoted as S[0, −1] . . . . S[W'−1, −1] and the left neighboring positions are denoted as S[−1, 0] . . . . S[−1, H'−1]. Then the four samples are selected as:

S[W'/4, −1], S[3*W'/4, −1], S[−1, H'/4], S[−1, 3*H'/4] when LM mode is applied and both above and left neighboring samples are available;

S[W'/8, −1], S[3*W'/8, −1], S[5*W'/8, −1], S[7*W'/8, −1] when LM-A mode is applied or only the above neighboring samples are available;

S[−1, H'/8], S[−1, 3*H'/8], S[−1, 5*H'/8], S[−1, 7*H'/8] when LM-L mode is applied or only the left neighboring samples are available;

The four neighboring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$X_a = (x_A^0 + x_A^1 + 1) >> 1;\ X_b = (x_B^0 + x_B^1 + 1) >> 1 \tag{2}$$
$$Y_a = (y_A^0 + y_A^1 + 1) >> 1;\ Y_b = (y_B^0 + y_B^1 + 1) >> 1$$

Finally, the linear model parameters α and β are obtained according to the following equations.

$$\alpha = \frac{Y_a - Y_b}{X_a - X_b} \tag{3}$$

$$\beta = Y_b - \alpha \cdot X_b \tag{4}$$

Figure 5:
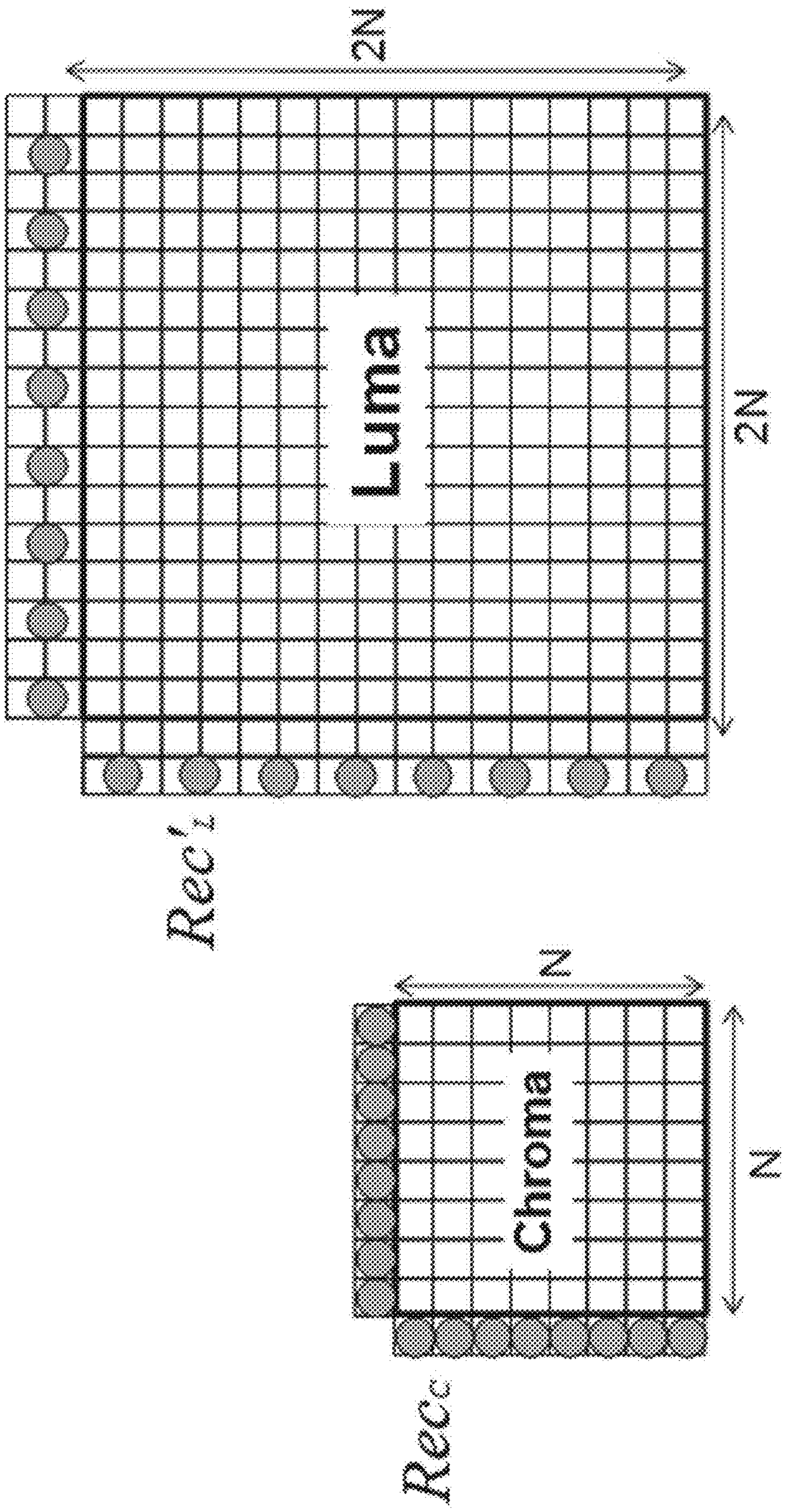
FIG. 5 is an example of the location of the left and above samples and the samples of the current block.

FIG. 5 shows an example of the location of the left and above samples and the samples of the current block involved in the CCLM mode.

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

$$DivTable[\,] = \{0, 7, 6, 5, 5, 4, 4, 3, 3, 2, 2, 1, 1, 1, 1, 0\} \tag{5}$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A (also called LM_T) mode, only the above template is used to calculate the linear model coefficients. To get more samples, the above template is extended to (W+H) samples. In LM_L mode, only left template is used to calculate the linear model coefficients. To get more samples, the left template is extended to (H+W) samples.

In LM_LT mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = \begin{bmatrix} rec_L(2i-1, 2j-1) + 2 \cdot rec_L(2i-1, 2j-1) + \\ rec_L(2i+1, 2j-1) + rec_L(2i-1, 2j) + \\ 2 \cdot rec_L(2i2j) + rec_L(2i+1, 2j) + 4 \end{bmatrix} >> 3 \tag{6}$$

$$rec'_L(i, j) = \begin{bmatrix} rec_L(2i, 2j-1) + rec_L(2i-1, 2j) + \\ 4 \cdot rec_L(2i, 2j) + rec_L(2i+1, 2j) + \\ rec_L(2i2j+1) + 4 \end{bmatrix} >> 3 \tag{7}$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

Derivation of chroma prediction mode from luma mode when cclm is enabled

| Chroma prediction | Corresponding luma intra prediction mode | | | | |
|---|---|---|---|---|---|
| mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2.

TABLE 2

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In addition, in order to reduce luma-chroma latency in dual tree, when the 64×64 luma coding tree node is partitioned with Not Split (and Intra Sub-Partitions (ISP) is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM.

If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

During the ECM development, the simplified derivation of α and β (min-max approximation) is removed. Instead, linear least square solution between causal reconstructed data of down-sampled luma samples and causal chroma samples to derive model parameters α and β.

$$\alpha = \frac{I \times \sum_{i=0}^{I} Rec_C(i) \times Rec'_L(i) - \sum_{i=0}^{I} Rec_C(i) \times \sum_{i=0}^{I} Rec'_L(i)}{I \times \sum_{i=0}^{I} Rec'_L(i) \times Rec'_L(i) - \left(\sum_{i=0}^{I} Rec'_L(i)\right)^2} = \frac{A_1}{A_2}$$

$$\beta = \frac{\sum_{i=0}^{I} Rec_C(i) - \alpha \times \sum_{i=0}^{I} Rec'_L(i)}{I}$$

where $Rec_C(i)$ and $Rec'_L(i)$ indicate reconstructed chroma samples and down-sampled luma samples around the target block, I indicates total samples number of neighboring data.

The LM_A, LM_L modes are also called Multi-Directional Linear Model (MDLM).

Figure 6A:
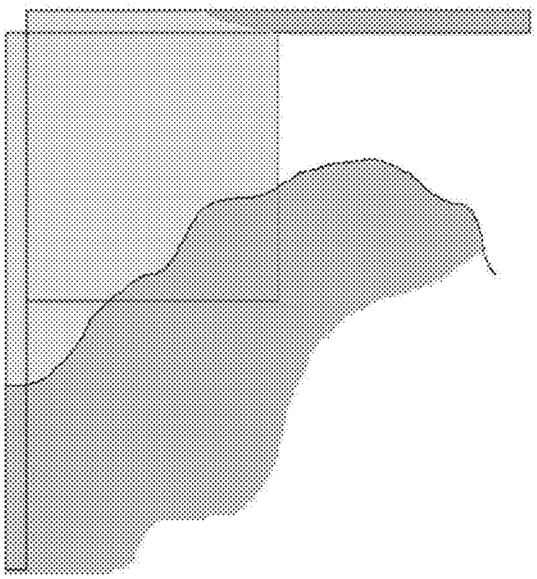
FIG. 6A shows an example that Multi-Directional Linear Model (MDLM) works when the block content cannot be predicted from the L-shape reconstructed region.

FIG. 6A shows an example that MDLM works when the block content cannot be predicted from the L-shape reconstructed region.

Figure 6B:
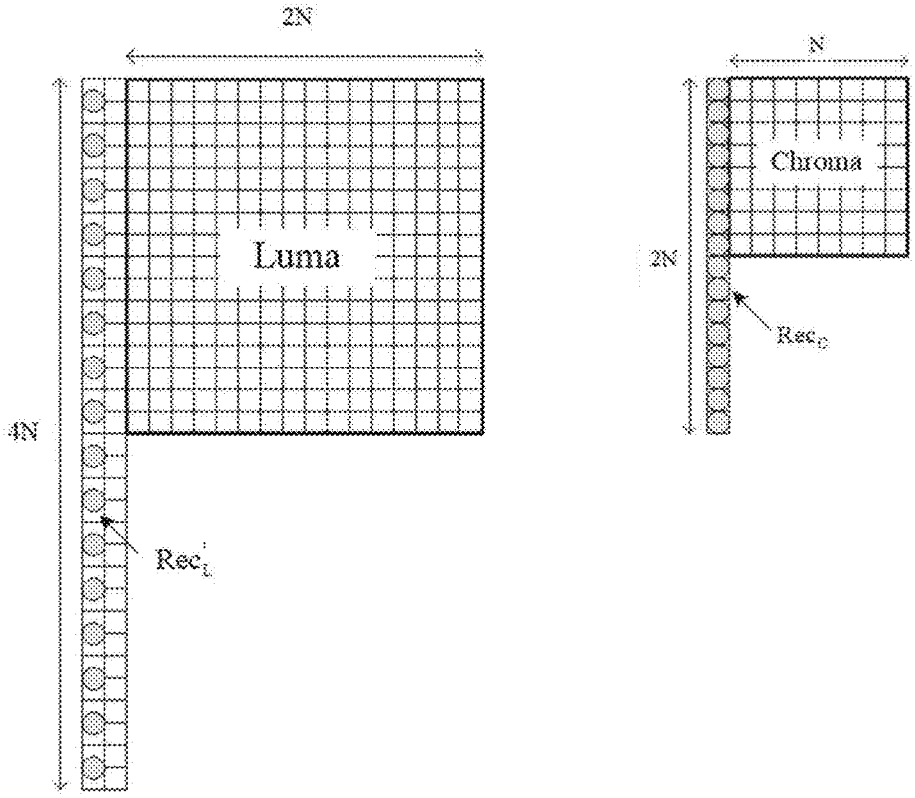
FIG. 6B shows an example that MDLM_L only uses left reconstructed samples to derive Cross-Component Linear Model (CCLM) parameters.

FIG. 6B shows an example that MDLM_L only uses left reconstructed samples to derive CCLM parameters.

Figure 6C:
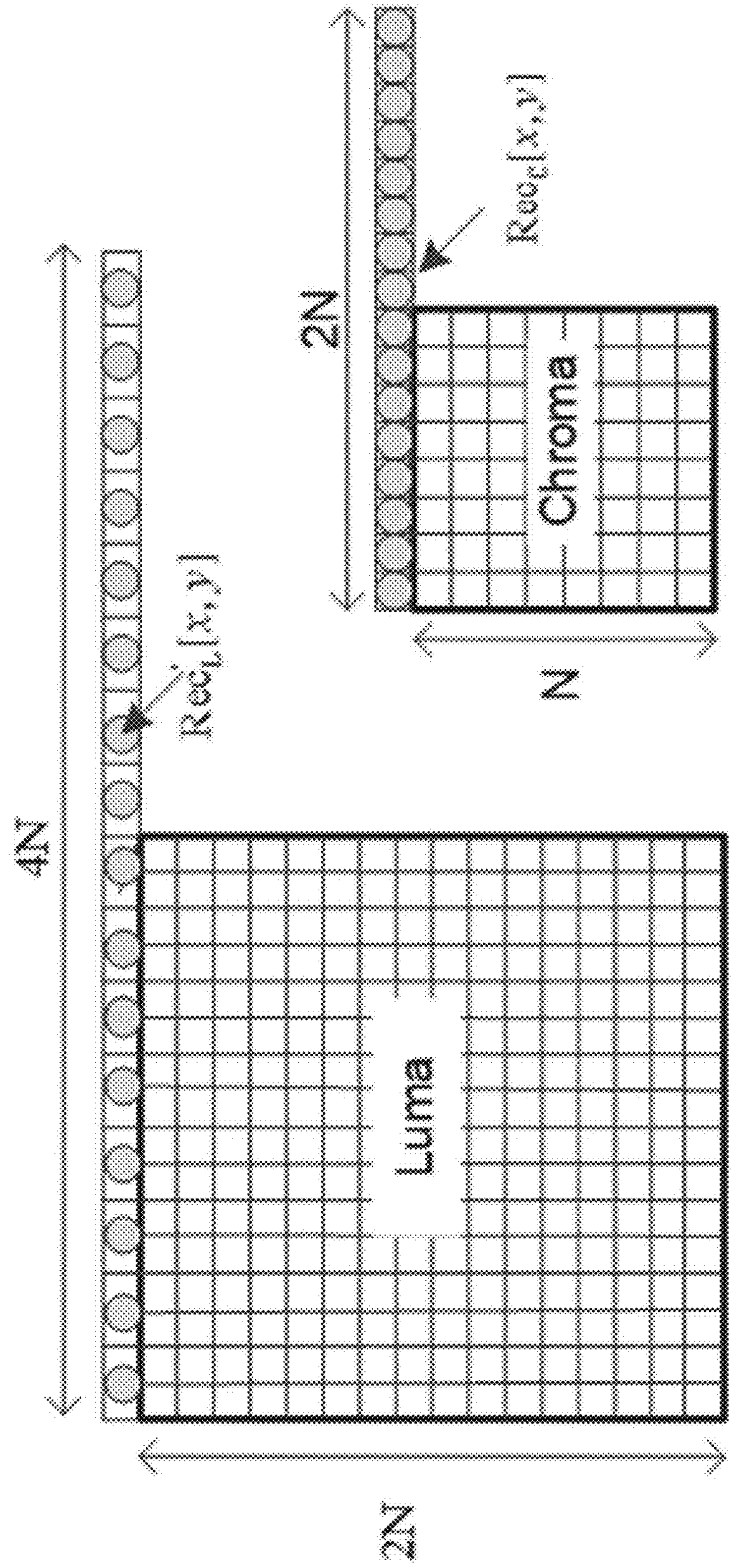
FIG. 6C shows an example that MDLM_T only uses top reconstructed samples to derive CCLM parameters.

FIG. 6C shows an example that MDLM_T only uses top reconstructed samples to derive CCLM parameters.

Integerization

After the initial integerization design of Least Mean Square (LMS) CCLM was proposed, the method was improved by a series of simplification, which reduces α precision $n_\alpha$ from 13 to 7, reduces the maximum multiplier bitwidth, and reduces division LUT entries from 64 to 32, finally leads to the ECM LMS version.

Basic Algorithm

In some embodiments, the linear relationship is utilized to modelize the correlation of luma signal and chroma signal. The chroma values are predicted from reconstructed luma values of collocated block as follows.

$$Pred_C[x, y] = \alpha \cdot Rec_L[x, y] + \beta \quad (6)$$

where $Pred_C$ indicates the prediction of chroma samples in a block and $Rec_L$ indicates the reconstructed luma samples in the block. Parameters α and β are derived from causal reconstructed samples around the current block.

Luma and chroma components have different sampling ratios in YUV420 sampling. The sampling ratio of chroma components is half of that of luma component and has 0.5 pixel phase difference in vertical direction. Reconstructed luma needs down-sampling in vertical direction and subsample in horizontal direction to match size of chroma signal, as follows.

$$Rec'_L[x, y] = (Rec_L[2x, 2y] + Rec_L[2x, 2y+1]) >> 1 \quad (7)$$

In this contribution, linear least square solution between causal reconstructed data of down-sampled luma component and chroma component is used to derive model parameters α and β.

$$\alpha = \frac{I \cdot \sum_{i=0}^{I} \mathrm{Rec}_c(i) \cdot Rec'_L(i) - \sum_{i=0}^{I} Rec_C(i) \cdot \sum_{i=0}^{I} Rec'_L(i)}{I \cdot \sum_{i=0}^{I} Rec'_L(i) \cdot Rec'_L(i) - \left(\sum_{i=0}^{I} Rec'_L(i)\right)^2} = \frac{A_1}{A_2} \tag{8}$$

$$\beta = \frac{\sum_{i=0}^{I} Rec_C(i) - \alpha \cdot \sum_{i=0}^{I} Rec'_L(i)}{I} \tag{9}$$

Integer Implementation

Float point operation is necessary in equation (8) to calculate linear model parameters α to keep high data accuracy. And float point multiplication is involved in equation (6) when α is represented by float point value. In this section, the integer implementation of this algorithm is designed.

In some embodiments, fractional part of parameter α is quantized with $n_\alpha$ bits data accuracy. Parameter α value is represented by an up-scaled and rounded integer value α' and a'=a×(1<<$n_\alpha$). Then linear model of equation (1) is changed to.

$$pred_C[x, y] = (\alpha' \cdot Rec'_L[x, y] >> n_\alpha) + \beta' \tag{10}$$

where β' is rounding value of float point β and α' can be calculated as follows.

$$\alpha' = a \cdot (1 << n_\alpha) = \frac{A_1}{A_2} \cdot (1 << n_\alpha) \tag{11}$$

This contribution proposes to replace division operation of equation (11) by table lookup and multiplication. $A_2$ is firstly de-scaled to reduce the table size. $A_1$ is also de-scaled to avoid product overflow.

Then, in $A_2$ it is kept only most significant bits defined by $n_{A_2}$, value and other bits are put to zero. The approximate value $A_2$' can be calculated as $$A'_2 = [A_2 >> r_{A_2}] \cdot 2^{r_{A_2}}$$

where [ . . . ] means rounding operation and $r_{A_2}$ can be calculated as $$r_{A_2} = \max(bdepth(A_2) - n_{A_2}, 0)$$

where bdepth($A_2$) means bit depth of value $A_2$.

Same operation is done for $A_1$.

$$A'_1 = [A_1 >> r_{A_1}] \cdot 2^{r_{A_1}}$$

$$r_{A_1} = \max(bdepth(A_1) - n_{A_1}, 0)$$

Taking into account quantized representation of $A_1$ and $A_2$ formula (11) can be re-written as following.

$$\alpha' \approx \frac{[A_1 >> r_{A_1}] \cdot 2^{r_{A_1}}}{[A_2 >> r_{A_2}] \cdot 2^{r_{A_2}}} \cdot 2^{n_\alpha} = \frac{2^{n_{table}} \cdot [A_1 >> r_{A_1}] \cdot 2^{r_{A_1}+n_\alpha}}{[A_2 >> r_{A_2}] \cdot 2^{r_{A_2}+n_{table}}} \approx \left[\frac{2^{n_{table}}}{A_2 >> r_{A_2}}\right] \cdot [A_1 >> r_{A_1}] \cdot 2^{r_{A_1}+n_\alpha(r_{A_2}+n_{table})} \text{ where } \left[\frac{2^{n_{table}}}{A_2 >> r_{A_2}}\right]$$

is represented as lookup table with length of $2^{n_{A_2}}$ to avoid the division.

In the simulation, the constant parameters are set as:

$n_\alpha$ equals to 13, which value is tradeoff between data accuracy and computational cost;

$n_{A_2}$ equals to 6, results in lookup table size as 64, table size can be further reduced to 32 by up-scaling A, when bdepth ($A_2$)<6 (e.g. $A_2$<32);

$n_{table}$ equals to 15, results in 16 bits data representation of table elements;

$n_{A1}$ is set as 15, to avoid product overflow and keep 16 bits multiplication.

In final, α' is clipped to [$-2^{-15}$, $2^{15}-1$], to remain 16 bits multiplication in equation (5). With this clipping, the actual a value is limited to [-4,4) when $n_\alpha$ equals to 13, which is useful to prevent the error amplification.

With calculated parameter α', parameter β' is calculated as follow.

$$\beta' = \frac{\sum_{i=0}^{I} Rec_C(i) - \left(\alpha' \cdot \left(\sum_{i=0}^{I} Rec'_L(i)\right) >> n_\alpha\right)}{I}$$

The division of above equation can be simply replaced by shift since value I is power of 2.

Simplified Parameter Calculation

Introduction

In HM6.0, an intra prediction mode called LM is applied to predict chroma PU based on a linear model using the reconstruction of the collocated luma PU. The parameters of the linear model consist of slope (a>>k) and y-intercept (b), which are derived from the neighboring luma and chroma pixels using the least mean square solution. The values of the prediction samples predSamples [x,y], with x,y=0 . . . nS−1, where nS specifies the block size of the current chroma PU, are derived as follows:

$$predSamples[x, y] = Clip1_C(((p'_Y[x, y] * a) >> k) + b) \tag{12}$$

with x, y=0 . . . nS−1.

where $P_Y$'[x,y] is the reconstructed pixels from the corresponding luma component. When the coordinates x and y are equal to or larger than 0, $P_Y$' is the reconstructed pixel from the co-located luma PU. When x or y is less than 0, $P_Y$' is the reconstructed neighboring pixel of the co-located luma PU.

Some intermediate variables in the derivation process, L, C, LL, LC, k2 and k3, are derived as:

$$L = \left(\sum_{y=0}^{nS-1} p'_Y[-1, y] + \sum_{x=0}^{nS-1} p'_Y[x, -1]\right) >> k3 \tag{13}$$

-continued $$C=\left(\sum_{y=0}^{nS-1}p[-1,y]+\sum_{x=0}^{nS-1}p[x,-1]\right)>>k3 \tag{14}$$

$$LL=\left(\sum_{y=0}^{nS-1}p'_Y[-1,y]^2+\sum_{x=0}^{nS-1}p'_Y[x,-1]^2\right)>>k3 \tag{15}$$

$$LC=\left(\sum_{y=0}^{nS-1}p'_Y[-1,y]*p[-1,y]+\sum_{y=0}^{nS-1}p'_Y[x,-1]*p[x,-1]\right)>>k3 \tag{16}$$

$$k2=\text{Log2}((2^*nS)>>k3) \tag{17}$$

$$k3=\text{Max}(0,BitDepth_C+\text{Log2}(nS)-14) \tag{18}$$

Therefore, variables a, b and k can be derived as:

$$a1=(LC<<k2)-L*C \tag{19}$$

$$a2=(LL<<k2)-L*L \tag{20}$$

-continued $$k1=\text{Max}(0,\text{Log2}(\text{abs}(a2))-5)-\text{Max}(0,\text{Log2}(\text{abs}(a1))-14)+2 \tag{21}$$

$$a1s=a1>>\text{Max}(0,\text{Log2}(\text{abs}(a1))-14) \tag{22}$$

$$a2s=\text{abs}(a2>>\text{Max}(0,\text{Log2}(\text{abs}(a2))-5)) \tag{23}$$

$$a3=a2s<1?0:Clip3\left(-2^{15},2^{15}-1,a1s*lmDiv+(1<<(k1-1))>>k1\right) \tag{24}$$

$$a=a3>>\text{Max}(0,\ \text{Log2}(\text{abs}(a3))-6) \tag{25}$$

$$k=13-\text{Max}(0,\ \text{Log2}(\text{abs}(a))-6) \tag{26}$$

$$b=(L-((a*C)>>k1)+(1<<(k2-1)))>>k2 \tag{27}$$

where lmDiv is specified in a 63-entry look-up table, i.e. Table 3, which is generated by:

$$lmDiv(a2s)=\left((1<<15)+a2s/2\right)/a2s \tag{28}$$

TABLE 3

Specification of lmDiv

| a2s | 1 | 2 | 3 | 4 | 5 | 6 | 7 | 8 | 9 | 10 | 11 | 12 | 13 |
|---|---|---|---|---|---|---|---|---|---|---|---|---|---|
| lmDiv | 32768 | 16384 | 10923 | 8192 | 6554 | 5461 | 4681 | 4096 | 3641 | 3277 | 2979 | 2731 | 2521 |
| a2s | 14 | 15 | 16 | 17 | 18 | 19 | 20 | 21 | 22 | 23 | 24 | 25 | 26 |
| lmDiv | 2341 | 2185 | 2048 | 1928 | 1820 | 1725 | 1638 | 1560 | 1489 | 1425 | 1365 | 1311 | 1260 |
| a2s | 27 | 28 | 29 | 30 | 31 | 32 | 33 | 34 | 35 | 36 | 37 | 38 | 39 |
| lmDiv | 1214 | 1170 | 1130 | 1092 | 1057 | 1024 | 993 | 964 | 936 | 910 | 886 | 862 | 840 |
| a2s | 40 | 41 | 42 | 43 | 44 | 45 | 46 | 47 | 48 | 49 | 50 | 51 | 52 |
| lmDiv | 819 | 799 | 780 | 762 | 745 | 728 | 712 | 697 | 683 | 669 | 655 | 643 | 630 |
| a2s | 53 | 54 | 55 | 56 | 57 | 58 | 59 | 60 | 61 | 62 | 63 | 64 | |
| lmDiv | 618 | 607 | 596 | 585 | 575 | 565 | 555 | 546 | 537 | 529 | 520 | 512 | |

In the Equation (24), a1s is a 16-bit signed integer and lmDiv is a 16-bit unsigned integer. Therefore, 16-bit multiplier and 16-bit storage are needed. In this contribution, we propose to reduce the bit depth of multipliers to the internal bit depth, as well as the size of the look-up table.

Reduced Bit Depth of Multipliers

The bit depth of a1s is reduced to the internal bit depth by changing Equation (22) as:

$$a1s=a1>>\text{Max}(0,\text{Log2}(\text{abs}(a1))-(BitDepth_C-2)) \tag{29}$$

The values of lmDiv with the internal bit depth are achieved with:

$$lmDiv(a2s)=\left((1<<(BitDepth_C-1))+a2s/2\right)/a2s \tag{30}$$

and stored in the look-up table. Table 4 shows the example of internal bit depth 10.

TABLE 4

| Specification of lmDiv with the internal bit depth equal to 10 | | | | | | | | | | | | | | | | |
|---|---|---|---|---|---|---|---|---|---|---|---|---|---|---|---|---|
| a2s | 1 | 2 | 3 | 4 | 5 | 6 | 7 | 8 | 9 | 10 | 11 | 12 | 13 | 14 | 15 | 16 |
| lmDiv | 512 | 256 | 171 | 128 | 102 | 85 | 73 | 64 | 57 | 51 | 47 | 43 | 39 | 37 | 34 | 32 |
| a2s | 17 | 18 | 19 | 20 | 21 | 22 | 23 | 24 | 25 | 26 | 27 | 28 | 29 | 30 | 31 | 32 |
| lmDiv | 30 | 28 | 27 | 26 | 24 | 23 | 22 | 21 | 20 | 20 | 19 | 18 | 18 | 17 | 17 | 16 |
| a2s | 33 | 34 | 35 | 36 | 37 | 38 | 39 | 40 | 41 | 42 | 43 | 44 | 45 | 46 | 47 | 48 |
| lmDiv | 16 | 15 | 15 | 14 | 14 | 13 | 13 | 13 | 12 | 12 | 12 | 12 | 11 | 11 | 11 | 11 |
| a2s | 49 | 50 | 51 | 52 | 53 | 54 | 55 | 56 | 57 | 58 | 59 | 60 | 61 | 62 | 63 | |
| lmDiv | 10 | 10 | 10 | 10 | 10 | 9 | 9 | 9 | 9 | 9 | 9 | 9 | 8 | 8 | 8 | |

Modifications are also made to Equation (21) and (26) as below:

$$k1 = \mathrm{Max}(0, \mathrm{Log2}(\mathrm{abs}(a2)) - 5) - \mathrm{Max}(0, \mathrm{Log2}(\mathrm{abs}(a1)) - (BitDepth_C - 2)) \quad (31)$$

$$k = BitDepth_C - 1 - \mathrm{Max}(0, \mathrm{Log2}(\mathrm{abs}(a)) - 6) \quad (32)$$

Reduced Entries of the Look-Up Table

Figure 7:
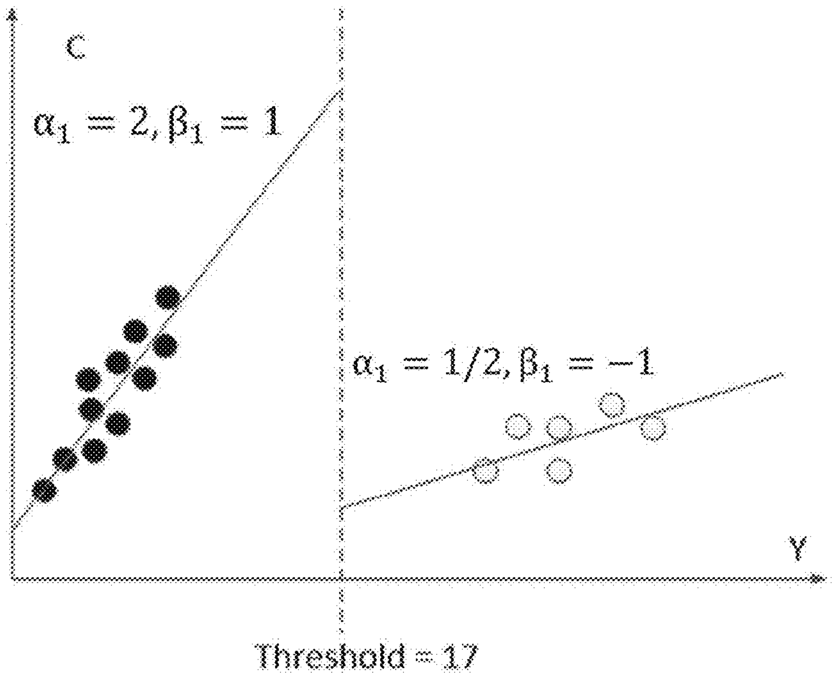
FIG. 7 shows an example of classifying the neighboring samples into two groups based on the value Threshold.

In some embodiments, the entries are reduced from 63 to 32, and the bits for each entry from 16 to 10, as shown in Table 3. By doing this, almost 70% memory saving can be achieved. The corresponding changes for Equation (24), Equation (28) and Equation (26) are as follows.

$$a3 = a2s < 32?0: Clip3\left(-2^{15}, 2^{15} - 1, a1s * lmDiv + (1 << (k1 - 1)) >> k1\right) \quad (33)$$

$$lmDiv(a2s) = \left((1 << (BitDepth_C + 4)) + a2s/2\right)/a2s \quad (34)$$

$$k = BitDepth_C + 4 - \mathrm{Max}(0, \mathrm{Log2}(\mathrm{abs}(a)) - 6) \quad (35)$$

where $pred_C(i,j)$, $pred_C(i,j)$ represents the predicted chroma samples in a CU and $rec_L'(i,j)$ represents the downsampled reconstructed luma samples of the same CU. Threshold is calculated as the average value of the neighboring reconstructed luma samples. FIG. 7 shows an example of classifying the neighboring samples into two groups based on the value Threshold. For each group, parameter $\alpha_i$ and $\beta_i$, with i equal to 1 and 2 respectively, are derived from the straight-line relationship between luma values and chroma values from two samples, which are minimum luma sample A ($X_A$, $Y_A$) and maximum luma sample B ($X_B$, $Y_B$) inside the group. Here $X_A$, $Y_A$ are the x-coordinate (i.e. luma value) and y-coordinate (i.e. chroma value) value for sample A, and $X_B$, $Y_B$ are the x-coordinate and y-coordinate value for sample B. The linear model parameters α and β are obtained according to the following equations.

$$\alpha = \frac{y_B - y_A}{x_B - x_A}$$

$$\beta = y_A - \alpha x_A$$

Such a method is also called min-max method. The division in the equation above could be avoided and replaced by a multiplication and a shift.

TABLE 5

| Specification of lmDiv with the internal bit depth equal to 10 | | | | | | | | | | | | | | | | |
|---|---|---|---|---|---|---|---|---|---|---|---|---|---|---|---|---|
| a2s | 32 | 33 | 34 | 35 | 36 | 37 | 38 | 39 | 40 | 41 | 42 | 43 | 44 | 45 | 46 | 47 |
| lmDiv | 512 | 496 | 482 | 468 | 455 | 443 | 431 | 420 | 410 | 400 | 390 | 381 | 372 | 364 | 356 | 349 |
| a2s | 48 | 49 | 50 | 51 | 52 | 53 | 54 | 55 | 56 | 57 | 58 | 59 | 60 | 61 | 62 | 63 |
| lmDiv | 341 | 334 | 328 | 321 | 315 | 309 | 303 | 298 | 293 | 287 | 282 | 278 | 273 | 269 | 264 | 260 |

Multi-Model Linear Model Prediction

In ECM-1.0, Multi-model LM (MMLM) prediction mode is proposed, for which the chroma samples are predicted based on the reconstructed luma samples of the same CU by using two linear models as follows:

$$\begin{cases} pred_C(i, j) = \alpha_1 \cdot rec_L'(i, j) + \beta_1 & \text{if } rec_L'(i, j) \le \text{Threshold} \\ pred_C(i, j) = \alpha_2 \cdot rec_L'(i, j) + \beta_2 & \text{if } rec_L'(i, j) > \text{Threshold} \end{cases}$$

For a coding block with a square shape, the above two equations are applied directly. For a non-square coding block, the neighboring samples of the longer boundary are first subsampled to have the same number of samples as for the shorter boundary.

Besides the scenario wherein the above template and the left template are used together to calculate the linear model coefficients, the two templates also can be used alternatively in the other two MMLM modes, called MMLM_A, and MMLM_L modes.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, a total of 11 intra modes are allowed for chroma intra mode coding. Those modes include five traditional intra modes and six cross-component linear model modes (CCLM, LM_A, LM_L, MMLM, MMLM_A and MMLM_L). Chroma mode signaling and derivation process are shown in Table 6. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 6

Derivation of chroma prediction mode from luma mode when MMLM_is enabled

| Chroma prediction | Corresponding luma intra prediction mode | | | | |
|---|---|---|---|---|---|
| mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 84 | 84 | 84 | 84 | 84 |
| 8 | 85 | 85 | 85 | 85 | 85 |
| 9 | 86 | 86 | 86 | 86 | 86 |
| 10 | 0 | 50 | 18 | 1 | X |

Adaptive Enabling of LM and MMLM for Prediction

Figure 8:
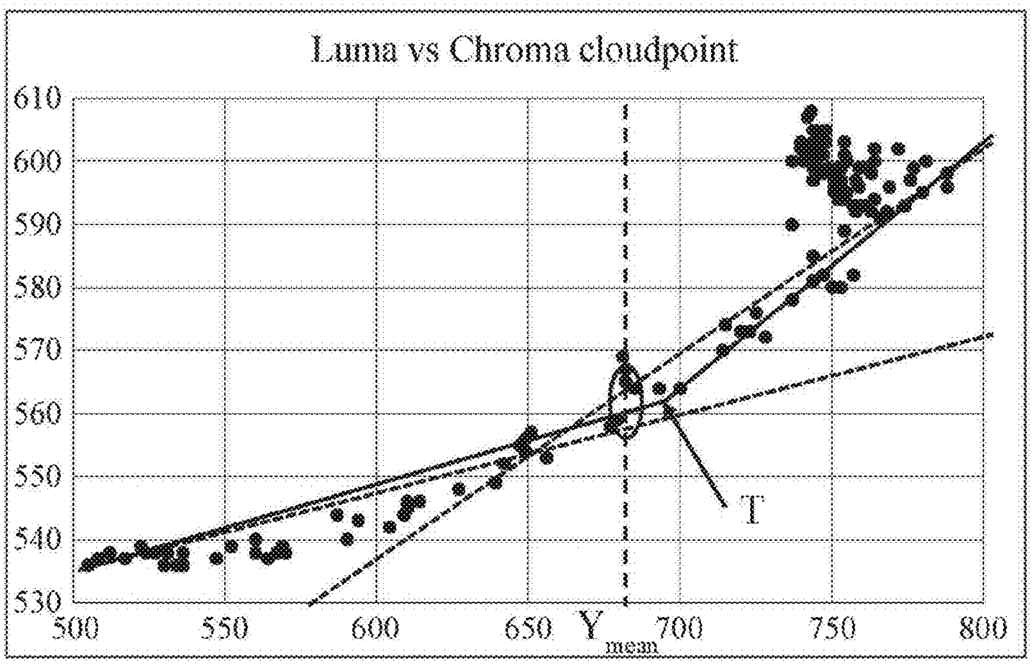
FIG. 8 shows an example of classifying the neighboring samples into two groups based on the knee point.

MMLM and LM modes may also be used together in an adaptive manner. For MMLM, two linear models are as follows:

$$\begin{cases} pred_C(i,j) = \alpha_1 \cdot rec'_L(i,j) + \beta_1 & \text{if } rec'_L(i,j) \le \text{Threshold} \\ pred_C(i,j) = \alpha_2 \cdot rec'_L(i,j) + \beta_2 & \text{if } rec'_L(i,j) > \text{Threshold} \end{cases}$$

where $pred_C(i,j)$ represents the predicted chroma samples in a CU and $rec_L'(i,j)$ represents the downsampled reconstructed luma samples of the same CU. Threshold can be simply determined based on the luma and chroma average values together with their minimum and maximum values. FIG. 8 shows an example of classifying the neighboring samples into two groups based on the knee point, T, indicated by an arrow. Linear model parameter $\alpha_1$ and $\beta_1$ are derived from the straight-line relationship between luma values and chroma values from two samples, which are minimum luma sample A ($X_A$, $Y_A$) and the Threshold ($X_T$, $Y_T$). Linear model parameter $\alpha_2$ and $\beta_2$ are derived from the straight-line relationship between luma values and chroma values from two samples, which are maximum luma sample B ($X_B$, $Y_B$) and the Threshold ($X_T$, $Y_T$). Here $X_A$, $Y_A$ are the x-coordinate (i.e. luma value) and y-coordinate (i.e. chroma value) value for sample A, and $X_B$, $Y_B$ are the x-coordinate and y-coordinate value for sample B. The linear model parameters $\alpha_i$ and $\beta_i$ for each group, with i equal to 1 and 2 respectively, are obtained according to the following equations.

$$\alpha_1 = \frac{Y_T - Y_A}{X_T - X_A}$$

$$\beta_1 = Y_A - \alpha_1 X_A$$

$$\alpha_2 = \frac{Y_B - Y_T}{X_B - X_T}$$

$$\beta_2 = Y_T - \alpha_2 X_T$$

For a coding block with a square shape, the above equations are applied directly. For a non-square coding block, the neighboring samples of the longer boundary are first subsampled to have the same number of samples as for the shorter boundary.

Besides the scenario wherein the above template and the left template are used together to determine the linear model coefficients, the two templates also can be used alternatively in the other two MMLM modes, called MMLM_A, and MMLM_L modes respectively.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, there is a condition check used to select LM modes (CCLM, LM_A, and LM_L) or multi-model LM modes (MMLM, MMLM_A, and MMLM_L). The condition check is as follows:

$$\begin{cases} LM\ modes & \text{if } ((Y_T - Y_A) \le d \,\|\, (Y_B - Y_T) \le d \;\&\; (\text{block area} \ge BlkSizeThres_{LM})) \\ MMLM\ modes & \text{if } ((Y_T - Y_A) > d \;\&\&\; (Y_B - Y_T) > d) \;\&\; (\text{block area} \ge BloSizeThres_{MM})) \end{cases}$$

where $BlkSizeThres_{LM}$ represents the smallest block size of LM modes and $BlkSizeThres_{MM}$ represents the smallest block size of MMLM modes. The symbol d represents a pre-determined threshold value. In one example, d may take a value of 0. In another example, d may take a value of 8.

For chroma intra mode coding, a total of 8 intra modes are allowed for chroma intra mode coding. Those modes include five traditional intra modes and three cross-component linear model modes. Chroma mode signaling and derivation process are shown in Table 1. It is worth noting that for a given CU, if it is coded under linear model mode, whether it is a conventional single model LM mode or a MMLM mode is determined based on the condition check above. Unlike the case shown in Table 6, there are no separate MMLM modes to be signaled. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

Slope Adjustment for CCLM

During ECM development, Slope adjustment for CCLM is proposed.

Basic Principle

CCLM uses a model with 2 parameters to map luma values to chroma values. The slope parameter "a" and the bias parameter "b" define the mapping as follows:

$$chromaVal = a * lumaVal + b$$

It is proposed signal an adjustment "u" to the slope parameter to update the model to the following form:

$$chromaVal = a' * lumaVal + b'$$

where $$a' = a + u$$

$$b' = b - u * y_r$$

With this selection the mapping function is tilted or rotated around the point with luminance value $y_r$. It is proposed to use the average of the reference luma samples used in the model creation as $y_r$ in order to provide a meaningful modification to the model.

Figure 9A:
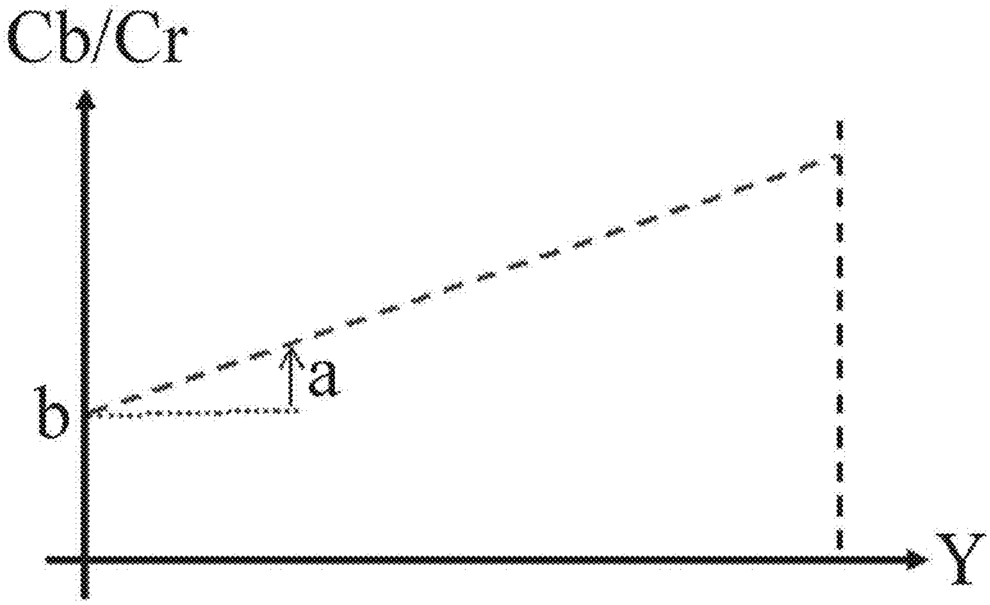
FIGS. 9A to 9B illustrate an example process of slope adjustment for CCLM.
Figure 9B:
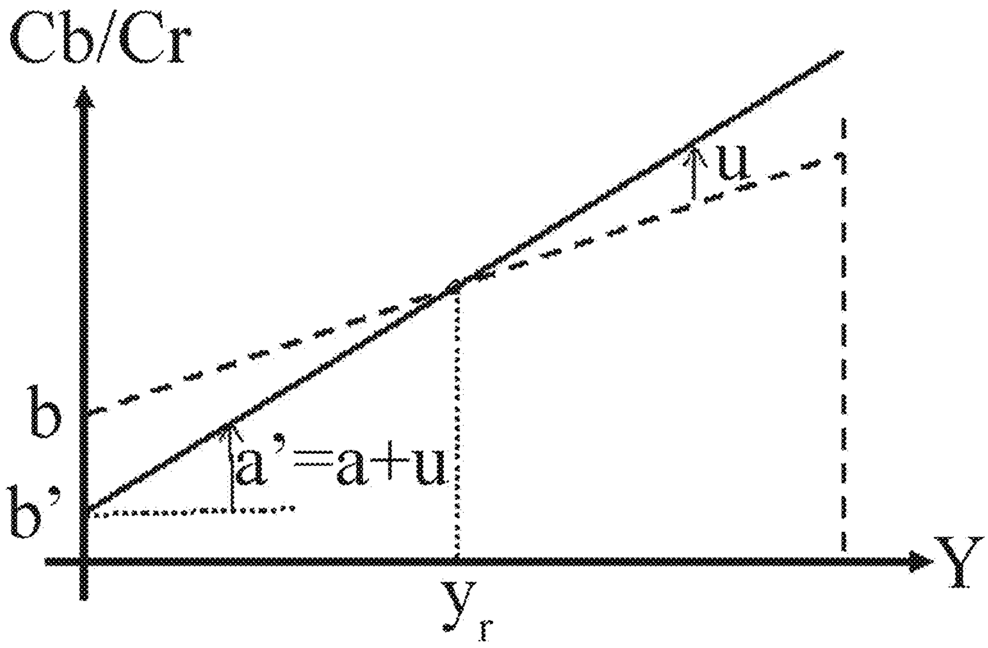

FIGS. 9A to 9B illustrate an example process of slope adjustment for CCLM. FIG. 9A shows a model created with the current CCLM. FIG. 9B shows a model updated as proposed.

Implementation

Slope adjustment parameter is provided as an integer between −4 and 4, inclusive, and signaled in the bitstream. The unit of the slope adjustment parameter is $1/8^{th}$ of a chroma sample value per one luma sample value (for 10-bit content).

Adjustment is available for the CCLM models that are using reference samples both above and left of the block ("LM_CHROMA_IDX" and "MMLM_CHROMA_IDX"), but not for the "single side" modes. This selection is based on coding efficiency vs. complexity trade-off considerations.

When slope adjustment is applied for a multimode CCLM model, both models can be adjusted and thus up to two slope updates are signaled for a single chroma block.

Encoder Approach

The proposed encoder approach performs an SATD based search for the best value of the slope update for Cr and a similar SATD based search for Cb. If either one results as a non-zero slope adjustment parameter, the combined slope adjustment pair (SATD based update for Cr, SATD based update for Cb) is included in the list of RD checks for the TU.

The fusion of chroma intra prediction modes During ECM development, fusion of chroma intra modes is proposed.

INTRODUCTION

The intra prediction modes enabled for the chroma components in ECM-4.0 are six cross-component linear model (LM) modes including CCLM_LT, CCLM_L, CCLM_T, MMLM_LT, MMLM_L and MMLM_T modes, the direct mode (DM), and four default chroma intra prediction modes. The four default modes are given by the list {0, 50, 18, 1} and if the DM mode already belongs to that list, the mode in the list will be replaced with mode 66.

A decoder-side intra mode derivation (DIMD) method for luma intra prediction is included in ECM-4.0. First, a horizontal gradient and a vertical gradient are calculated for each reconstructed luma sample of the L-shaped template of the second neighboring row and column of the current block to build a Histogram of Gradients (HoG). Then, the two intra prediction modes with the largest and the second largest histogram amplitude values are blended with the Planar mode to generate the final predictor of the current luma block.

In order to improve the coding efficiency of chroma intra prediction, two methods are proposed in the last JVET meeting, and studied in EE2 Test 1.2, including a decoder-side derived chroma intra prediction mode (DIMD chroma) and a fusion of a non-LM mode and the MMLM_LT mode.

Test 1.2a: DIMD Chroma Mode

Figure 10:
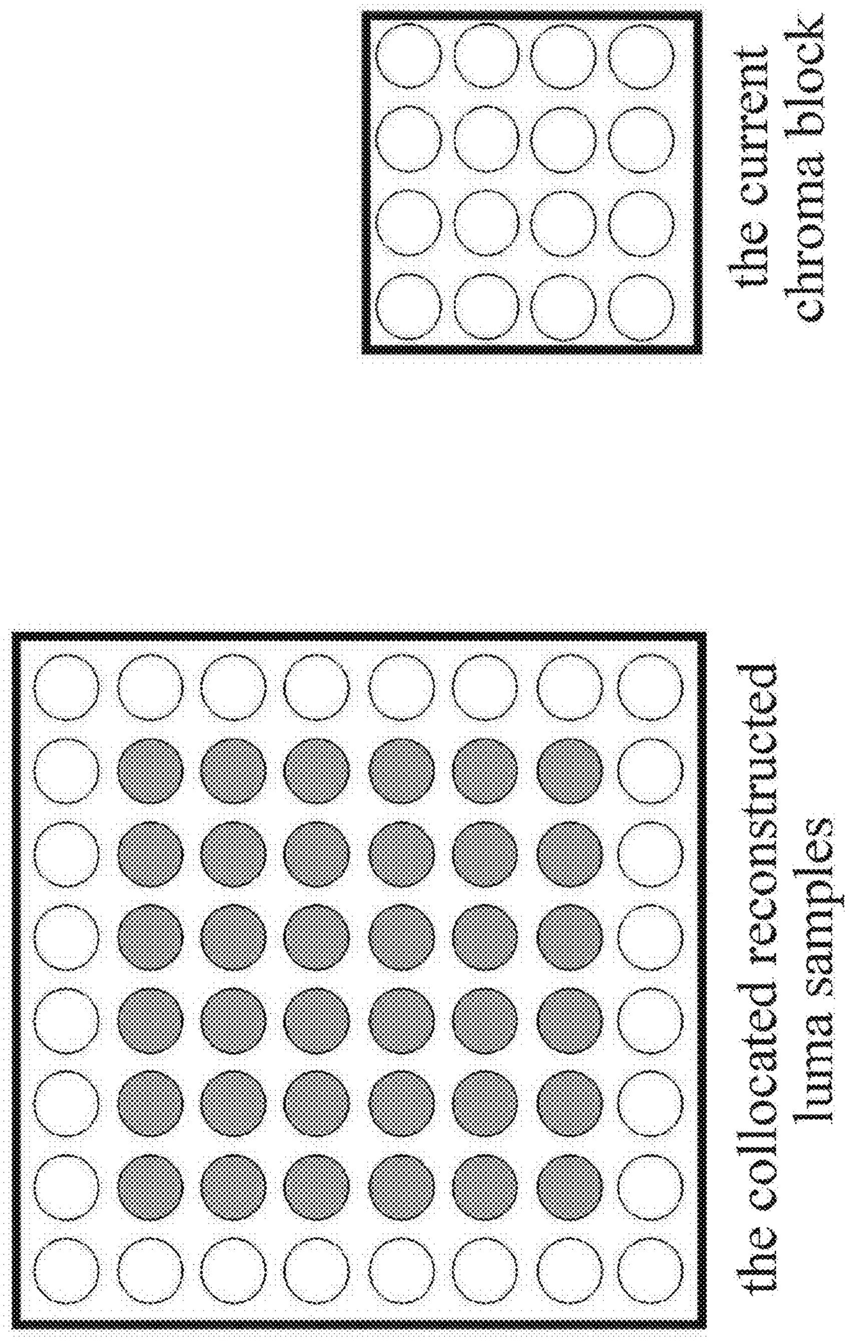
FIG. 10 shows an example of the collocated reconstructed luma samples for a current chroma block.

FIG. 10 shows an example of the collocated reconstructed luma samples for a current chroma block.

In the Test 1.2a, a DIMD chroma mode is proposed. The proposed DIMD chroma mode uses the DIMD derivation method to derive the chroma intra prediction mode of the current block based on the collocated reconstructed luma samples. Specifically, a horizontal gradient and a vertical gradient are calculated for each collocated reconstructed luma sample of the current chroma block to build a HoG, as shown in FIG. 10. Then the intra prediction mode with the largest histogram amplitude values is used for performing chroma intra prediction of the current chroma block.

When the intra prediction mode derived from the DIMD chroma mode is the same as the intra prediction mode derived from the DM mode, the intra prediction mode with the second largest histogram amplitude value is used as the DIMD chroma mode.

A CU level flag is signaled to indicate whether the proposed DIMD chroma mode is applied as shown in Table 7.

TABLE 7

The binarization process for intra_chroma_pred_mode in some embodiments

| intra_chroma_pred_mode | bin string | chroma intra mode |
|---|---|---|
| 0 | 1100 | list[0] |
| 1 | 1101 | list[1] |
| 2 | 1110 | list[2] |

TABLE 7-continued

| The binarization process for intra_chroma_pred_mode in some embodiments | | |
|---|---|---|
| intra_chroma_pred_mode | bin string | chroma intra mode |
| 3 | 1111 | list[3] |
| 4 | 10 | DIMD chroma |
| 5 | 0 | DM |

Test 1.2b: Fusion of Chroma Intra Prediction Modes

In the Test 1.2b, it is proposed that the DM mode and the four default modes can be fused with the MMLM_LT mode as follows:

$$pred = (w0 * pred0 + w1 * pred1 + (1 \ll (\text{shift} - 1))) \gg \text{shift}$$

where pred0 is the predictor obtained by applying the non-LM mode, pred1 is the predictor obtained by applying the MMLM_LT mode and pred is the final predictor of the current chroma block. The two weights, w0 and w1 are determined by the intra prediction mode of adjacent chroma blocks and shift is set equal to 2. Specifically, when the above and left adjacent blocks are both coded with LM modes, {w0, w1}={1, 3}; when the above and left adjacent blocks are both coded with non-LM modes, {w0,w1}={3, 1}; otherwise, {w0, w1}={2, 2}.

For the syntax design, if a non-LM mode is selected, one flag is signaled to indicate whether the fusion is applied. And the proposed fusion is only applied to I slices.

Test 1.2c: Test 1.2a+Test 1.2b

In the Test 1.2c the DIMD chroma mode and the fusion of chroma intra prediction modes are combined. Specifically, the DIMD chroma mode described in Test 1.2a is applied, and for I slices, the DM mode, the four default modes and the DIMD chroma mode can be fused with the MMLM_LT mode using the weights described in Test 1.2b, while for non-I slices, only the DIMD chroma mode can be fused with the MMLM_LT mode using equal weights.

Test 1.2d: Test 1.2a with reduced processing+Test 1.2b

Figure 11:
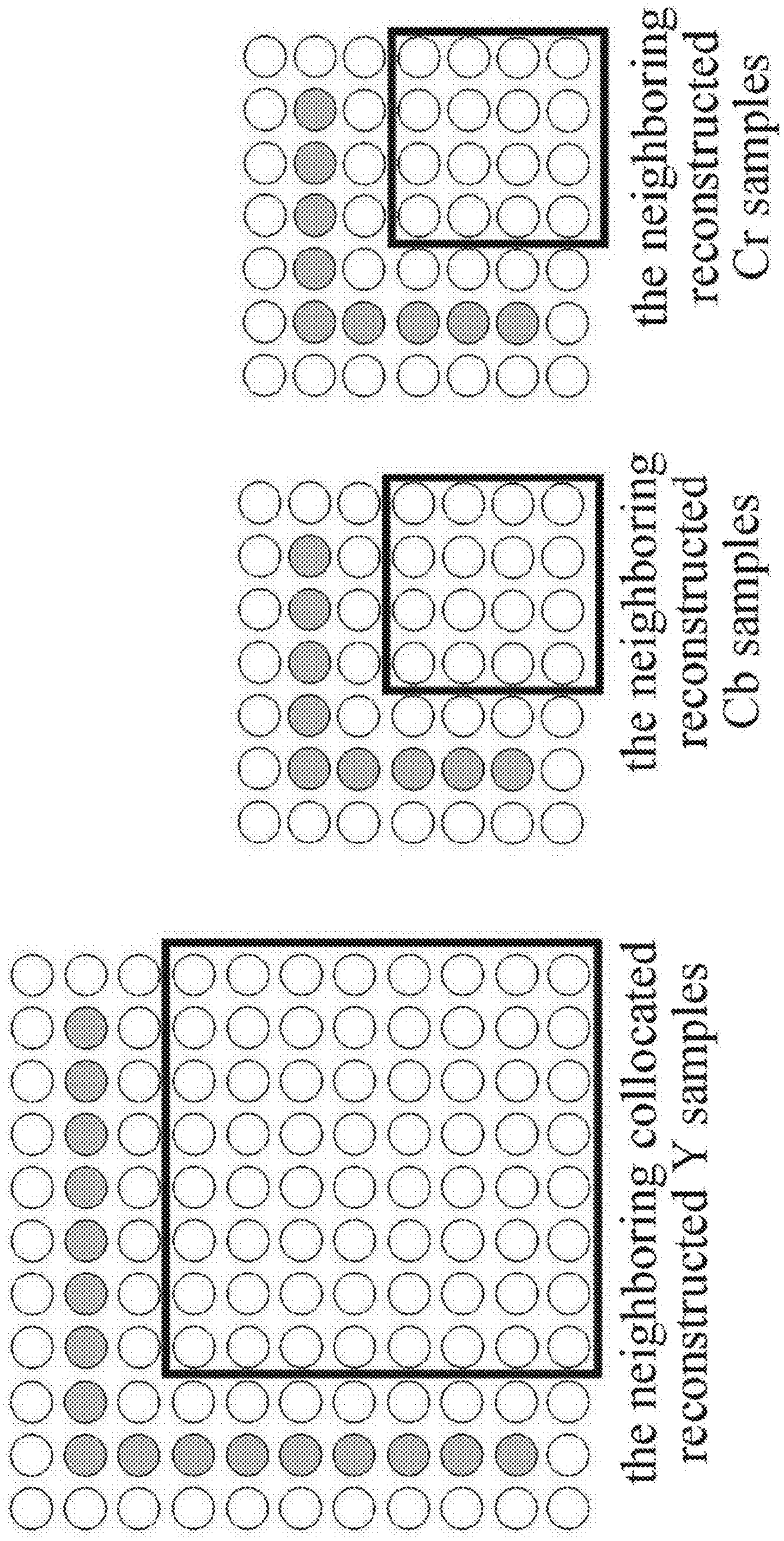
FIG. 11 shows an example of selecting the neighboring reconstructed luma samples and chroma samples.

FIG. 11 shows an example of selecting the neighboring reconstructed luma samples and chroma samples.

In the Test 1.2d the DIMD chroma mode with reduced processing and the fusion of chroma intra prediction modes are combined. Specifically, the DIMD chroma mode with reduced processing derives the intra mode based on the neighboring reconstructed Y, Cb and Cr samples in the second neighboring row and column as shown in FIG. 11. Other parts are the same as Test 1.2c.

Decoder Side Intra Mode Derivation (DIMD)

FIGS. 12A to 12D show an example process of DIMD.

Figure 12A:
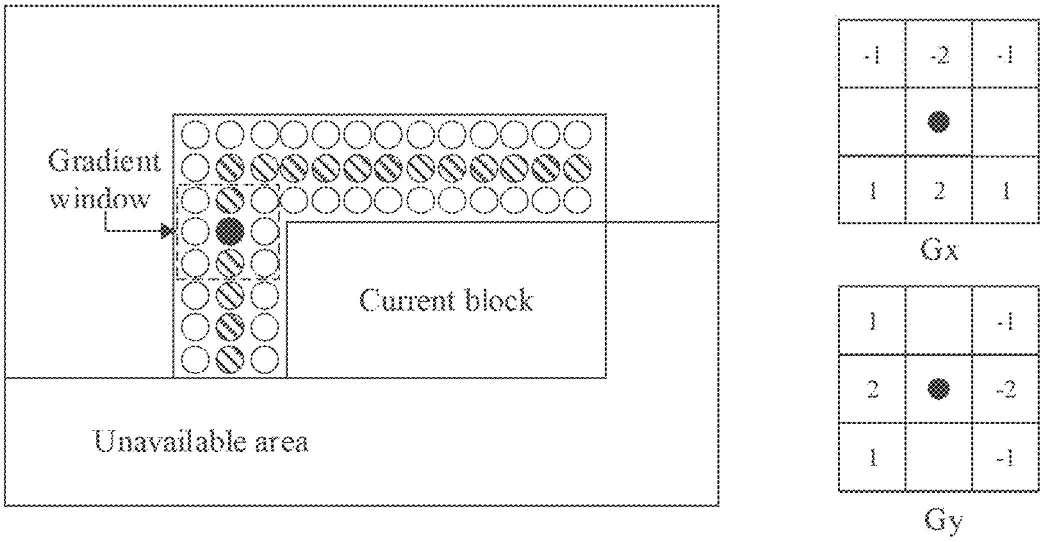
FIGS. 12A to 12D show an example process of Decoder side Intra Mode Derivation (DIMD).
Figure 12B:
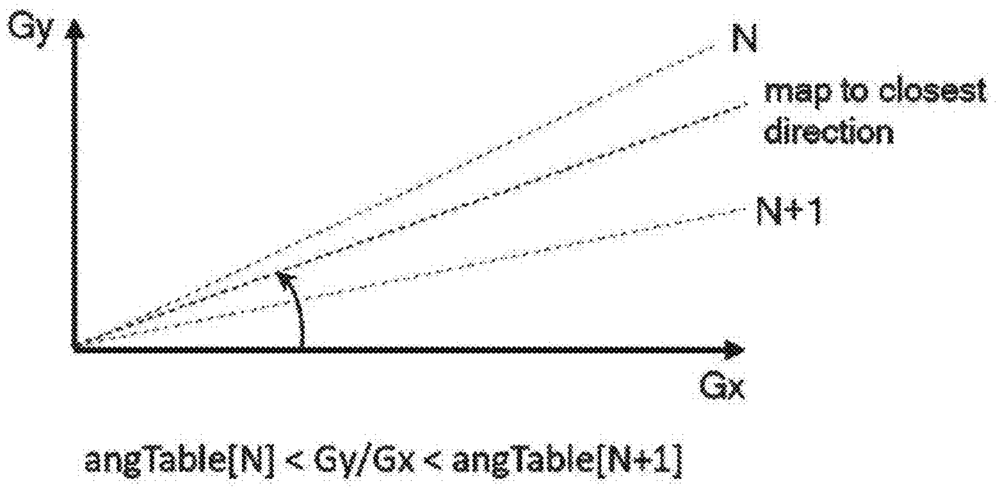
Figure 12C:
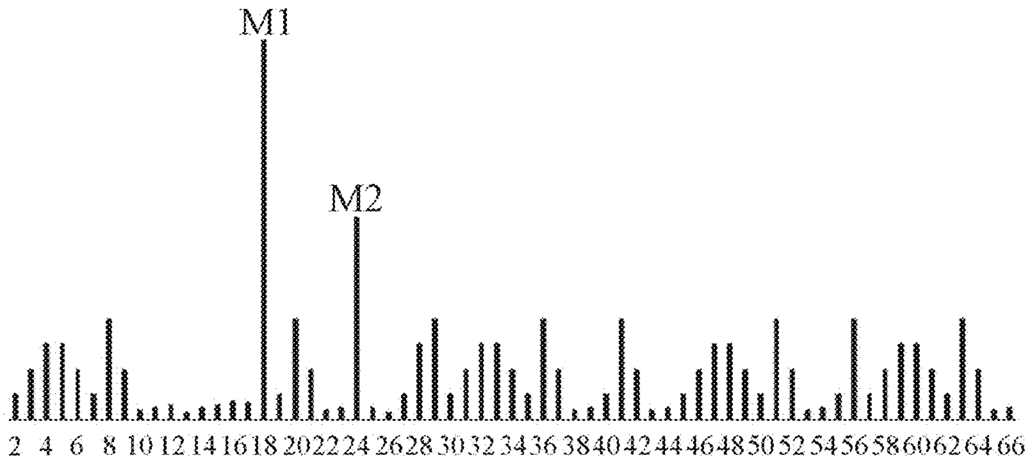
Figure 12D:
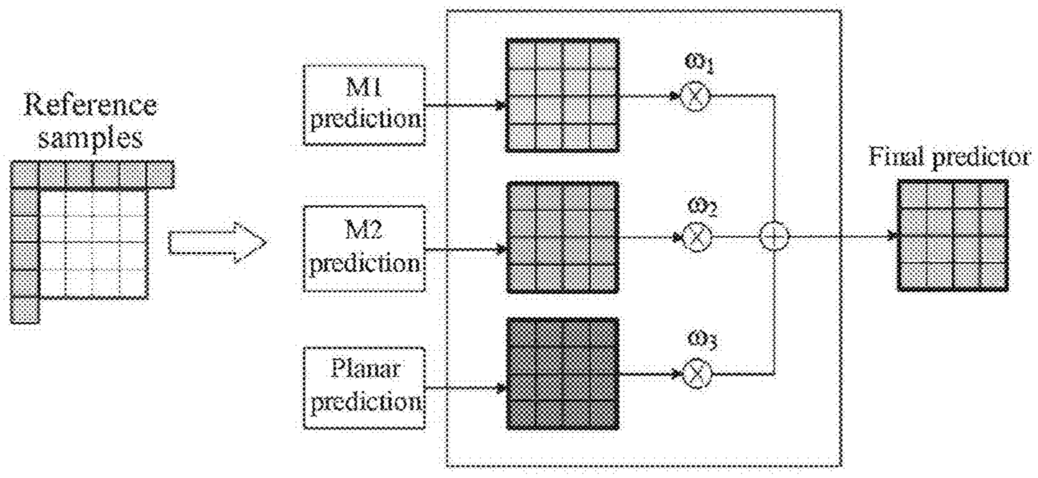

When DIMD is applied, two intra modes are derived from the reconstructed neighbor samples, and those two predictors are combined with the planar mode predictor with the weights derived from the gradients, as shown in FIGS. 12A to 12D. In FIG. 12A, the gradients are estimated per sample (for the shadowed samples). In FIG. 12B, the gradient values are mapped to the closest prediction direction within [2, 66]. In FIG. 12C, for each prediction direction, all absolute gradients Gx and Gy of neighboring pixels with that direction are summed up, and the top 2 directions (M1 and M2) are selected. In FIG. 12D, weighted intra prediction is performed with the selected directions. The division operations in weight derivation is performed utilizing the same lookup table (LUT) based integerization scheme used by the CCLM. For example the division operation in the orientation calculation:

$$Orient = G_y / G_x$$

is computed by the following LUT-based scheme:

$$x = \text{Floor}(\text{Log2}(Gx))$$

$$normDiff = ((Gx \ll 4) \gg x) \,\&\, 15$$

$$x \mathrel{+}= (3 + (normDiff \;!= 0) ? 1 : 0)$$

$$Orient = (Gy * (DivSigTable[normDiff] | 8) + (1 \ll (x - 1))) \gg x$$

where, $$DivSigTable[16] = \{0, 7, 6, 5, 5, 4, 4, 3, 3, 2, 2, 1, 1, 1, 1, 0\}$$

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Multiple Reference Line (MRL) Intra Prediction

Figure 13:
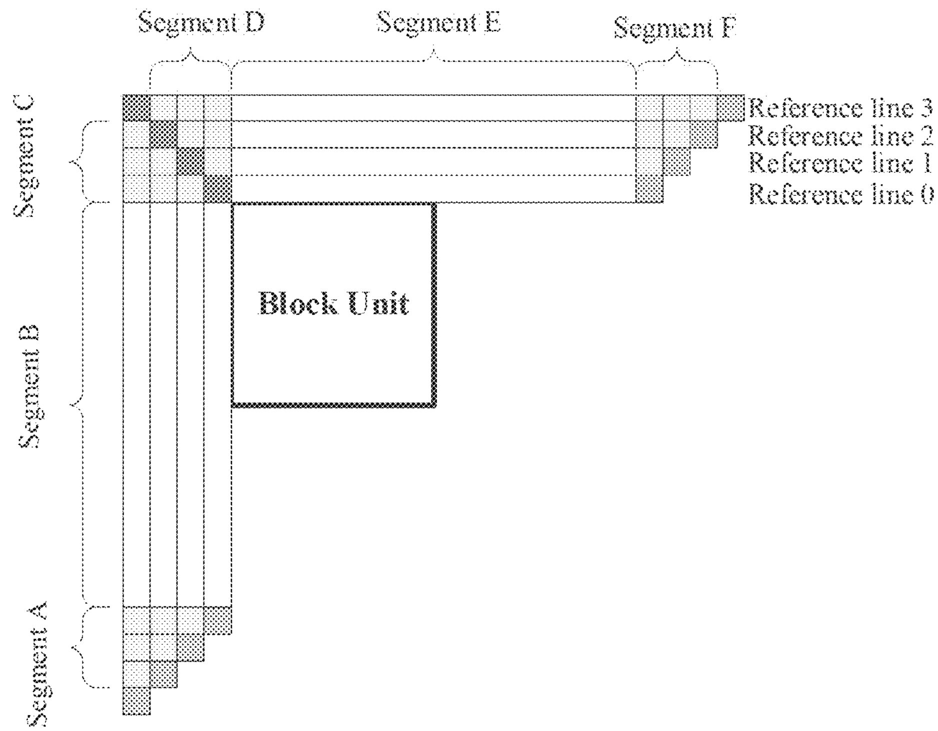
FIG. 13 shows an example of four reference lines neighboring to a prediction block.

FIG. 13 shows an example of four reference lines neighboring to a prediction block.

Multiple reference line (MRL) intra prediction uses more reference lines for intra prediction. In FIG. 13, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line idx, which is greater than 0, only include additional reference line modes in MPM list and only signal mpm index without remaining mode. The reference line index is signaled before intra prediction modes, and Planar mode is excluded from intra prediction modes in case a nonzero reference line index is signaled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices are aligned with that of reference line index 0. MRL requires the storage of 3 neighboring luma reference lines with a CTU to generate predictions. The Cross-Component Linear Model (CCLM) tool also requires 3 neighboring luma reference lines for its down-sampling filters. The definition of MRL to use the same 3 lines is aligned as CCLM to reduce the storage requirements for decoders.

Convolutional Cross-Component Model (CCCM) for Intra Prediction

During ECM development, convolutional cross-component model (CCCM) of chroma intra modes is proposed.

INTRODUCTION

It is proposed to apply convolutional cross-component model (CCCM) to predict chroma samples from reconstructed luma samples in a similar spirit as done by the current CCLM modes. As with CCLM, the reconstructed luma samples are down-sampled to match the lower resolution chroma grid when chroma sub-sampling is used.

Also, similarly to CCLM, there is an option of using a single model or multi-model variant of CCCM. The multi-model variant uses two models, one model derived for samples above the average luma reference value and another model for the rest of the samples (following the spirit of the CCLM design). Multi-model CCCM mode can be selected for PUs which have at least 128 reference samples available.

Convolutional Filter

The proposed convolutional 7-tap filter consists of a 5-tap plus sign shape spatial component, a nonlinear term and a bias term. The input to the 5-tap spatial component of the filter consists of a center (C) luma sample which is collocated with the chroma sample to be predicted and its above/north (N), below/south(S), left/west (W) and right/east (E) neighbors as illustrated in FIG. 14.

Figure 14:
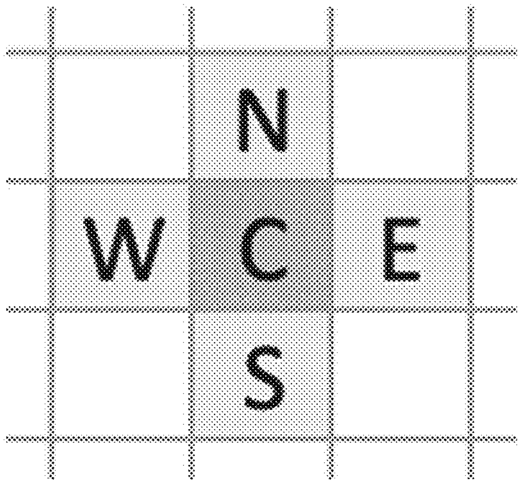
FIG. 14 shows an example of the location of the luma samples in the convolutional filter.

FIG. 14 shows an example of the location of the luma samples in the convolutional filter.

The nonlinear term P is represented as power of two of the center luma sample C and scaled to the sample value range of the content:

$$P = (C * C + midVal) \gg bitDepth$$

That is, for 10-bit content it is calculated as:

$$P = (C^* C + 512) \gg 10$$

The bias term B represents a scalar offset between the input and output (similarly to the offset term in CCLM) and is set to middle chroma value (512 for 10-bit content).

Output of the filter is calculated as a convolution between the filter coefficients $c_i$ and the input values and clipped to the range of valid chroma samples:

$$predChromaVal = c_0 C + c_1 N + c_2 S + c_3 E + c_4 W + c_5 P + c_6 B$$

Calculation of Filter Coefficients

Figure 15:
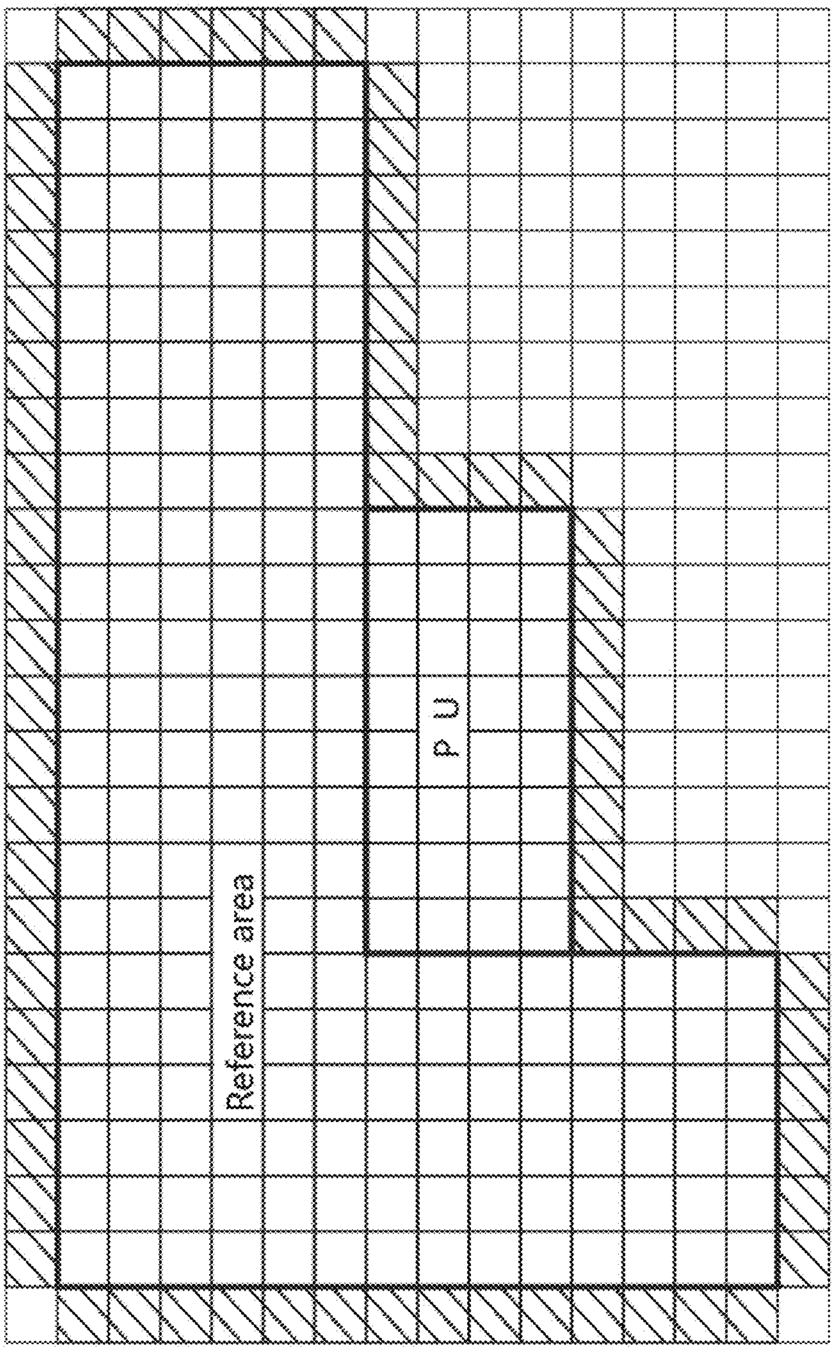
FIG. 15 shows an example of the reference area used to derive the filter coefficient.

The filter coefficients $c_i$ are calculated by minimising MSE between predicted and reconstructed chroma samples in the reference area. FIG. 15 shows an example of the reference area used to derive the filter coefficient. FIG. 15 illustrates the reference area which consists of 6 lines of chroma samples above and left of the PU. Reference area extends one PU width to the right and one PU height below the PU boundaries. Area is adjusted to include only available samples. The extensions to the area shown in shadow are needed to support the "side samples" of the plus shaped spatial filter and are padded when in unavailable areas.

The MSE minimization is performed by calculating autocorrelation matrix for the luma input and a cross-correlation vector between the luma input and chroma output. Autocorrelation matrix is LDL decomposed and the final filter coefficients are calculated using back-substitution. The process follows roughly the calculation of the ALF filter coefficients in ECM, however LDL decomposition was chosen instead of Cholesky decomposition to avoid using square root operations. The proposed approach uses only integer arithmetic.

Bitstream Signalling

Usage of the mode is signaled with a CABAC coded PU level flag. One new CABAC context was included to support this. When it comes to signalling, CCCM is considered a sub-mode of CCLM. That is, the CCCM flag is only signaled if intra prediction mode is LM_CHROMA_IDX (to enable single mode CCCM) or MMLM_CHROMA_IDX (to enable multi-model CCCM).

Encoder Operation

The encoder performs two new RD checks in the chroma prediction mode loop, one for checking single model CCCM mode and one for checking multi-model CCCM mode.

Inefficiencies with Video Coding

For the existing MMLM design, the neighboring reconstructed luma/chroma sample pairs are classified into two groups based on the value Threshold, which only considers the luma DC values. That is, a luma/chroma sample pair is classified by only considering the intensity of one luma sample. However, luma component usually preserves abundant textures, and the current sample may be highly correlated with neighboring samples, such inter-sample correlation (AC correlation) may benefit the classification of luma/chroma sample pairs and can bring additional coding efficiency.

Figure 16B:
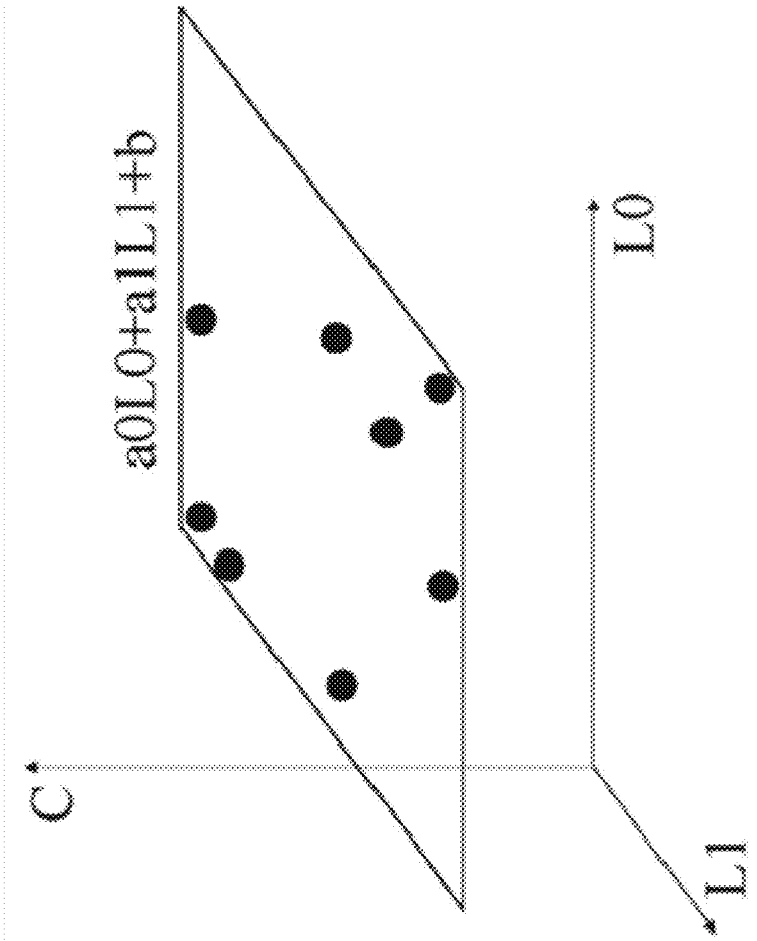
FIGS. 16A to 16B show an example that one chroma sample simultaneously correlates to multiple luma samples.
Figure 16A:
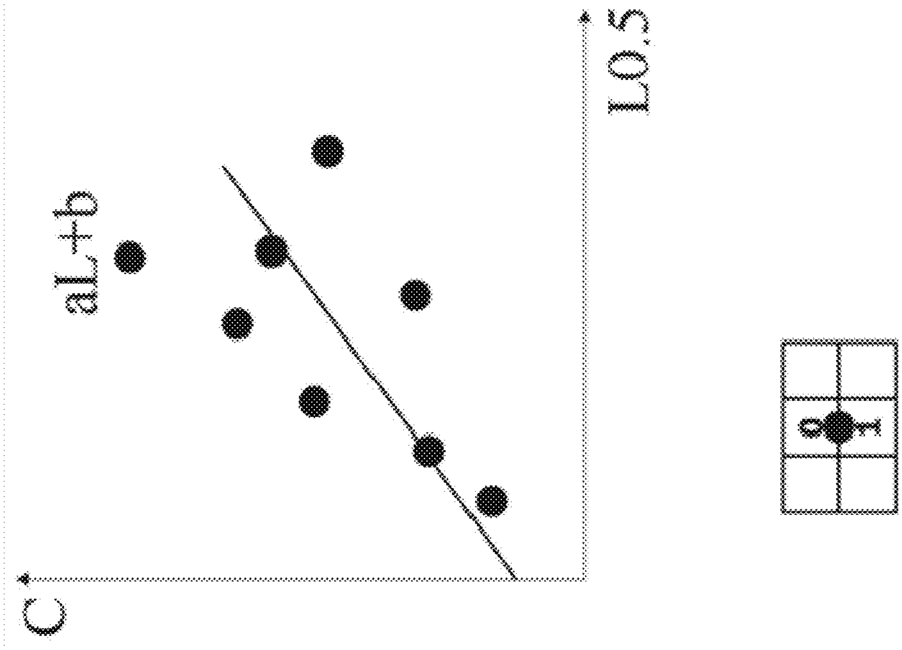

Furthermore, FIGS. 16A to 16B shows an example that one chroma sample simultaneously correlates to multiple luma samples.

As shown in FIG. 16A, the CCLM assumes a given chroma sample only correlates to a corresponding luma sample (L0.5, which can be taken as the fractional luma sample position), and a simple linear regression (SLR) with ordinary least squares (OLS) estimation is used to predict the given chroma sample. However, as shown in FIG. 16B, in some video content, one chroma sample may simultaneously correlate to multiple luma samples (AC or DC correlation), so a multiple linear regression (MLR) model may further improve the prediction accuracy.

Although the CCCM mode can enhance the intra prediction efficiency, there is room to further improve its performance. Meanwhile, some parts of the existing CCCM mode also need to be simplified for efficient codec hardware implementations or improved for better coding efficiency. Furthermore, the tradeoff between its implementation complexity and its coding efficiency benefit needs to be further improved.

Edge-Classified Linear Model (ELM)

The disclosure improves the coding efficiency of luma and chroma components, with similar design spirit of MMLM but introduce classifiers considering luma edge/AC information. Besides the existing band-classified MMLM, this disclosure provides the proposed classifier examples. The process of generating prediction chroma samples is the same as MMLM (original least square method, simplified min-max method . . . etc.), but with different classification method.

Please note that though the existing CCLM design in the VVC standard is used as the basic CCLM method in the following description, to a person skilled in the art of video coding, the proposed cross-component method described in the disclosure can also be applied to other prediction coding tools with similar design spirits. For example, for the chroma from luma (CfL) in the AV1 standard, the proposed ELM can also be applied by dividing luma/chroma sample pairs into multiple groups.

Note Y/Cb/Cr also can be denoted as Y/U/V in video coding area.

Note if the video is RGB format, the proposed ELM can also be applied by simply mapping YUV notation to GBR in the below paragraphs, for example.

Note the figures in this disclosure can be combined with all examples mentioned in this disclosure.

In some embodiments, a method of decoding video signal is provided, comprising: receiving an encoded block of luma samples for a first block of video signal; decoding the encoded block of luma samples to obtain reconstructed luma samples; classifying the reconstructed luma samples into plural sample groups based on direction and strength of edge information; applying different linear prediction models to the reconstructed luma samples in different sample groups; and predicting chroma samples for the first block of video signal based on the applied linear prediction models.

Classification

Classifier C0: Denote the existing MMLM threshold-based classifier as C0, which yields 2 classes.

Classifier C1: Local Binary Pattern (LBP)

First, compare the current sample Y0 with neighboring N samples Yi.

Second, if Y0>Yi, score+=1; else if Y0<Yi, score−=1.

Third, quantize the score to form K classes.

Fourth, use K classes to classify the current sample.

For an example of Classifier C1:

First, compare the current sample Y0 with neighboring 4 samples Yi (without diagonal)

Second, if Y0>Yi, score+=1; else if Y0<Yi, score−=1.

Third, quantize the score to form 3 classes: (score>0, =0, <0).

Fourth, use 3 classes to classify the current sample.

Classifier C2:

First, select one direction to calculate edge strengths. The direction is formed by the current and N neighboring samples along the direction. One edge strength is calculated by subtracting the current sample and one neighbor sample.

Second, quantize the edge strength into M segments by M−1 thresholds Ti.

Third, use K classes to classify the current sample.

For an example of Classifier C2:

First, one direction is bound according to MMLM mode. For example, MMLM_L: ver, MMLM_A: hor, MMLM: use C0. The direction is formed by the current and 1 neighboring samples along the direction. The edge strength is calculated by subtracting the current sample and the neighbor sample.

Second, quantize the edge strength into 2 segments by 1 simple threshold 0. (>0, <=0).

Third, use 2 classes to classify the current sample.

Figure 21:
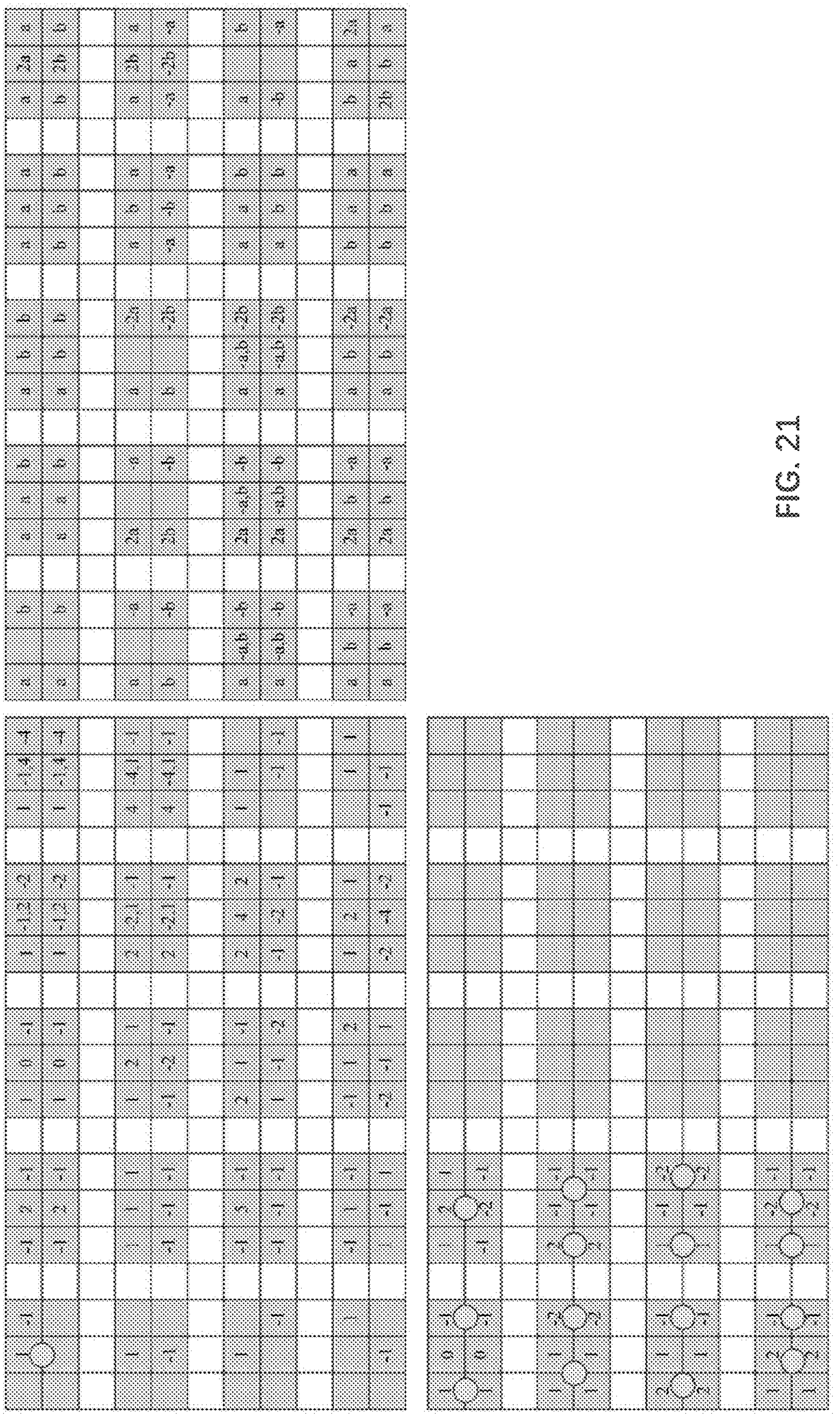
FIG. 21 shows examples of 1-tap/2-tap pre-operations.

Classifier C3:

First, as shown in FIG. 21, select one edge detection filter shape (e.g., 1-tap) to calculate edge strengths. The direction is formed by the current and N neighboring samples along the direction. One edge strength is calculated by the filtered value.

Second, quantize the edge strength into M segments by M−1 thresholds Ti. (or using a mapping table). The filter shape, filter taps, and mapping table can be predefined or signaled/switched in SPS/DPS/VPS/SEI/APS/PPS/PH/SH/Region/CTU/CU/Subblock/Sample level.

Third, use K classes to classify the current sample. (e.g., K=M).

The abovementioned classifiers can be combined to form a joint classifier. For example, combining C0 and C2, which yields 2*2 classes. For example, combining C2 and C2 but with different bound directions (MMLM_L: hor, MMLM_A: ver,), which yields 2*2 classes.

The to-be-classified luma samples can be down-sampled first to align CCLM design.

Sample Processing

As shown in FIG. 5, for a to-be-predicted chroma block with collocated luma block:

First, reconstruct collocated luma block samples.

Second, down-sample collocated neighboring luma samples (gray).

Third, classify the neighboring luma/chroma sample pairs based on classifiers described in the embodiments in this disclosure.

Fourth, derive different linear models for different classes.

Fifth, apply different linear models to the reconstructed luma samples in different classes.

Sixth, predict chroma samples based on the applied linear prediction models.

Filter-Based Linear Model (FLM)

For a to-be-predicted chroma sample, the reconstructed collocated and neighboring luma samples can be used to predict the chroma sample, to capture the inter-sample correlation among the collocated luma sample, neighboring luma samples, and the chroma sample. The reconstructed luma samples are linear weighted and combined with one "offset" to generate the predicted chroma sample (C: predicted chroma sample, $L_i$: i-th reconstructed collocated or neighboring luma samples, $\alpha_i$: filter coefficients, β: offset, N: filter taps). Note the linear weighted plus offset value directly forms the predicted chroma sample (can be low pass, high pass adaptively according to video content), and it is then added by the residual to form the reconstructed chroma sample.

$$C = \sum_{i=0}^{N-1} \alpha_i \cdot L_i + \beta$$

Figure 17:
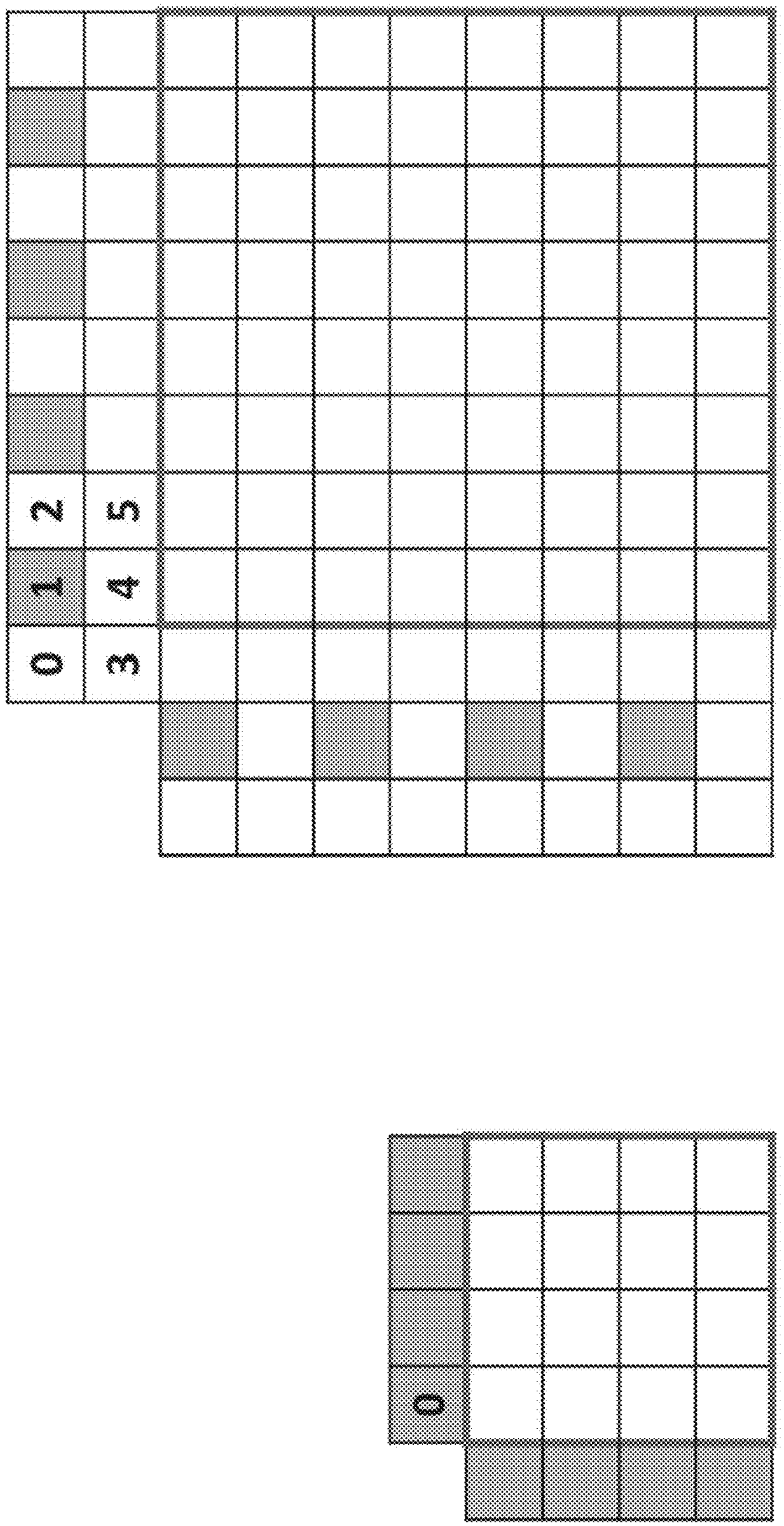
FIG. 17 shows an example of luma samples and chroma samples used to derive the parameters of prediction models.

For a given CU, the top and left reconstructed luma/chroma samples can be used to derive/train the FLM parameters ($\alpha_i$, β). Like CCLM, $\alpha_i$ and β can be derived via OLS. The top and left training samples are collected, and one pseudo inverse matrix is calculated at both encoder/decoder side to derive the parameters, which are then used to predict the chroma samples in the given CU. Let N denotes the number of filter taps applied on luma samples, M denotes the total top and left reconstructed luma/chroma sample pairs used for training parameters, $$L_j^i$$

denotes luma sample with the i-th sample pair and the j-th filter tap, $C^i$ denotes the chroma sample with the i-th sample pair, the following equations show the derivation of the pseudo inverse matrix $A^+$, and also the parameters. FIG. 17 shows an example that N is 6 (6-tap), M is 8, top 2 rows/left 3 columns luma samples and top 1 row/left 1 column chroma samples are used to derive/train the parameters.

$$C^0 = \alpha_0 \cdot L_0^0 + \alpha_1 \cdot L_1^0 + \cdots \alpha_{N-1} \cdot L_{N-1}^0 + \beta$$

$$C^1 = \alpha_0 \cdot L_0^1 + \alpha_1 \cdot L_1^1 + \cdots \alpha_{N-1} \cdot L_{N-1}^1 + \beta$$

-continued $$\vdots$$

$$C^{M-1} = \alpha_0 \cdot L_0^{M-1} + \alpha_1 \cdot L_1^{M-1} + \cdots \alpha_{N-1} \cdot L_{N-1}^{M-1} + \beta$$

$$\begin{bmatrix} C^0 \\ C^1 \\ \vdots \\ \vdots \\ C^{M-1} \end{bmatrix} = \begin{bmatrix} L_0^0 & L_1^0 & \cdots & L_{N-1}^0 & 1 \\ L_0^1 & L_1^1 & \cdots & L_{N-1}^1 & 1 \\ \vdots & \vdots & \cdots & \vdots & \\ \vdots & \vdots & \cdots & \vdots & \vdots \\ L_0^{M-1} & L_1^{M-1} & \cdots & L_{N-1}^{M-1} & 1 \end{bmatrix} \begin{bmatrix} \alpha_0 \\ \alpha_1 \\ \vdots \\ \alpha_{N-1} \\ \beta \end{bmatrix}$$

$$b = Ax$$

$$x = (A^T A)^{-1} A^T b = A^+ b$$

In some embodiments, one can predict the chroma sample by only $\alpha_i$ without the offset β, which is a subset of the above embodiments.

In some embodiments, though the existing CCLM design in the VVC standard is used as the basic CCLM method in the following description, to a person skilled in the art of video coding, the proposed cross-component method described in the disclosure can also be applied to other prediction coding tools with similar design spirits. For example, for the chroma from luma (CfL) in the AV1 standard, the proposed FLM can also be applied by including multiple luma samples to the MLR model.

In some implementations, the proposed ELM/FLM/GLM can be extended straightforwardly to the CfL design in the AV1 standard, which transmits model parameters (α, β) explicitly. For example, (1-tap case) deriving α and/or β at encoder at SPS/DPS/VPS/SEI/APS/PPS/PH/SH/Region/CTU/CU/Subblock/Sample levels, and signaled to decoder for the CfL mode.

In some examples, Y/Cb/Cr also can be denoted as Y/U/V in video coding area.

In some examples, if the video is RGB format, the proposed FLM can also be applied by simply mapping YUV notation to GBR in the below paragraphs, for example.

In some variants, the figures in this disclosure can be combined with all examples mentioned in this disclosure.

In some embodiments, a method of decoding video signal is provided, comprising: receiving an encoded block of luma samples for a first block of video signal; decoding the encoded block of luma samples to obtain reconstructed luma samples; determining a luma sample region and a chroma sample region to derive a multiple linear regression (MLR) model; deriving the MLR model by pseudo inverse matrix calculation; applying the MLR model to the reconstructed luma samples; and predicting chroma samples for the first block of video signal based on the applied MLR model.

Filter Shape

FIG. 17 shows an example of luma samples and chroma samples used to derive the parameters of prediction models.

As shown in FIG. 17, a 6-tap luma filter is used for the FLM prediction. However, though a multiple tap filter can fit well on training data (i.e., top/left neighboring reconstructed luma/chroma samples), in some cases that training data do not capture full characteristics of testing data, it may result in overfitting and may not predict well on testing data (i.e., the to-be-predicted chroma block samples). Also, different filter shapes may adapt well to different video block content, leading to more accurate prediction.

To address this issue, the filter shape/number of filter taps can be predefined or signaled/switched in SPS/DPS/VPS/SEI/APS/PPS/PH/SH/Region/CTU/CU/Subblock/Sample levels. A set of filter shape candidates can be predefined or signaled/switched in SPS/DPS/VPS/SEI/APS/PPS/PH/SH/Region/CTU/CU/Subblock/Sample levels. Different components (U/V) may have different filter switch control. For example, predefined a set of filter shape candidates (idx=0~5), and filter shape (1, 2) denotes a 2-tap luma filter, (1, 2, 4) denotes a 3-tap luma filter as shown in FIG. 17 . . . etc., the filter shape selection of U/V components can be switched in PH or in CU/CTU levels. Note N-tap can represent N-tap with or without the offset β as descripted in the above embodiments regarding FLM.

| | predefined filter shape candidates: | | # of filter taps | filter shape |
|---|---|---|---|---|
| | idx | 0 | 2 | (1, 2) |
| | idx | 1 | 2 | (1, 4) |
| | idx | 2 | 2 | (1, 5) |
| | idx | 3 | 3 | (1, 2, 4) |
| | idx | 4 | 4 | (1, 2, 4, 5) |
| | idx | 5 | 6 | (0, 1, 2, 3, 4, 5) |
| POC | comp | selected filter shape idx | | |
| 0 | U | 3 | PH switch | |
| | V | 0~5 | CU switch | |
| 1 | U | 4 | PH switch | |
| | V | 0~2 | CTU switch | |

Figure 18:
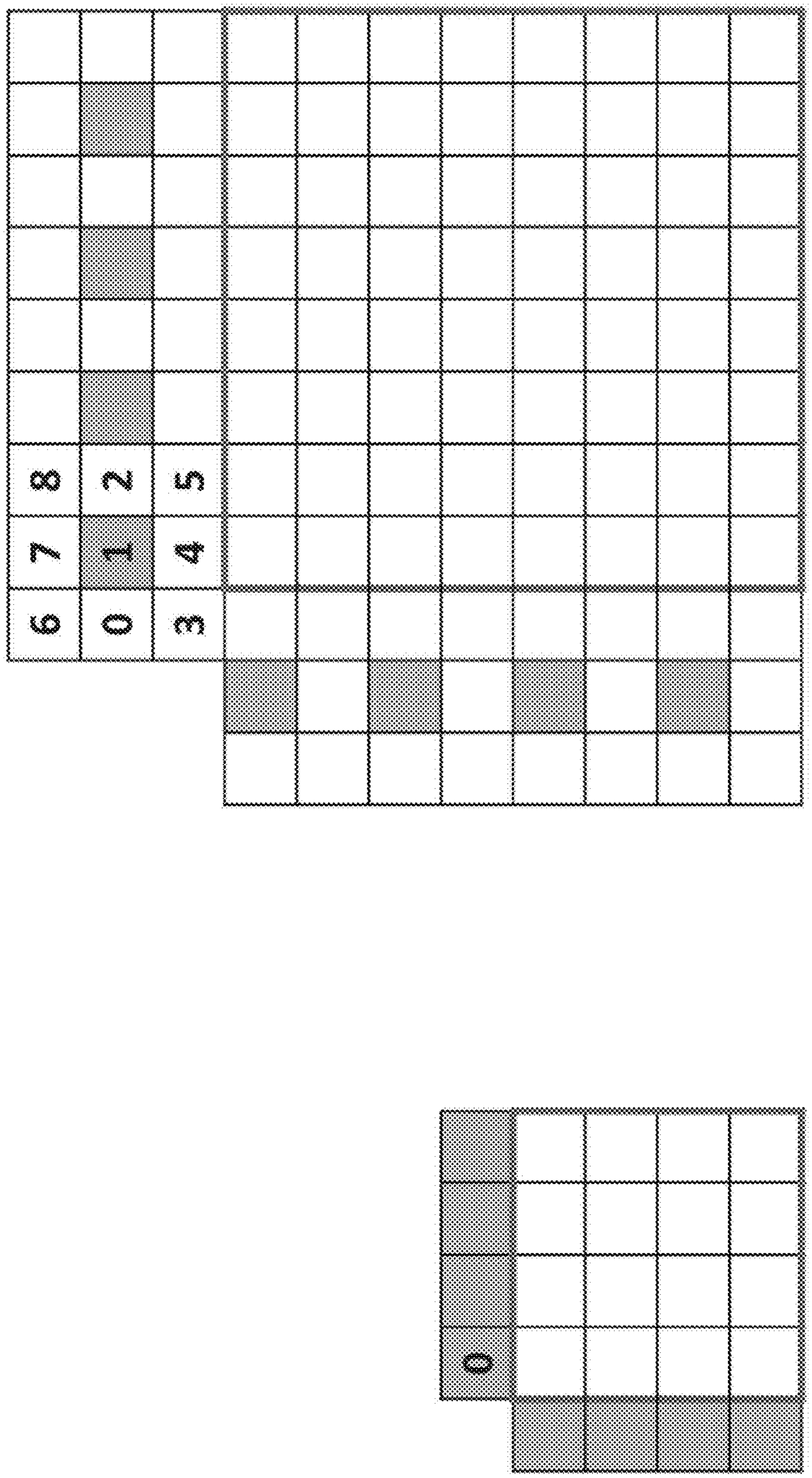
FIG. 18 shows another example of luma samples and chroma samples used to derive the parameters of prediction models.

FIG. 18 shows an example of luma samples and chroma samples used to derive the parameters of prediction models.

Different chroma types/color formats can have different predefined filter shapes/taps. For example, using predefined filter shape for 420 type-0: (1, 2, 4, 5), 420 type-2: (0, 1, 2, 4, 7), 422: (1, 4), 444: (0, 1, 2, 3, 4, 5) as shown in FIG. 18.

The unavailable luma/chroma samples for deriving the MLR model can be padded from available reconstructed samples. For example, if using a 6-tap (0, 1, 2, 3, 4, 5) filter as in FIG. 18, for a CU located at the left picture boundary, the left columns including (0, 3) are not available (out of picture boundary), so (0, 3) are repetitive padding from (1, 4) to apply the 6-tap filter. Note the padding process applied in both training data (top/left neighboring reconstructed luma/chroma samples) and testing data (the luma/chroma samples in the CU).

Figure 22:
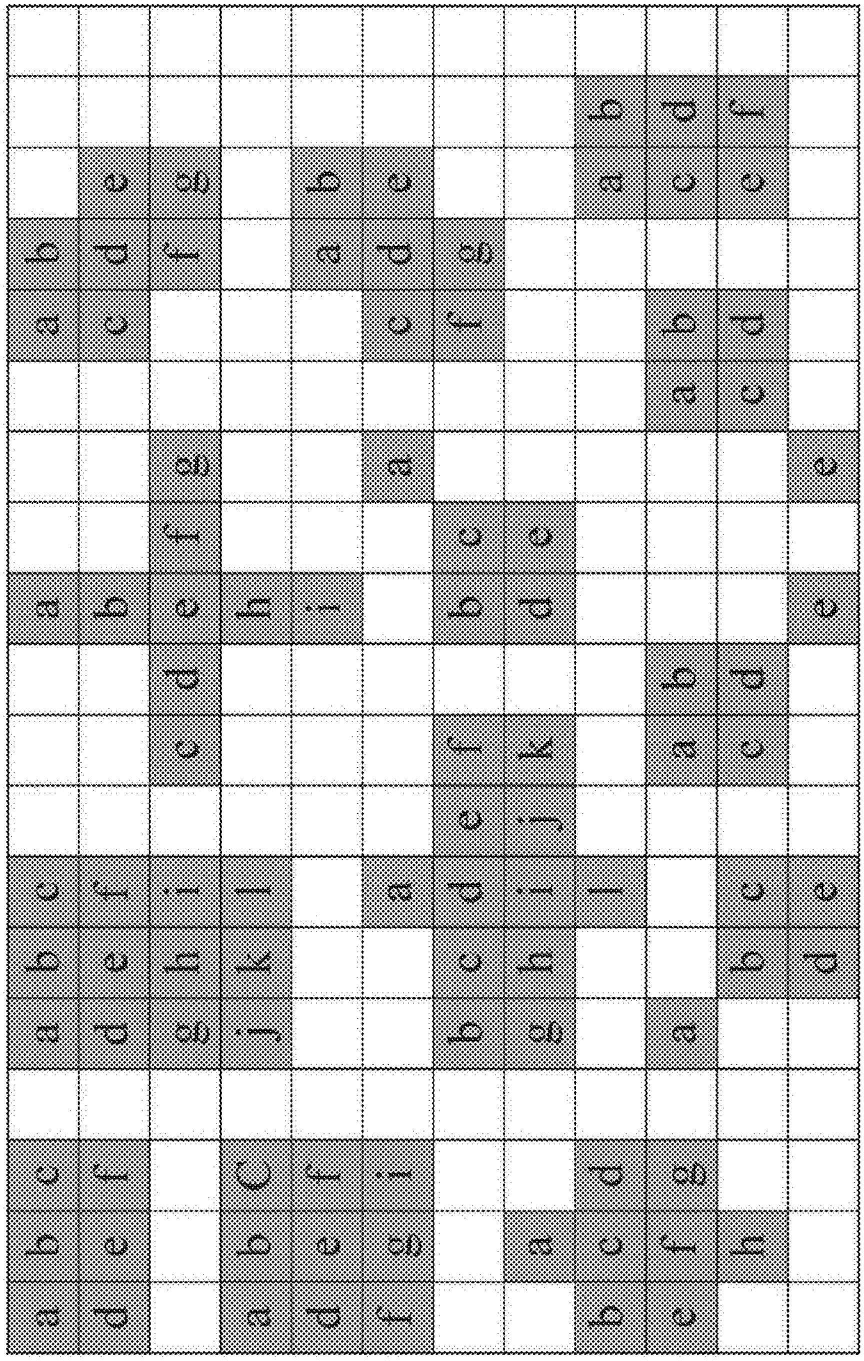
FIG. 22 shows examples of different filter shapes and numbers of filter taps.

FIG. 22 shows examples of different filter shapes and numbers of filter taps. It is to be understood that in FIG. 22 each cluster of solid blocks labelled with letters in alphabetic sequence represents an individual filter, and that different filters are shown together in this figure for ease of illustration.

One or more shape/number of filter taps may be used for FLM prediction, examples as shown in FIG. 22

Matrix Derivation

As descripted in the above embodiments regarding FLM, an MLR model (linear equations) must be derived at both encoder/decoder. In this section, several methods are proposed to derive the pseudo inverse matrix $A^+$, or to directly solve the linear equations. Other known methods like Newton's method, Cayley-Hamilton method, and Eigendecomposition as mentioned in https://en.wikipedia.org/wiki/Invertible_matrix can also be applied.

Please note the in this section, $A^+$ is denoted as $A^{-1}$ for simplification.

In some embodiments, solving $A^{-1}$ by adjugate matrix (adjA), closed form, analytic solution. In some examples, below shows one n×n general form, one 2×2 and one 3×3 cases. If FLM uses 3×3, 2 scalers plus one offset need be solved.

$$b = Ax,\ x = \left(A^T A\right)^{-1} A^T b = A^+ b,\ \text{denoted as } A^{-1}b \text{ in this section}$$

$$A^{-1} = \frac{1}{\det A} adj\ A (adj\ A)_{ij} = (-1)^{i+j} \det \tilde{A}_{ji}$$

$$A_{ji} : (n-1) \times (n-1) \text{ submatrix by removing } j\text{-}th \text{ row and } i\text{-}th \text{ column}$$

$$A^{-1} = \begin{bmatrix} a & b \\ c & d \end{bmatrix}^{-1} = \frac{1}{\det A} \begin{bmatrix} \tilde{A}_{11} & -\tilde{A}_{21} \\ -\tilde{A}_{12} & \tilde{A}_{22} \end{bmatrix} = \frac{1}{\det A} \begin{bmatrix} d & -b \\ -c & a \end{bmatrix},$$

$$A^{-3} = \begin{bmatrix} a_{11} & a_{12} & a_{13} \\ a_{21} & a_{21} & a_{23} \\ a_{31} & a_{32} & a_{33} \end{bmatrix}^{-1} = \frac{1}{\det A} \begin{bmatrix} \begin{vmatrix} a_{22} & a_{23} \\ a_{32} & a_{33} \end{vmatrix} & -\begin{vmatrix} a_{12} & a_{13} \\ a_{32} & a_{33} \end{vmatrix} & \begin{vmatrix} a_{12} & a_{13} \\ a_{22} & a_{23} \end{vmatrix} \\ -\begin{vmatrix} a_{21} & a_{22} \\ a_{32} & a_{33} \end{vmatrix} & \begin{vmatrix} a_{11} & a_{13} \\ a_{31} & a_{33} \end{vmatrix} & \begin{vmatrix} a_{11} & a_{13} \\ a_{21} & a_{23} \end{vmatrix} \\ \begin{vmatrix} a_{21} & a_{22} \\ a_{31} & a_{32} \end{vmatrix} & -\begin{vmatrix} a_{11} & a_{12} \\ a_{31} & a_{32} \end{vmatrix} & \begin{vmatrix} a_{11} & a_{12} \\ a_{22} & a_{22} \end{vmatrix} \end{bmatrix}$$

In some embodiments, the linear equations can be solved using Gauss-Jordan elimination, by an augmented matrix [A $I_n$] and a series of elementary row operation to obtain the reduced row echelon form [I|X]. Below shows 2×2 and 3×3 examples.

$$\left[\begin{array}{cc|cc} a & b & 1 & 0 \\ c & d & 0 & 1 \end{array}\right] \rightarrow \left[\begin{array}{cc|cc} a & b & 1 & 0 \\ 0 & ad-bc & -e & a \end{array}\right] \rightarrow \left[\begin{array}{cc|cc} a & b & 1 & 0 \\ 0 & 1 & \frac{-e}{ad-bc} & \frac{a}{ad-bc} \end{array}\right] \rightarrow \left[\begin{array}{cc|cc} a & 0 & \frac{ad}{ad-bc} & \frac{-ab}{ad-bc} \\ 0 & 1 & \frac{-e}{ad-bc} & \frac{a}{ad-bc} \end{array}\right]$$

$$\rightarrow \left[\begin{array}{cc|cc} 1 & 0 & \frac{d}{ad-bc} & \frac{-b}{ad-bc} \\ 0 & 1 & \frac{-c}{ad-bc} & \frac{a}{ad-bc} \end{array}\right]$$

$$\left[\begin{array}{ccc|ccc} 2 & 2 & 5 & 1 & 0 & 0 \\ -2 & 1 & 2 & 0 & 1 & 0 \\ 6 & 3 & 9 & 0 & 0 & 1 \end{array}\right] \rightarrow \left[\begin{array}{ccc|ccc} 2 & 2 & 5 & 1 & 0 & 0 \\ 0 & 3 & 7 & 1 & 1 & 0 \\ 0 & -3 & -6 & -3 & 0 & 1 \end{array}\right] \rightarrow \left[\begin{array}{ccc|ccc} 2 & 2 & 5 & 1 & 0 & 0 \\ 0 & 3 & 7 & 1 & 1 & 0 \\ 0 & 0 & 1 & -2 & 1 & 1 \end{array}\right]$$

$$\rightarrow \left[\begin{array}{ccc|ccc} 2 & 2 & 0 & 11 & -5 & -5 \\ 0 & 3 & 0 & 15 & -6 & -7 \\ 0 & 0 & 1 & -2 & 1 & 1 \end{array}\right] \rightarrow \left[\begin{array}{ccc|ccc} 2 & 2 & 0 & 11 & -5 & -5 \\ 0 & 1 & 0 & 5 & -2 & -7 \\ 0 & 0 & 1 & -2 & 1 & 1 \end{array}\right] \rightarrow$$

$$\left[\begin{array}{ccc|ccc} 2 & 0 & 0 & 1 & -1 & -\frac{1}{5} \\ 0 & 1 & 0 & 5 & -2 & -\frac{7}{3} \\ 0 & 0 & 1 & -2 & 1 & 1 \end{array}\right] \rightarrow \left[\begin{array}{ccc|ccc} 1 & 0 & 0 & \frac{1}{2} & -\frac{1}{2} & -\frac{1}{6} \\ 0 & 1 & 0 & 5 & -2 & -\frac{7}{3} \\ 0 & 0 & 1 & -2 & 1 & 1 \end{array}\right]$$

In some embodiments, to solve Ax=b, A can be firstly decomposed by Cholesky-Crout algorithm, leading to one upper triangular and one lower triangular matrices, and one forward substitution plus one backward substitution can be applied in serial to obtain the solution. Below shows a 3×3 example.

$$A = \begin{bmatrix} a_{11} & a_{12} & a_{13} \\ a_{21} & a_{22} & a_{23} \\ a_{31} & a_{32} & a_{33} \end{bmatrix} = GG^T = \begin{bmatrix} g_{11} & 0 & 0 \\ g_{21} & g_{22} & 0 \\ g_{31} & g_{32} & g_{33} \end{bmatrix} \begin{bmatrix} g_{11} & g_{21} & g_{31} \\ 0 & g_{22} & g_{32} \\ 0 & 0 & g_{33} \end{bmatrix} = \begin{bmatrix} g_{11}^2 & g_{21}g_{11} & g_{31}g_{11} \\ g_{21}g_{11} & g_{22}^2 + g_{33}^2 & g_{31}g_{21} + g_{32}g_{22} \\ g_{31}g_{11} & g_{11}g_{21} + g_{32}g_{22} & g_{33}^2 + g_{32}^2 + g_{33}^2 \end{bmatrix}$$

$$g_{11} = \sqrt{a_{11}}$$

$$g_{21} = \frac{a_{21}}{g_{11}}$$

-continued $$g_{31} = \frac{a_{31}}{g_{11}}$$

$$g_{22} = \sqrt{a_{22} - g_{31}^2}$$

$$g_{32} = \frac{1}{g_{22}}(a_{32} - g_{31}g_{21})$$

$$g_{33} = \sqrt{a_{33} - g_{31}^2 - g_{32}^2}$$

$$g_{jj} = \sqrt{a_{j3} - \sum_{k=1}^{j-1} g_{jk}^2}$$

$$g_{ij} = \frac{1}{g_{jj}}\left(a_{j3} - \sum_{k=1}^{j-1} g_{ik}g_{jk}\right),\ i = j+1, j+2, \ldots, n$$

In some embodiments, if some conditions meet so that the linear equations cannot be solved, default values can be used to fill the chroma prediction values. The default values can be predefined or signaled/switched in SPS/DPS/VPS/SEI/APS/PPS/PH/SH/Region/CTU/CU/Subblock/Sample levels. For example, predefined 1<< (bitDepth−1), meanC, meanL, or meanC-meanL (mean current chroma or other chroma, luma values from available, or subset of FLM reconstructed neighboring region). Default $\alpha_i$ can be 0.

In some examples, first solving $A^{-1}$ by adjugate matrix, but A is singular, detA is 0.

Second, A cannot be Cholesky decomposed, $g_{jj}$<REG_SQR, where REG_SQR is one small value, can be predefined or signaled/switched in SPS/DPS/VPS/SEI/APS/PPS/PH/SH/Region/CTU/CU/Subblock/Sample levels.

Applied Region

FIG. 17 shows a typical case that the FLM parameters are derived using top 2/left 3 luma lines and top 1/left 1 chroma lines. However, using different region for parameter derivation may bring coding benefit because of different block content and the reconstructive quality of different neighboring samples, as explained in this disclosure. Several ways to choose the applied region for parameter derivation are proposed.

First, similar to MDLM, the FLM derivation can only use top or left luma/chroma samples to derive the parameters. Whether to use FLM, FLM_L, or FLM_T can be predefined or signaled/switched in SPS/DPS/VPS/SEI/APS/PPS/PH/SH/Region/CTU/CU/Subblock/Sample levels. W'=W, H'=H when FLM mode is applied; W'=W+We when FLM_T mode is applied; where We denotes extended top luma/chroma samples H'=H+He when FLM_L mode is applied; where He denotes extended left luma/chroma samples The number of extended luma/chroma samples (We, He) can be predefined or signaled/switched in SPS/DPS/VPS/SEI/APS/PPS/PH/SH/Region/CTU/CU/Subblock/Sample levels.

For example, predefine (We, He)=(H, W) as the VVC CCLM, or (W, H) as the ECM CCLM. The unavailable (We, He) luma/chroma samples can be repetitive padded from the nearest (horizontal, vertical) luma/chroma samples.

Figure 19:
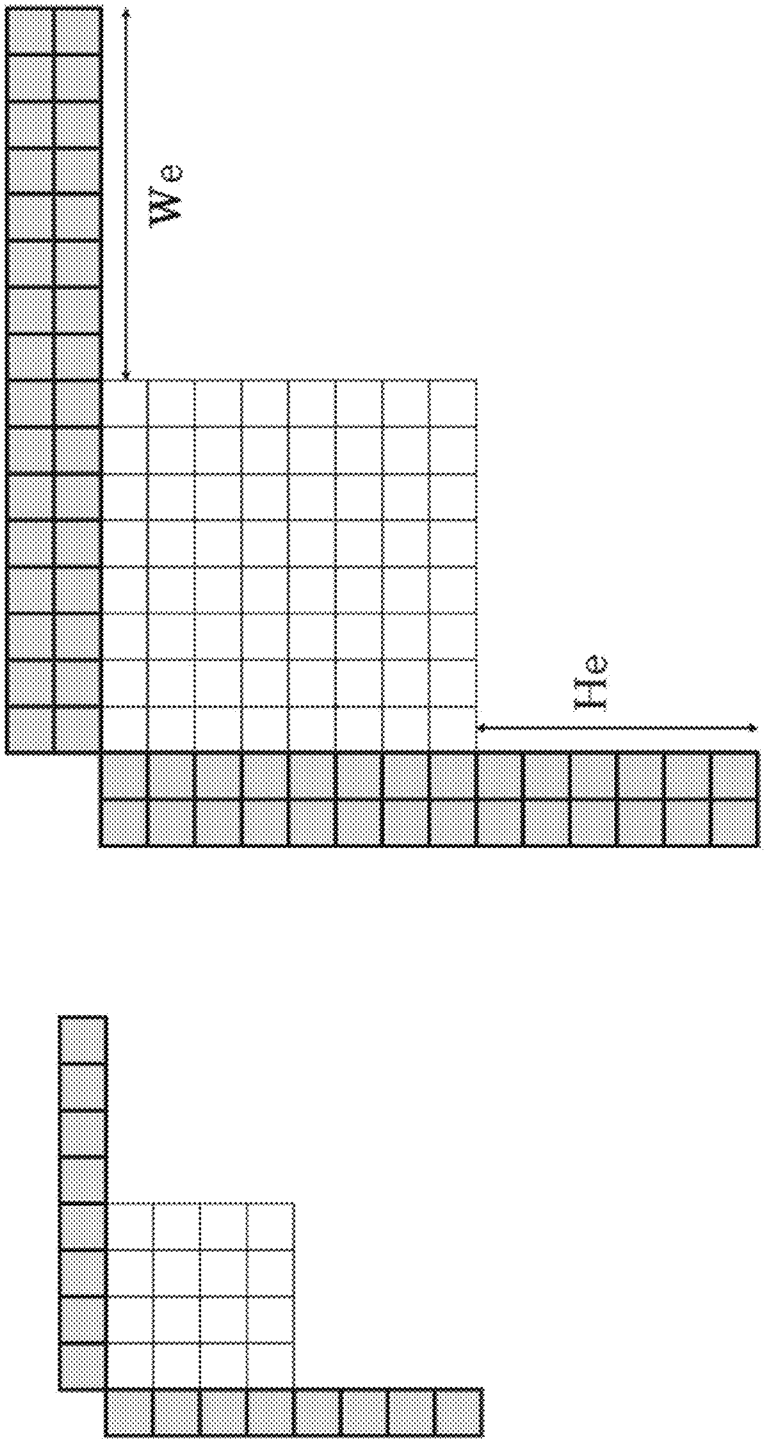
FIG. 19 shows an example that the top or left reconstructed samples are used for Filter-based Linear Model (FLM).

FIG. 19 shows an example that the top or left reconstructed samples are used for FLM.

FIG. 19 shows an illustration of FLM_L/FLM_T (e.g., under 4 tap). When FLM_L or FLM_T is applied, only H' or W' luma/chroma samples are used for parameter derivation, respectively.

Second, similar to MRL, different line index can be predefined or signaled/switched in SPS/DPS/VPS/SEI/APS/PPS/PH/SH/Region/CTU/CU/Subblock/Sample levels, to indicate the selected luma/chroma sample pair line. This may benefit from different reconstructive quality of different line samples.

Figure 20:
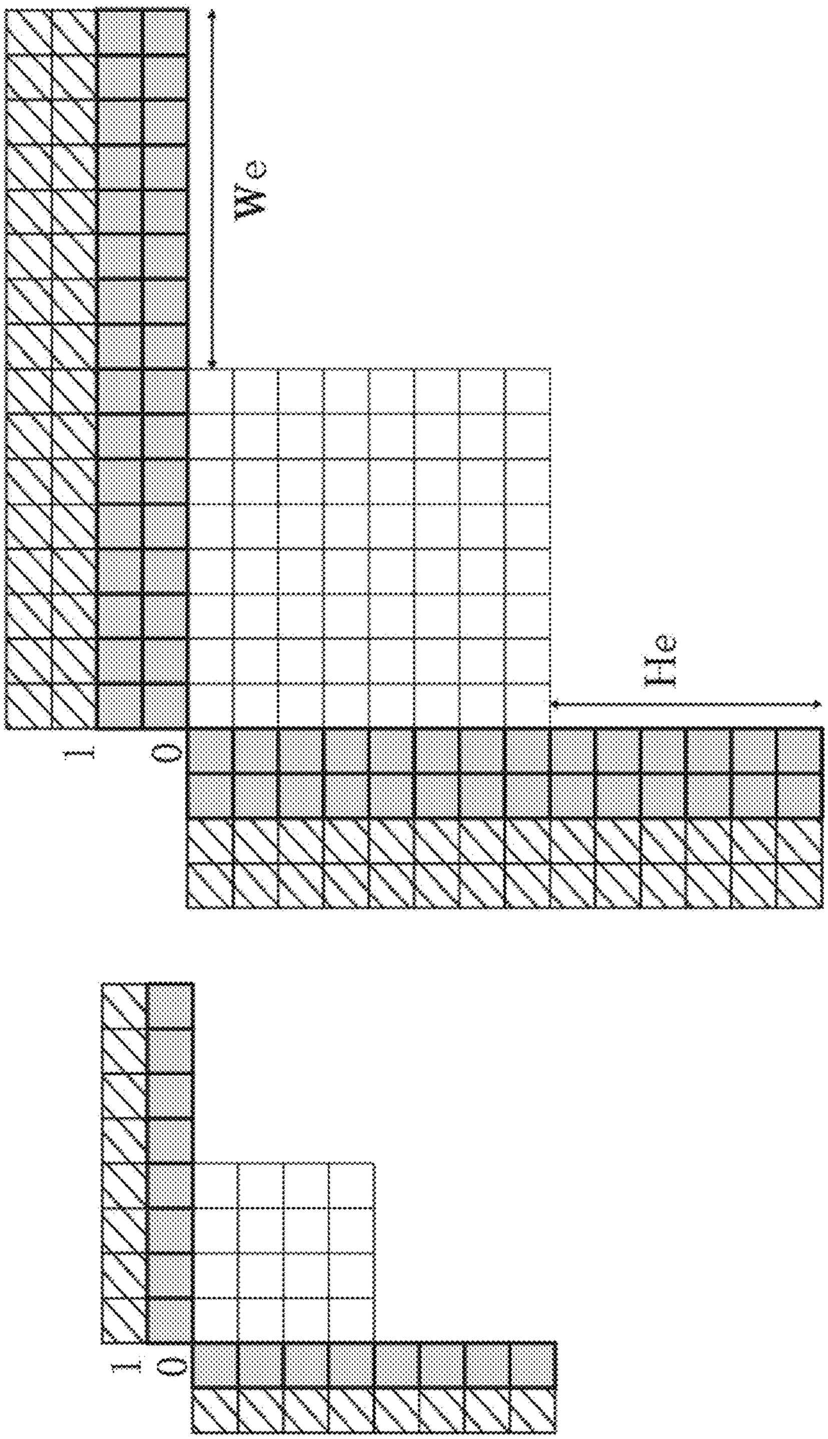
FIG. 20 shows another example that the reconstructed samples are used for FLM.

FIG. 20 shows another example that the reconstructed samples are used for FLM.

FIG. 20 shows that similar to MRL, FLM can use different lines for parameter derivation (e.g., under 4 tap). For example, index 1: using shadowed luma/chroma samples.

Third, extend CCLM region and take full top N/left M lines for parameter derivation. FIG. 20 shows all dark/shadowed region for the luma and chroma samples can be used at one time. Training using larger region (data) may lead to a more robust MLR model.

Syntax

FLC: fixed length code

TU: truncated unary code

EGk: exponential-golomb code with order k, where k can be fixed or signaled/switched in SPS/DPS/VPS/SEI/APS/PPS/PH/SH/Region/CTU/CU/Subblock/Sample levels.

SVLC: signed EGO

UVLC: unsigned EGO

TABLE 8

An example of FLM syntax. Note the binarization of each syntax element can be changed

| Level | Syntax element | Binarization | Meaning |
|---|---|---|---|
| SPS | flm_enabled_flag | FLC | whether FLM is enabled in the sequence, can be inferred off when chromaFormat == CHROMA 400, or CCLM is off |
| PH/SH | ph_flm_cb_flag<br>ph_flm_cr_flag | FLC | whether FLM is enabled in this picture/slice for Cb/Cr, can be inferred off when chromaFormat == CHROMA 400, or CCLM is off |
| PH/SH | ph_flm_cb_ctb_control_flag<br>ph_flm_cr_ctb_control_flag | FLC | whether to enable Cb/Cr on/off control at CTB level |
| CTU | ctb_flm_cb_flag<br>ctb_flm_cr_flag | CABAC | whether FLM is enabled for the current Cb or Cr CTB, can be CABAC bypass coded or with N contexts (2: up/left, or N neighboring CTBs) |
| CU | cu_flm_cb_flag<br>cu_flm_cr_flag | CABAC, TU | whether FLM is enabled for the current Cb or Cr CU, can be CABAC bypass coded or with N contexts (2: up/left, or N neighboring CUs) |
| CU | flm_cb_filter_idx<br>flm_cr_filter_idx | CABAC, TU | which filter shape idx (in the predefined set) is used for the CU, can be CABAC bypass coded or with N contexts (2: up/left, or N neighboring CUs) |
| CU | flm_cb_mdlm_idx<br>flm_cr_mdlm_idx | CABAC, TU | which MDLM idx (FLM, FLM_L, FLM_T) is used for the CU, can be CABAC bypass coded or with N contexts (2: up/left, or N neighboring CUs) |
| CU | flm_cb_mrl_idx<br>flm_cr_mrl_idx | CABAC, TU | which FLM MRL idx (e.g., 0, 1) is used for the CU, can be CABAC bypass coded or with N contexts (2: up/left, or N neighboring CUs) |

Gradient Linear Model (GLM)

Though the above embodiments regarding FLM provide the best flexibility (leading to the best performance), it requires to solve many unknown parameters if the number of filter taps goes up. When the inverse matrix is larger than 3×3, the closed form derivation is not suitable (too many multipliers), and iterative methods like Cholesky are needed, which burden decoder processing cycles. In this section, pre-operations before applying the MLR model are proposed, including utilizing the sample gradients to exploit the correlation between luma AC information and chroma intensities. With the help of gradients, the number of filter taps can be efficiently reduced. In general, GLM is simplified from FLM. We focus on the example that the unknown parameters <=3 (2-tap+1 offset or 3-tap without offset).

In some embodiments, the described methods/examples can be combined/reused from the methods mentioned in other embodiments, including but not limited to classification, filter shape, matrix derivation (with special handling), applied region, syntax. Moreover, methods/examples listed in this section can also be applied in other embodiments (e.g., with more taps), to have a better performance with certain complexity trade-off.

In this disclosure, reference samples/training template/reconstructed neighboring region usually refers to the luma samples used for deriving the MLR model parameters, which are then applied to the inner luma samples in one CU, to predict the chroma samples in the CU.

Filter Shape

Instead of directly using luma sample intensity values as the input of MLR, pre-operations (e.g., pre linear weighted, sign, scale/abs, thresholding, ReLU) can be applied to downgrade the dimension of unknown parameters. For example, instead of applying 2-tap on 2 luma samples, the 2 luma samples can be pre linear weighted, then a simpler 1-tap can be applied to reduce complexity. FIG. 21 shows some examples for 1-tap/2-tap (with offset) pre-operations, where 2-tap coefficients are denoted as (a, b) and each circle denotes a position of a respective collocated chroma sample. The different 1-tap patterns are designed for different gradient directions and using different "interpolated" luma samples (weighting to different luma location) for gradient calculation. The pre-operation parameters (coefficients, sign, scale/abs, thresholding, ReLU) can be fixed or signaled/switched in SPS/DPS/VPS/SEI/APS/PPS/PH/SH/Region/CTU/CU/Subblock/Sample levels. Note in the examples, if multiple coefficients apply on one sample (e.g., −1, 4), then they can be merged (e.g., 3) to reduce operations.

Pre-operations can be according to gradients, edge direction (detection), pixel intensity, pixel variation, pixel variance, Roberts/Prewitt/compass/Sobel/Laplacian operator, high-pass filter, low-pass filter . . . etc. The edge direction detectors listed in the examples can be extended to different edge directions. For example, 1-tap (1, −1) or 2-tap (a, b) applied along different directions to detect different edge gradients. The filter shape/coefficients can be symmetric with respect to the chroma position, as the FIG. 21 examples (420 type-0 case).

The pre-operations can be applied repeatedly. For example, applying one template filtering to template to remove outliers using the low-pass smoothing FIR filter [1, 2, 1]/4, or [1, 2, 1; 1, 2, 1]/8. And after, applying 1-tap GLM to derive the MLR model.

Power-of-2 constraint: the pre-operation coefficients (finally applied (e.g., 3), or middle applied (e.g., −1, 4) to per luma sample) can be limited to power-of-2 values to save multipliers.

One illustration of 1-tap GLM. Notations are similar as in the above embodiments regarding FLM. Please note that L here represents "pre-operated" luma samples. For example, 1-tap GLM [−1, 0, 1; −1, 0, 1] as in FIG. 21. The parameter derivation of 1-tap GLM can reuse CCLM design (described in the later part), but taking directional gradient into consideration (may be with high-pass filter). The 2-tap or multi-tap GLM requires additional MLR parameter derivation (cannot reuse).

$$C = \alpha \cdot L + \beta$$

$$C^0 = \alpha \cdot L^0 + \beta$$

$$C^1 = \alpha \cdot L^1 + \beta$$

$$\vdots$$

$$C^{M-1} = \alpha \cdot L^{M-1} + \beta$$

$$\begin{bmatrix} C^0 \\ C^1 \\ \vdots \\ C^{M-1} \end{bmatrix} = \begin{bmatrix} L^0 & 1 \\ L_1 & 1 \\ \vdots & \vdots \\ L^{M-1} & 1 \end{bmatrix} \begin{bmatrix} \alpha \\ \beta \end{bmatrix}$$

$$b = Ax$$

$$x = (A^T A)^{-1} A^T b = A^{+b}$$

$$\alpha = \frac{n\sum x_k y_k - \sum x_k \sum y_k}{n\sum x_k^2 - \left(\sum x_k\right)^2} = \frac{A_1}{A_2}$$

$$\beta = \frac{\sum y_k - \alpha \sum x_k}{n} = \bar{y} - \alpha\bar{x}$$

Implicit Filter Shape Derivation

In some embodiments, instead of explicitly signaling the selected filter shape index, the used direction oriented filter shape can be derived at decoder to save bit overhead.

First, apply N kinds of directional gradient filters for each reconstructed luma sample of the L-shaped template of the i-th neighboring row and column of the current block.

Second, accumulate filtered values (gradients) by SAD, SSD, or SATD.

Third, build a Histogram of Gradients (HoG).

Fourth, the largest value in HoG is the derived (luma) gradient direction.

For example, reuse the decoder-side intra mode derivation (DIMD) method for luma intra prediction included in ECM-4.0.

First, apply 2 kinds of directional gradient filters (3×3 hor/ver Sobel) for each reconstructed luma sample of the L-shaped template of the 2nd neighboring row and column of the current block.

Second, accumulate filtered values (gradients) by SAD.

Third, build a Histogram of Gradients (HoG).

Fourth, the largest value in HoG is the derived (luma) gradient direction.

Shape candidate: [−1, 0, 1; −1, 0, 1], [1, 2, 1; −1, −2, −1]. For example, the largest value is hor, then use shape [−1, 0, 1; −1, 0, 1] for GLM The gradient filter used for deriving the gradient direction can be the same or different with the GLM shape. For example, both use horizontal [−1, 0, 1; −1, 0, 1].

Classification

The FLM/GLM can be combined with MMLM or ELM. Take GLM as example (1-tap or 2-tap). When combined with classification, each group can share or have its own filter shape, with syntaxes indicating shape for each group. For example, combined with C0': Group 0: grad_hor, model 0, Group 1: grad_ver, model 1.

Group 0: grad_hor, model 0, Group 1: grad_hor, model 1, only generate hor luma patterns once.

In some embodiments, combined with MMLM classifier C0:

- Classifying neighboring reconstructed luma/chroma sample pairs into 2 groups based on Threshold;
- Deriving different MLR models for different groups (can be GLM simplified);
- Classifying luma/chroma sample pairs inside the CU into 2 groups;
- Applying different MLR models to the reconstructed luma samples in different groups;
- Predicting chroma samples in the CU based on different classified MLR models.

$$\begin{cases} pred_C(i, j)\alpha_1 \cdot rec_L'(i, j) + \beta_1 & \text{if } rec_L'(i, j) \le \text{Threshold} \\ pred_C(i, j)\alpha_2 \cdot rec_L'(i, j) + \beta_2 & \text{if } rec_L'(i, j) > \text{Threshold} \end{cases}$$

$rec_L'(i,j)$: downsampled reconstructed luma samples, $rec_C(i,j)$: reconstructed chroma samples (note only neighbours are available), Threshold: average value of the neighboring reconstructed luma samples.

Note the number of classes can be extended to multiple classes by increasing the number of Threshold (e.g., equally divided based on min/max of neighboring reconstructed (downsampled) luma samples, fixed or signaled/switched in SPS/DPS/VPS/SEI/APS/PPS/PH/SH/Region/CTU/CU/Subblock/Sample levels).

In some embodiments, combined with MMLM classifier, variant C0':

Instead of MMLM luma DC intensity, the filtered values of FLM/GLM apply on neighboring luma samples are used for classification. For example, if 1-tap (1, −1) GLM is applied, average AC values are used (physical meaning). The processing can be similar to the above embodiments combined with MMLM classifier C0.

Classifying neighboring reconstructed luma/chroma sample pairs into K groups based on one or more filter shapes, one or more filtered values, and K−1 Threshold Ti;

Deriving different MLR models for different groups (can be GLM simplified);

Classifying luma/chroma sample pairs inside the CU into K groups;

Applying different MLR models to the reconstructed luma samples in different groups;

Predicting chroma samples in the CU based on different classified MLR models.

Threshold can be predefined (e.g., 0, or can be a table) or signaled/switched in SPS/DPS/VPS/SEI/APS/PPS/PH/SH/Region/CTU/CU/Subblock/Sample levels). For example, Threshold can be the average AC value (filtered value) (2 groups), or equally divided based on min/max AC (K groups), of neighboring reconstructed (can be down-sampled) luma samples.

In some embodiments, combined with ELM classifier C3:

As in FIG. 21, select one filter shape (e.g., 1-tap) to calculate edge strengths. The direction is formed by the current and N neighboring samples along the direction (e.g. all 6). One edge strength is calculated by the filtered value (e.g., equivalent).

Quantize the edge strength into M segments by M−1 thresholds Ti.

Use K classes to classify the current sample. (e.g., K==M).

Deriving different MLR models for different groups (can be GLM simplified);

Classifying luma/chroma sample pairs inside the CU into K groups;

Applying different MLR models to the reconstructed luma samples in different groups; Predicting chroma samples in the CU based on different classified MLR models.

The filter shape used for classification can be the same or different with the filter shape used for MLR prediction. Both and the number of thresholds M−1, the thresholds values Ti, can be fixed or in signaled/switched SPS/DPS/VPS/SEI/APS/PPS/PH/SH/Region/CTU/CU/Subblock/Sample levels.

In some embodiments, other classifiers/combined-classifiers in ELM can also be used for FLM/GLM.

In some embodiments, if classified samples in one group are less than a number (e.g., predefined 4), default values mentioned in the embodiments regarding FLM can be applied for the group parameters ($\alpha_i$, $\beta$). If the corresponding neighboring reconstructed samples are not available w.r.t. the selected LM modes, default values can be applied. For example, selected MMLM_L mode but left samples not valid.

Simplification and Unification

This section provides the simplification for GLM. The matrix/parameter derivation in the embodiments regarding FLM requires floating-point operation (e.g., division in closed-form), which is expensive for decoder hardware, so a fixed-point design is required. For 1-tap GLM case, it can be taken as modified luma reconstructed sample generation of CCLM (e.g., horizontal gradient direction, from CCLM [1, 2, 1; 1, 2, 1]/8 to GLM [−1, 0, 1; −1, 0, 1]), the original CCLM process can be reused for GLM, including fixed-point operation, MDLM down-sampling, division table, applied size restriction, min-max approximation, and slope adjustment. For all items, 1-tap GLM can have its own configurations or share the same design as CCLM. For example, using simplified min-max method to derive the parameters (instead of LMS), and combined with slope adjustment after GLM model is derived. In this case, the center point (luminance value $y_r$) used to rotate the slope becomes the average of the reference luma samples "gradient". Another example, when GLM is on for this CU, CCLM slope adjustment is inferred off and don't need to signal slope adjustment related syntaxes.

This section takes typical case reference samples (up 1 row and left 1 column) for example. Note as in FIG. 20, extended reconstructed region can also use the simplification with the same spirit, and may be with syntax indicating the specific region (like MDLM, MRL).

In some embodiments, the following aspects can be combined and applied jointly. For example, combining reference sample down-sampling and division table to perform the division process.

When classification (MMLM/ELM) is applied, each group can apply the same or different simplification operation. For example, samples for each group are padded respectively to the target sample number before applying right shift, and then apply the same derivation process, same division table.

Fixed-Point Implementation

The 1-tap case can reuse the CCLM design, dividing by n is implemented by right shift, dividing by $A_2$ by a LUT. The integerization parameters, including $n_\alpha$, $N_{A_1}$, $N_{A_2}$, $T_{A_1}$, $T_{A_2}$ $n_{table}$ described in the disclosure above, can be the same as CCLM or have different values, to have more precision. The integerization parameters can be predefined or signaled/switched in SPS/DPS/VPS/SEI/APS/PPS/PH/SH/Region/CTU/CU/Subblock/Sample levels, can be conditioned on sequence bitdepth. For example, $n_{table}$=bitdepth+4.

MDLM Downsample

When GLM is combined with MDLM, the existed total samples used for parameter derivation may not be power-of-2 values, and need padding to power-of-2 to replace division with right shift operation. For example, for an 8×4 chroma CU, MDLM needs W+H=12 samples, MDLM_T but only 8 samples are available (reconstructed), pad equally down-sampled 4 samples (0, 2, 4, 6).

```
int targetSampNum = 1 << ( floorLog2( existSampNum − 1 ) + 1 );
  if (targetSampNum != existSampNum)//if existSampNum not a value of power of 2
  {
    xPadMdlmTemplateSample;
  }
  int step = (int) (existSampNum / sampNumToBeAdd)
  for (int i = 0; i < sampNumToBeAdd; i++)
  {
    pTempSrc[i] = pSrc[i * step];
    pTempCur[i] = pCur[i * step];
  }
```

Other padding method like repetitive/mirror padding w.r.t to last neighboring samples (rightmost/lowermost) can also be applied.

The padding method for GLM can be the same or different with that of CCLM.

Note in ECM version, an 8×4 chroma CU MDLM_T/MDLM_L needs 2T/2L=16/8 samples respectively, in such case, same padding method can be applied to meet the target power-of-2 sample number.

Division LUT

Division LUT proposed for CCLM/LIC (Local Illumination Compensation) in known standard development like AVC/HEVC/AV1/VVC/AVS can be used for GLM division. For example, reusing the LUT in the above embodiments for bitdepth=10 case (Table 5). The division LUT can be different from CCLM. For example, CCLM uses min-max with DivTable as described in the above CCLM part of this disclosure, but GLM uses 32-entries LMS division LUT as described in the above part of this disclosure.

When GLM is combined with MMLM, the meanL values may not always be positive (e.g., using filtered/gradient values to classify groups), so sgn (meanL) needs to be extracted, and use abs (meanL) to look-up the division LUT. Note division LUT used for MMLM classification and parameter derivation can be different. For example, using lower precision LUT (as the LUT in min-max) for mean classification, and using higher precision LUT (as in the LMS) for parameter derivation.

Size Restriction and Latency Constraint

Similar to the CCLM design, some size restrictions can be applied for ELM/FLM/GLM. For example, as described in the above CCLM part of this disclosure, same constraint for luma-chroma latency in dual tree.

The size restriction can be according to the CU area/width/height/depth. The threshold of disabling can be predefined or signaled in SPS/DPS/VPS/SEI/APS/PPS/PH/SH/Region/CTU/CU/Subblock/Sample levels. For example, predefine disabling threshold: chroma CU area<128.

Line Buffer Reduction

Similar to the CCLM design, if the collocated luma area of the current chroma CU contains the 1st row inside one CTU, the top template samples generation can be limited to 1 row, to reduce CTU row line buffer storage. Note that only one luma line (general line buffer in intra prediction) is used to make the down-sampled luma samples when the upper reference line is at the CTU boundary.

For example, in FIG. 19, if the collocated luma area of the current chroma CU contains the 1st row inside one CTU, top template can be limited to only use 1 row (but not 2) for parameter derivation (other CUs can still use 2 rows). This saves luma sample line buffer storage when processing CTU row by row at decoder hardware. Several methods can be used to achieve the line buffer reduction. Note the example of limited "1" row can be extended to N rows with similar operations. 2-tap or multi-tap can also apply such operations. When multi-tap, chroma samples may also need to apply operations.

For example, FIG. 21 1-tap [1, 0, −1; 1, 0, −1].

First, reduced shape: can be reduced to [0, 0, 0; 1, 0, −1], only use below row coefficients.

Second, padding: the limited upper row luma samples can be padded (repetitive, mirror, 0, meanL, meanC . . . etc.) from the bellow row luma samples.

Fusion of Chroma Intra Prediction Modes

Similar to the fusion design as described above, since GLM can be taken as one special CCLM mode, the fusion design can be reused or have its own way. Multiple weights (>=2) can be applied to generation the final predictor. For example, $$pred = (w0 * pred0 + w1 * pred1 + (1 \ll (\text{shift} - 1))) \gg \text{shift}$$

pred0 is non-LM, fused with pred1 GLM predictor.

pred0 is one of CCLM (including all MDLM/MMLM), fused with pred1 GLM predictor.

pred0 is GLM, fused with pred1 GLM predictor.

Different I/P/B slices can have different designs for weights, w0 and w1, according to if neighboring blocks is coded with CCLM/GLM/other coding mode, block size/width/height.

For example, determined by the intra prediction mode of adjacent chroma blocks and shift is set equal to 2. Specifically, when the above and left adjacent blocks are both coded with LM modes, {w0, w1}={1, 3}; when the above and left adjacent blocks are both coded with non-LM modes, {w0, w1}={3, 1}; otherwise, {w0, w1}={2, 2}. For non-I slices, w0 and w1 are both set equal to 2.

For the syntax design, if a non-LM mode is selected, one flag is signaled to indicate whether the fusion is applied.

Extension: 1-Tap Linear Model

The 1-tap GLM has good gain complexity trade-off since it can reuse the existing CCLM module without introducing additional derivation. Such 1-tap design can be extended (generalized) to:

First, for a to-be-predicted chroma sample, generating one single corresponding luma sample L by combining collocated and neighboring luma samples.

Second, wherein the combination can be:

Linear filter, e.g., high-pass gradient filter (GLM), low-pass smoothing filter (CCLM), Non-linear filter with power of n, e.g., $L^n$, n can be positive, negative, or +-fractional number, e.g., +½, square root, can rounding and rescale to bitdepth dynamic range, e.g., +3, cube, can rounding and rescale to bitdepth dynamic range.

Third, the combinations of 2. can be applied repeatedly. E.g., apply [1, 2, 1; 1, 2, 1]/8 FIR smoothing on reconstructed luma samples, and nonlinear power of ½.

Fourth, the non-linear filter can be implemented as LUT, e.g., for bitDepth=10, power of n, n=½, LUT[i]=(int)(sqrt (i)+0.5)<<5, i=0~1023, where 5 is to scale to bitdepth=10 dynamic range.

The nonlinear filter provides options when linear filter cannot handle the luma-chroma relationship efficiently. Whether to use nonlinear term can be predefined or signaled/switched in SPS/DPS/VPS/SEI/APS/PPS/PH/SH/Region/CTU/CU/Subblock/Sample levels.

In the above cases, the GLM can refer to Generalized Linear Model (generating one single luma sample linearly or nonlinearly, and feed into the CCLM linear model), linear/nonlinear generation are called general patterns.

In some embodiments, different gradient/general patterns can be combined. Some examples to form another pattern:

For example, combining 1 gradient pattern with CCLM down-sampled value.

For example, combining 1 gradient pattern with nonlinear L2 value.

For example, combining 1 gradient pattern with another gradient pattern, can have different or same direction.

In some embodiments, combination can be plus, minus, or linear weighted.

Syntax

FLC: fixed length code

TU: truncated unary code

EGk: exponential-golomb code with order k, where k can be fixed or signaled/switched in SPS/DPS/VPS/SEI/APS/PPS/PH/SH/Region/CTU/CU/Subblock/Sample levels.

SVLC: signed EGO

UVLC: unsigned EGO

TABLE 9

An example of GLM syntax. Note the binarization of each syntax element can be changed.

| Level | Syntax element | Binarization | Meaning |
|---|---|---|---|
| SPS | glm_enabled_flag | FLC | whether GLM is enabled in the sequence, can be inferred off when chromaFormat == CHROMA 400, or CCLM is off |
| PH/SH | ph_glm_flag<br>ph_glm_cb_flag<br>ph_glm_cr_flag | FLC | whether GLM is enabled in this picture/slice for Cb/Cr, can be == inferred off when chromaFormat CHROMA 400, or CCLM is off, one flag can be added to jointly control "if either Cb/Cris on" |
| PH/SH | ph_glm_ctb_control_flag<br>ph_glm_cb_ctb_control_flag<br>ph_glm_cr_ctb_control_flag | FLC | whether to enable Cb/Cr on/off control at CTB level, one flag can be added to jointly control "if either Cb/Cr is enable on/off control at CTB level" |
| CTU | ctb_glm_flag<br>ctb_glm_cb_flag<br>ctb_glm_cr_flag | CABAC | whether GLM can be enabled for the current Cb or Cr CTB, can be CABAC bypass coded or with N contexts (2: up/left, or N neighboring CTBs), one flag can be added to jointly control "if either Cb/Cr can be enabled" |
| CU | cu_glm_flag<br>cu_glm_cb_flag<br>cu_glm_cr_flag | CABAC, TU | whether GLM is enabled for the current Cb or Cr CU, can be CABAC bypass coded or with N contexts (2: up/left, or N neighboring CUs), one flag can be added to jointly control "if either Cb/Cr can be enabled" |
| CU | glm_cb_filter_idx<br>glm_cr_filter_idx | CABAC, TU, FLC | which filter shape idx (gradient pattern) (in the predefined set) is used for the CU, can be CABAC bypass coded or with N contexts (2: up/left, or N neighboring CUs), as stated in FLM syntax, Cb/Cr can have its own filter shape idx (gradient pattern) or share the same filter shape. |
| CU | glm_cb_mdlm_idx<br>glm_cr_mdlm_idx | CABAC, TU | which MDLM idx (GLM, GLM L, GLM T) is used for the CU, can be CABAC bypass coded or with N contexts (2: up/left, or N neighboring CUs) |
| CU | glm_cb_mrl_idx<br>glm_cr_mrl_idx | CABAC, TU | which GLM MRL idx (e.g., 0, 1) is used for the CU, can be CABAC bypass coded or with N contexts (2: up/left, or N neighboring CUs) |

The GLM on/off control for Cb/Cr components can be jointly or separately. For example, at CU level, First, 1 flag to indicate if GLM is active for this CU.

Second, if active, 1 flag to indicate if Cb/Cr both active.

Third, if not both active, 1 flag to indicate either Cb or Cr is active.

Forth, signal filter index/gradient (general) pattern separately when Cb and/or Cr is active.

Fifth, all flags can have its own context model or bypass coded.

Whether to signal GLM on/off flags can depend on luma/chroma coding modes, CU size.

For example, in ECM5 chroma intra mode syntax, GLM can be inferred off when:

First, MMLM/MMLM_L/MMLM_T.

Second, CU area<A, where A can be predefined or signaled/switched in SPS/DPS/VPS/SEI/APS/PPS/PH/SH/Region/CTU/CU/Subblock/Sample levels.

Third, if combined with CCCM, inferred off when CCCM is on.

In some embodiments, when GLM is combined with MMLM, different models can share the same or have their own gradient/general patterns.

| intra_chroma_pred_mode | | bin string | chroma intra mode |
|---|---|---|---|
| 10 | 77 | 00 | DM |
| 11 | | 010 | DIMD_CHROMA |
| 0 | | 01100 | PLANAR |
| 1 | | 01101 | VER |
| 2 | | 01110 | HOR |
| 3 | | 01111 | DC |

-continued

| | intra_chroma_pred_mode | bin string | chroma intra mode |
|---|---|---|---|
| 4 | 67 | 10 | LM |
| 5 | 68 | 110 | MMLM |
| 6 | 69 | 1110 | LM_L |
| 7 | 71 | 11110 | LM_T |
| 8 | 70 | 111110 | MMLM_L |
| 9 | 72 | 111111 | MMLM_T |

Note the figures in this disclosure can be combined with all examples mentioned in this disclosure.

Note that the disclosed methods may be applied independently or jointly.

CCCM without Down-Sampled Process

CCCM requires to process down-sampled luma reference values before the calculation of model parameters and applying the CCCM model, which burden decoder processing cycles. In this section, CCCM without down-sampled process are proposed, including utilizing non-downsampled luma reference values and/or different selection of non-down-sampled luma reference. One or more filter shapes may be used for the purpose, as description in the following.

Please note that methods/examples in this section can be combined/reused from the methods mentioned in other embodiments, including but not limited to classification, filter shape, matrix derivation (with special handling), applied region, syntax. Moreover, methods/examples listed in this section can also be applied in other embodiments (e.g., with more taps), to have a better performance with certain complexity trade-off.

In this disclosure, reference samples/training template/reconstructed neighboring region usually refers to the luma samples used for deriving the MLR model parameters, which are then applied to the inner luma samples in one CU, to predict the chroma samples in the CU.

Filter Shape

One or more shape/number of filter taps may be used for CCCM prediction, as shown in FIG. 22. The selected luma reference values are non-downsampled. One or more predefined shape/number of filter taps may be used for CCCM prediction based on previous decoded information on TB/CB/slice/picture/sequence level.

Though a multiple tap filter can fit well on training data (i.e., top/left neighboring reconstructed luma/chroma samples), in some cases that training data do not capture full characteristics of testing data, it may result in overfitting and may not predict well on testing data (i.e., the to-be-predicted chroma block samples). Also, different filter shapes may adapt well to different video block content, leading to more accurate prediction. To address this issue, the filter shape/number of filter taps can be predefined or signaled/switched in SPS/DPS/VPS/SEI/APS/PPS/PH/SH/Region/CTU/CU/Subblock/Sample levels. A set of filter shape candidates can be predefined or signaled/switched in SPS/DPS/VPS/SEI/APS/PPS/PH/SH/Region/CTU/CU/Subblock/Sample levels. Different components (U/V) may have different filter switch control. For example, predefined a set of filter shape candidates (idx=0~5), and filter shape (1, 2) denotes a 2-tap luma filter, (1, 2, 4) denotes a 3-tap luma filter as shown in FIG. 17 . . . etc., the filter shape selection of U/V components can be switched in PH or in CU/CTU levels. Note N-tap can represent N-tap with or without the offset β as descripted in the above embodiments regarding FLM.

| | # of filter | |
|---|---|---|

-continued

| predefined filter shape candidates: | | taps | filter shape |
|---|---|---|---|
| idx | 0 | 2 | (1, 2) |
| idx | 1 | 2 | (1, 4) |
| idx | 2 | 2 | (1, 5) |
| idx | 3 | 3 | (1, 2, 4) |
| idx | 4 | 4 | (1, 2, 4, 5) |
| idx | 5 | 6 | (0, 1, 2, 3, 4, 5) |

| POC | comp | selected filter shape idx | |
|---|---|---|---|
| 0 | U | 3 | PH switch |
| | V | 0~5 | CU switch |
| 1 | U | 4 | PH switch |
| | V | 0~2 | CTU switch |

Different chroma types/color formats can have different predefined filter shapes/taps. For example, using predefined filter shape for 420 type-0: (1, 2, 4, 5), 420 type-2: (0, 1, 2, 4, 7), 422: (1, 4), 444: (0, 1, 2, 3, 4, 5) as shown in FIG. 18.

The unavailable luma/chroma samples for deriving the MLR model can be padded from available reconstructed samples. For example, if using a 6-tap (0, 1, 2, 3, 4, 5) filter as in FIG. 18, for a CU located at the left picture boundary, the left columns including (0, 3) are not available (out of picture boundary), so (0, 3) are repetitive padding from (1, 4) to apply the 6-tap filter. Note the padding process applied in both training data (top/left neighboring reconstructed luma/chroma samples) and testing data (the luma/chroma samples in the CU).

According to one or more embodiments of the disclosure, the unavailable luma/chroma samples for deriving the MLR model can be skipped and not used. Then the padding process is not needed for the unavailable luma/chroma samples.

Figure 23:
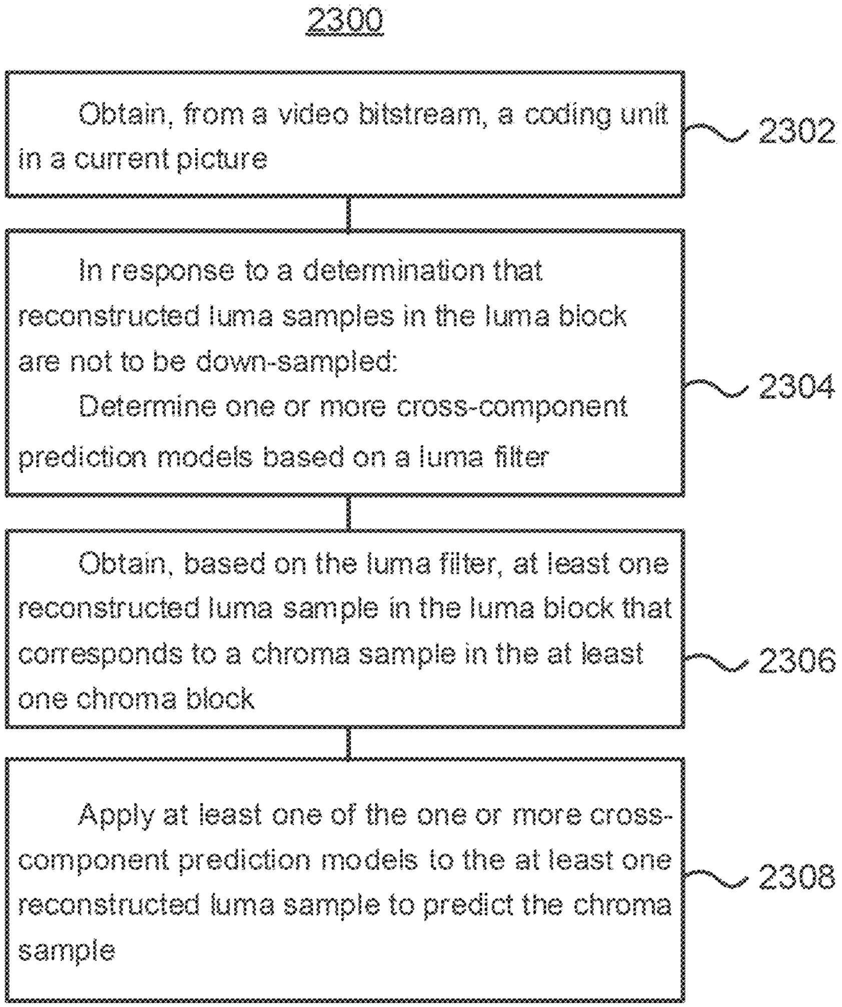
FIG. 23 is a flow chart illustrating a method for video decoding in accordance with some implementations of the present disclosure.

FIG. 23 is a flow chart illustrating a method 2300 for video decoding in accordance with some implementations of the present disclosure. The method 2300 may be, for example, applied to a decoder (e.g., the video decoder 30).

The method 2300 includes the step 2302, obtaining, from a video bitstream, a coding unit in a current picture. In some embodiments, the coding unit comprises a luma block and at least one chroma block. In some embodiment, the decoder may receive a video bitstream including data associated with the coding unit in the current picture. The data is received at the decoder for decoding the encoded video information.

The method 2300 includes the step 2304, in response to a determination that reconstructed luma samples in the luma block are not to be down-sampled: determining one or more cross-component prediction models based on a luma filter.

In some embodiments, the one or more cross-component prediction models may comprise a convolutional cross-component model (CCCM). In such embodiments, a CCCM without down-sampled process as described above may be implemented.

In some embodiments, the luma filter is applied to luma sample(s) from a neighboring area (e.g., left neighboring samples and/or top neighboring samples) of the current luma block to derive/train the parameters of the cross-component prediction model as described earlier. Alternatively or additionally, the luma filter may be applied to luma sample(s) from the current luma block to derive/train the parameters of the cross-component prediction model. In some embodiments, more than one cross-component prediction models may be determined, e.g., as described above regarding MMLM in this application. In some embodiments, the luma filter may be determined based on the filter shape/number of filter taps as described above in connection with FIG. 22.

The method 2300 includes the step 2306, obtaining, based on the luma filter, at least one reconstructed luma sample in the luma block that corresponds to a chroma sample in the at least one chroma block. In some embodiments, the luma samples are selected from the luma block based on the filter shape/number of filter taps as described above in connection with FIG. 22.

The method 2300 includes the step 2308, applying at least one of the one or more cross-component prediction models to the at least one reconstructed luma sample to predict the chroma sample. In some embodiments, when it is determined that the at least one luma sample corresponding to the chroma sample is not to be down-sampled to predict the sample value of that chroma sample, at least one of the one or more cross-component prediction models is applied on the at least one luma sample directly (i.e., without down-sampling) to predict the sample value of the chroma sample.

In some embodiments, the determination that the reconstructed luma samples in the luma block are not to be down-sampled may be based on characteristics of the reconstructed luma samples in the luma block. In some embodiments, the characteristics of the reconstructed luma sample may be the distribution characteristics of sample values. In some embodiments, the characteristics (e.g., distribution characteristics) of the reconstructed luma samples may be determined based on the sample values of the reconstructed luma samples or the gradient of the sample values of the reconstructed luma samples. For example, in response to determining that the reconstructed luma samples have sharply changing luma sample values (e.g., the gradient is larger than a predefined value), the luma samples may not be down-sampled. For another example, in response to determining that the reconstructed luma samples that have sample values satisfying a distribution criterion, the luma samples may not be down-sampled. In some embodiments, in response to determining that using the down-sampled luma samples will not provide a better prediction result (e.g., a better rate-distortion) than using the luma samples without down-sampling, the luma samples may not be down-sampled.

In some embodiments, the determination that the reconstructed luma samples in the luma block are not to be down-sampled may be predefined, or may be signaled in SPS, DPS, VPS, SEI, APS, PPS, PH, SH, Region, CTU, CU, Subblock or Sample level. In some embodiments, a syntax element indicating whether the luma samples are to be down-sampled may be generated by the encoder and signaled to the decoder. In some embodiments, whether the luma samples are to be down-sampled may be determined by the decoder from its own side.

In some embodiments, determining (2304) the one or more cross-component prediction models based on the luma filter may comprise: determining at least one of filter parameters of the luma filter, wherein the filter parameters comprise a filter shape and a number of taps of the luma filter; and determining the one or more cross-component prediction models based on the at least one of the filter parameters. In some embodiments, the filter shape and/or the number of taps of the luma filter may be those shown in FIG. 22.

In some embodiments, obtaining (2306), based on the luma filter, the at least one reconstructed luma sample in the luma block that corresponds to the chroma sample in the at least one chroma block may comprise: selecting the at least one reconstructed luma sample from the luma block, wherein the selected at least one reconstructed luma sample is arranged in the luma block in accordance with the filter shape of the luma filter.

In some embodiments, a number of spatial components of the luma filter may be 6, and the filter shape may be a rectangle with a width of 3 and a height of 2, as shown in the top-left corner of FIG. 22 for example.

In some embodiments, the filter parameters of the luma filter may be predefined, or may be signaled in SPS, DPS, VPS, SEI, APS, PPS, PH, SH, Region, CTU, CU, Subblock or Sample level. In some embodiments, the filter shape and/or the number of taps of the luma filter may be determined by the encoder and signaled to the decoder. In some embodiments, the filter shape and/or the number of taps of the luma filter may be determined based on the reconstructed luma samples by both the encoder and the decoder.

In some embodiments, the filter parameters of the luma filter may be selected from a group of candidates, the group of candidates being predefined, or being signaled in SPS, DPS, VPS, SEI, APS, PPS, PH, SH, Region, CTU, CU, Subblock or Sample level. In some embodiments, instead of explicitly signaling the selected filter shape index, the selection of the filter shape and/or the number of taps of the luma filter may be performed by the decoder. In some embodiments, the used direction oriented filter shape can be derived at the decoder as the embodiments described in the above embodiments regarding GLM.

In some embodiments, the at least one chroma block may comprise a first chroma block and a second chroma block. The luma filter may comprise a first luma filter and a second luma filter. The determining the one or more cross-component prediction models based on the at least one of the filter parameters may comprise: determining a first subset of the one or more cross-component prediction models for the first chroma block based on at least one of the filter parameters of the first luma filter; and determining a second subset of the one or more cross-component prediction models for the second chroma block based on at least one of the filter parameters of the second luma filter. In some embodiments, the filter parameters of the second luma filter may be signaled at a different level from a level at which the filter parameters of the first luma filter are signaled. In some embodiments, the different chroma components (e.g., U/V) correspond to different filter shapes, and the different filter shapes may be signaled at different levels.

In some embodiments, the at least one of the filter parameters may be determined based on a color format of the current picture. The color format may correspond to the chroma format sampling structure including 420 sampling, 422 sampling, and 444 sampling. For example, the filter shape used for 420 type-0 is (1, 2, 4, 5), for 420 type-2 is (0, 1, 2, 4, 7), for 422 is (1, 4), for 444 is (0, 1, 2, 3, 4, 5) as shown in FIG. 18.

In some embodiments, determining the one or more cross-component prediction models based on the at least one of the filter parameters may comprise: selecting a plurality of sets of neighboring samples of the coding unit, wherein each set of the plurality of sets of neighboring samples is located on a top of the coding unit or a left of the coding unit and each set of the plurality of sets of neighboring samples comprises a neighboring chroma sample and at least one neighboring luma sample corresponding to the neighboring chroma sample, wherein the at least one neighboring luma sample is arranged in the current picture in accordance with the filter shape of the luma filter; and determining the one or more cross-component prediction models by performing a training process using the plurality of sets of neighboring samples as training data. In some embodiments, the plurality of sets of neighboring samples includes top 2/left 3 luma lines and top 1/left 1 chroma lines as shown in FIG. 17.

In some embodiments, selecting the plurality of sets of neighboring samples of the coding unit may comprise: in response to determining that a sample value of a neighboring chroma sample or neighboring luma sample in a set of neighboring samples is unavailable, deriving the sample value of the neighboring chroma sample or neighboring luma sample from the sample value of at least one of available samples in the set of neighboring samples. For example, some sample values of the neighboring samples may be unavailable as they may be out of the picture boundary or unsuccessfully reconstructed. These unavailable samples may be derived from the other samples, e.g., copying from the other samples, taking the average of the other samples, or taking the weighted summation of the other samples.

In some embodiments, selecting the plurality of sets of neighboring samples of the coding unit may comprise: in response to determining that a sample value of a neighboring chroma sample or neighboring luma sample in a set of neighboring samples is unavailable, skipping using the set of neighboring samples to determine the one or more cross-component prediction models.

In some embodiments, determining the one or more cross-component prediction models based on the plurality of sets of neighboring samples may comprise: constructing a linear equation based on the plurality of sets of neighboring samples, wherein the linear equation describes a mapping from sample values of luma samples to sample values of chroma samples; and deriving coefficients of the one or more cross-component prediction models by solving the linear equation through at least one of the following algorithms: pseudo inverse matrix calculation, adjugate matrix calculation, Gauss-Jordan elimination, or Cholesky decomposition. In some embodiments, the linear equation includes the model parameter of $\alpha_i$ and offset $\beta$ as those described in the above embodiments regarding FLM. In some embodiments, the linear equation includes the model parameter of $\alpha_i$ without offset $\beta$. In some embodiments, in response to the linear system cannot be solved, default values can be used to fill the chroma prediction values. The default values can be predefined or signaled/switched in SPS/DPS/VPS/SEI/APS/PPS/PH/SH/Region/CTU/CU/Subblock/Sample levels.

In some embodiments, the method 2300 may further comprise adjusting the filter shape and reducing the number of taps of the luma filter based on a pre-operation; and determining the one or more cross-component prediction models based on the adjusted filter shape and the reduced number of taps of the luma filter. In some embodiments, the pre-operations include the embodiments described in the above embodiments regarding GLM. In some embodiments, the pre-operation parameters (coefficients, sign, scale/abs, thresholding, ReLU) can be fixed or signaled/switched in SPS/DPS/VPS/SEI/APS/PPS/PH/SH/Region/CTU/CU/Subblock/Sample levels.

In some embodiments, determining (2304) the one or more cross-component prediction models based on the luma filter may comprise: deriving a classifier based on a local binary pattern and/or edge information of the luma block; classifying neighboring samples located on a top of or a left of the luma block into a plurality of groups based on the classifier; and determining different cross-component models for different groups of the plurality of groups based on the luma filter. In some embodiment, the classifier based on the local binary pattern may classify a given luma sample based on a comparison between a sample value of the given luma sample and sample values of neighboring luma samples of the given luma sample. In some embodiments, the edge information may be obtained based on a difference between a sample value of the given luma sample and a sample value of a neighboring luma sample of the given luma sample in a given direction. In some embodiments, the edge information may be obtained by applying a luma filter on the given luma sample and at least one neighboring luma sample of the given luma sample.

In some embodiments, deriving the classifier based on the local binary pattern and/or the edge information to classify the given luma sample into the plurality of groups may comprise: deriving a first classifier and a second classifier, wherein the second classifier is at least partially different from the first classifier and at least one of the first classifier and the second classifier is based on the local binary pattern and/or the edge information; and deriving the classifier based on a combination of the first classifier and the second classifier.

In some embodiments, applying (2308) at least one of the one or more cross-component prediction models to the at least one reconstructed luma sample to predict the chroma sample may comprise: classifying the at least one reconstructed luma sample into a first group of the plurality of groups based on the classifier; and applying a corresponding cross-component prediction model for the first group to the at least one luma sample to predict the chroma sample. Therefore, the reconstructed luma sample(s) is/are classified by the classifier, and the corresponding prediction model is applied to the classified luma sample(s) to reconstruct the chroma sample.

Figure 24:
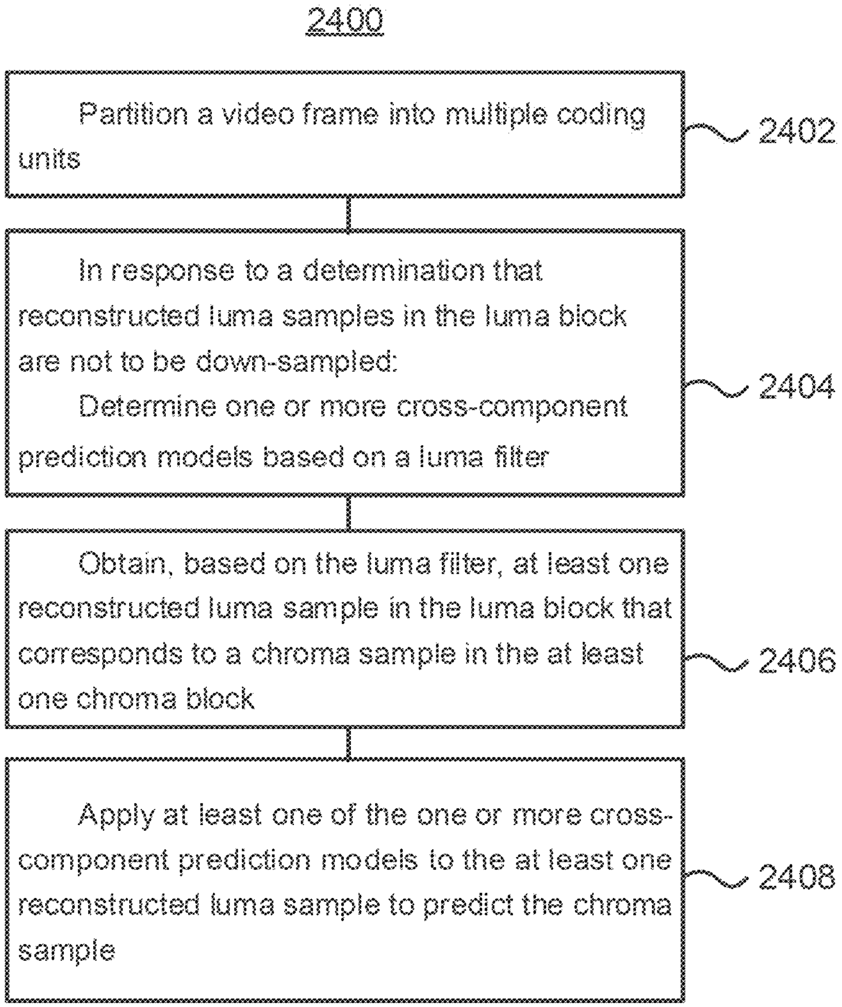
FIG. 24 is a flow chart illustrating a method for video encoding in accordance with some implementations of the present disclosure.

FIG. 24 is a flow chart illustrating a method 2400 for video encoding in accordance with some implementations of the present disclosure. The method 2400 may be, for example, applied to an encoder (e.g., the video encoder 20).

In some embodiments, the encoder may perform reciprocal operations with respect to those of the method 2300 as described above in connection with the decoding embodiments of the present application.

The method 2400 for video encoding comprises: step 2402, partitioning a video frame into multiple coding units. In some embodiments, a coding unit of the multiple coding units comprises a luma block and at least one chroma block.

The method 2400 for video encoding comprises: step 2404, in response to a determination that reconstructed luma samples in the luma block are not to be down-sampled: determining one or more cross-component prediction models based on a luma filter; step 2406, obtaining, based on the luma filter, at least one reconstructed luma sample in the luma block that corresponds to a chroma sample in the at least one chroma block; and step 2408, applying at least one of the one or more cross-component prediction models to the at least one reconstructed luma sample to predict the chroma sample. In some embodiments, the one or more cross-component prediction models comprise a convolutional cross-component model (CCCM).

In some embodiments, the determination that the reconstructed luma samples in the luma block are not to be down-sampled may be based on characteristics of the reconstructed luma samples in the luma block.

In some embodiments, determining the one or more cross-component prediction models based on the luma filter may comprise: determining at least one of filter parameters of the luma filter, wherein the filter parameters comprise a filter shape and a number of taps of the luma filter; and determining the one or more cross-component prediction models based on the at least one of the filter parameters. In some embodiments, obtaining, based on the luma filter, the at least one reconstructed luma sample in the luma block that corresponds to the chroma sample in the at least one chroma block comprises: selecting the at least one reconstructed luma sample from the luma block, wherein the selected at least one reconstructed luma sample is arranged in the luma block in accordance with the filter shape of the luma filter.

In some embodiments, a number of spatial components of the luma filter may be 6, and the filter shape may be a rectangle with a width of 3 and a height of 2.

In some embodiments, the filter parameters may be predefined, may be signaled in Sequence Parameter Set (SPS), Decoding Parameter Set (DPS), Video Parameter Set (VPS), Supplemental Enhancement Information (SEI), Adaptation Parameter Set (APS), Picture Parameter Set (PPS), Picture Header (PH), Slice Header (SH), Region, Coding Tree Unit (CTU), Coding Unit (CU), Subunit or Sample level, or the filter parameters may be selected from a group of candidates. The group of candidates may be predefined, or may be signaled in Sequence Parameter Set (SPS), Decoding Parameter Set (DPS), Video Parameter Set (VPS), Supplemental Enhancement Information (SEI), Adaptation Parameter Set (APS), Picture Parameter Set (PPS), Picture Header (PH), Slice Header (SH), Region, Coding Tree Unit (CTU), Coding Unit (CU), Subunit or Sample level.

In some embodiments, the at least one chroma block may comprise a first chroma block and a second chroma block, and the luma filter may comprise a first luma filter and a second luma filter. In some embodiments, determining the one or more cross-component prediction models based on the at least one of the filter parameters may comprise: determining a first subset of the one or more cross-component prediction models for the first chroma block based on at least one of the filter parameters of the first luma filter; and determining a second subset of the one or more cross-component prediction models for the second chroma block based on at least one of the filter parameters of the second luma filter. In some embodiments, the filter parameters of the second luma filter may be signaled at a different level from a level at which the filter parameters of the first luma filter are signaled.

In some embodiments, the at least one of the filter parameters may be determined based on a color format of the current picture.

In some embodiments, determining the one or more cross-component prediction models based on the at least one of the filter parameters may comprise: selecting a plurality of sets of neighboring samples of the coding unit, wherein each set of the plurality of sets of neighboring samples is located on a top of the coding unit or a left of the coding unit and each set of the plurality of sets of neighboring samples comprises a neighboring chroma sample and at least one neighboring luma sample corresponding to the neighboring chroma sample, wherein the at least one neighboring luma sample is arranged in the current picture in accordance with the filter shape of the luma filter; and determining the one or more cross-component prediction models by performing a training process using the plurality of sets of neighboring samples as training data.

In some embodiments, selecting the plurality of sets of neighboring samples of the coding unit may comprise in response to determining that a sample value of a neighboring chroma sample or neighboring luma sample in a set of neighboring samples is unavailable, deriving the sample value of the neighboring chroma sample or neighboring luma sample from the sample value of at least one of available samples in the set of neighboring samples.

In some embodiments, selecting the plurality of sets of neighboring samples of the coding unit may comprise in response to determining that a sample value of a neighboring chroma sample or neighboring luma sample in a set of neighboring samples is unavailable, skipping using the set of neighboring samples to determine the one or more cross-component prediction models.

In some embodiments, an electronic apparatus is provided. The electronic apparatus comprises one or more processors; memory coupled to the one or more processors; and a plurality of programs stored in the memory that, when executed by the one or more processors, cause the electronic apparatus to receive a video bitstream to perform the method according to any decoding embodiments of the present application or cause the electronic apparatus to perform the method according to any encoding embodiments of the present application to generate a video bitstream.

In some embodiments, a non-transitory computer readable storage medium is provided. The non-transitory computer readable storage medium stores a plurality of programs for execution by an electronic apparatus having one or more processors, wherein the plurality of programs, when executed by the one or more processors, cause the electronic apparatus to perform the method according to any decoding embodiments of the present application to process a video bitstream and store the processed video bitstream in the non-transitory computer readable storage medium, or cause the electronic apparatus to perform the method according to any encoding embodiments of the present application to generate a video bitstream and store the generated video bitstream in the non-transitory computer readable storage medium.

In some embodiments, a computer program product is provided. The computer program product includes instructions that, when executed by one or more processors of an electronic apparatus, cause the electronic apparatus to receive a video bitstream to perform the method according to any decoding embodiments of the present application or cause the electronic apparatus to perform the method according to any encoding embodiments of the present application to generate a video bitstream.

Figure 25:
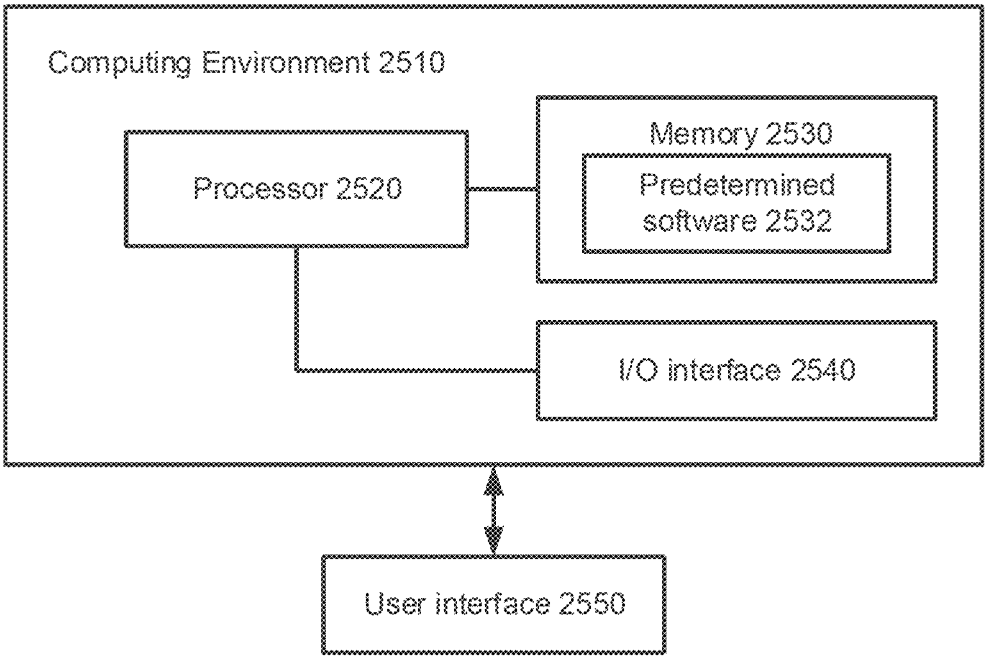
FIG. 25 is a diagram illustrating a computing environment coupled with a user interface, according to some implementations of the present disclosure.

FIG. 25 shows a computing environment 2510 coupled with a user interface 2550.

The computing environment 2510 can be part of a data processing server. The computing environment 2510 includes a processor 2520, a memory 2530, and an Input/Output (I/O) interface 2540.

The processor 2520 typically controls overall operations of the computing environment 2510, such as the operations associated with display, data acquisition, data communications, and image processing. The processor 2520 may include one or more processors to execute instructions to perform all or some of the steps in the above-described methods. Moreover, the processor 2520 may include one or more modules that facilitate the interaction between the processor 2520 and other components. The processor may be a Central Processing Unit (CPU), a microprocessor, a single chip machine, a Graphical Processing Unit (GPU), or the like.

The memory 2530 is configured to store various types of data to support the operation of the computing environment 2510. The memory 2530 may include predetermined software 2532. Examples of such data includes instructions for any applications or methods operated on the computing environment 2510, video datasets, image data, etc. The memory 2530 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 2540 provides an interface between the processor 2520 and peripheral interface modules, such as a keyboard, a click wheel, buttons, and the like. The buttons may include but are not limited to, a home button, a start scan button, and a stop scan button. The I/O interface 2540 can be coupled with an encoder and decoder.

In an embodiment, there is also provided a non-transitory computer-readable storage medium comprising a plurality of programs, for example, in the memory 2530, executable by the processor 2520 in the computing environment 2510, for performing the above-described methods. In one example, the plurality of programs may be executed by the processor 2520 in the computing environment 2510 to receive (for example, from the video encoder 20 in FIG. 2) a bitstream or data stream including encoded video information (for example, video blocks representing encoded video frames, and/or associated one or more syntax elements, etc.), and may also be executed by the processor 2520 in the computing environment 2510 to perform the decoding method described above according to the received bitstream or data stream. In another example, the plurality of programs may be executed by the processor 2520 in the computing environment 2510 to perform the encoding method described above to encode video information (for example, video blocks representing video frames, and/or associated one or more syntax elements, etc.) into a bitstream or data stream, and may also be executed by the processor 2520 in the computing environment 2510 to transmit the bitstream or data stream (for example, to the video decoder 30 in FIG. 3). Alternatively, the non-transitory computer-readable storage medium may have stored therein a bitstream or a data stream comprising encoded video information (for example, video blocks representing encoded video frames, and/or associated one or more syntax elements etc.) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 2520); and the non-transitory computer-readable storage medium or the memory 2530 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 2530, executable by the processor 2520 in the computing environment 2510, for performing the above-described methods. For example, the computer program product may include the non-transitory computer-readable storage medium.

In an embodiment, the computing environment 2510 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video coding, comprising:

obtaining a coding unit in a current picture, wherein the coding unit comprises a luma block and at least one chroma block; and in response to a determination that reconstructed luma samples in the luma block are not to be down-sampled:

determining one or more cross-component prediction models based on a luma filter, wherein the one or more cross-component prediction models comprise a convolutional cross-component model (CCCM);

obtaining, based on the luma filter, at least one reconstructed luma sample in the luma block that corresponds to a chroma sample in the at least one chroma block; and applying at least one of the one or more cross-component prediction models to the at least one reconstructed luma sample to predict the chroma sample.

2. The method of claim 1, wherein the determination that the reconstructed luma samples in the luma block are not to be down-sampled is based on characteristics of the reconstructed luma samples in the luma block.

3. The method of claim 1, wherein determining the one or more cross-component prediction models based on the luma filter comprises:

determining at least one of filter parameters of the luma filter, wherein the filter parameters comprise a filter shape and a number of taps of the luma filter; and determining the one or more cross-component prediction models based on the at least one of the filter parameters, and wherein obtaining, based on the luma filter, the at least one reconstructed luma sample in the luma block that corresponds to the chroma sample in the at least one chroma block comprises:

selecting the at least one reconstructed luma sample from the luma block, wherein the selected at least one reconstructed luma sample is arranged in the luma block in accordance with the filter shape of the luma filter.

4. The method of claim 3, wherein the filter parameters are predefined, or are signaled in Sequence Parameter Set (SPS), Decoding Parameter Set (DPS), Video Parameter Set (VPS), Supplemental Enhancement Information (SEI), Adaptation Parameter Set (APS), Picture Parameter Set (PPS), Picture Header (PH), Slice Header (SH), Region, Coding Tree Unit (CTU), Coding Unit (CU), Subunit or Sample level, or wherein the filter parameters are selected from a group of candidates, wherein the group of candidates is predefined, or is signaled in Sequence Parameter Set (SPS), Decoding Parameter Set (DPS), Video Parameter Set (VPS), Supplemental Enhancement Information (SEI), Adaptation Parameter Set (APS), Picture Parameter Set (PPS), Picture Header (PH), Slice Header (SH), Region, Coding Tree Unit (CTU), Coding Unit (CU), Subunit or Sample level.

5. The method of claim 3, wherein the at least one chroma block comprises a first chroma block and a second chroma block, wherein the luma filter comprises a first luma filter and a second luma filter, and wherein determining the one or more cross-component prediction models based on the at least one of the filter parameters comprises:

determining a first subset of the one or more cross-component prediction models for the first chroma block based on at least one of the filter parameters of the first luma filter; and determining a second subset of the one or more cross-component prediction models for the second chroma block based on at least one of the filter parameters of the second luma filter.

6. The method of claim 3, wherein the at least one of the filter parameters is determined based on a color format of the current picture.

7. The method of claim 3, wherein determining the one or more cross-component prediction models based on the at least one of the filter parameters comprises:

selecting a plurality of sets of neighboring samples of the coding unit, wherein each set of the plurality of sets of neighboring samples is located on a top of the coding unit or a left of the coding unit and each set of the plurality of sets of neighboring samples comprises a neighboring chroma sample and at least one neighboring luma sample corresponding to the neighboring chroma sample, wherein the at least one neighboring luma sample is arranged in the current picture in accordance with the filter shape of the luma filter; and determining the one or more cross-component prediction models by performing a training process using the plurality of sets of neighboring samples as training data.

8. The method of claim 7, wherein selecting the plurality of sets of neighboring samples of the coding unit comprises:

in response to determining that a sample value of a neighboring chroma sample or neighboring luma sample in a set of neighboring samples is unavailable, deriving the sample value of the neighboring chroma sample or neighboring luma sample from the sample value of at least one of available samples in the set of neighboring samples.

9. The method of claim 7, wherein selecting the plurality of sets of neighboring samples of the coding unit comprises:

in response to determining that a sample value of a neighboring chroma sample or neighboring luma sample in a set of neighboring samples is unavailable, skipping using the set of neighboring samples to determine the one or more cross-component prediction models.

10. An apparatus for video coding, comprising:

one or more processors; and a memory coupled to the one or more processors and configured to store instructions executable by the one or more processors, wherein the one or more processors, upon execution of the instructions, are configured to perform operations comprising:

obtaining a coding unit in a current picture, wherein the coding unit comprises a luma block and at least one chroma block; and in response to a determination that reconstructed luma samples in the luma block are not to be down-sampled:

determining one or more cross-component prediction models based on a luma filter, wherein the one or more cross-component prediction models comprise a convolutional cross-component model (CCCM);

obtaining, based on the luma filter, at least one reconstructed luma sample in the luma block that corresponds to a chroma sample in the at least one chroma block; and applying at least one of the one or more cross-component prediction models to the at least one reconstructed luma sample to predict the chroma sample.

11. The apparatus of claim 10, wherein the determination that the reconstructed luma samples in the luma block are not to be down-sampled is based on characteristics of the reconstructed luma samples in the luma block.

12. The apparatus of claim 10, wherein determining the one or more cross-component prediction models based on the luma filter comprises:

determining at least one of filter parameters of the luma filter, wherein the filter parameters comprise a filter shape and a number of taps of the luma filter; and determining the one or more cross-component prediction models based on the at least one of the filter parameters, and wherein obtaining, based on the luma filter, the at least one reconstructed luma sample in the luma block that corresponds to the chroma sample in the at least one chroma block comprises:

selecting the at least one reconstructed luma sample from the luma block, wherein the selected at least one reconstructed luma sample is arranged in the luma block in accordance with the filter shape of the luma filter.

13. The apparatus of claim 12, wherein the filter parameters are predefined, or are signaled in Sequence Parameter Set (SPS), Decoding Parameter Set (DPS), Video Parameter Set (VPS), Supplemental Enhancement Information (SEI), Adaptation Parameter Set (APS), Picture Parameter Set (PPS), Picture Header (PH), Slice Header (SH), Region, Coding Tree Unit (CTU), Coding Unit (CU), Subunit or Sample level, or wherein the filter parameters are selected from a group of candidates, wherein the group of candidates is predefined, or is signaled in Sequence Parameter Set (SPS), Decoding Parameter Set (DPS), Video Parameter Set (VPS), Supplemental Enhancement Information (SEI), Adaptation Parameter Set (APS), Picture Parameter Set (PPS), Picture Header (PH), Slice Header (SH), Region, Coding Tree Unit (CTU), Coding Unit (CU), Subunit or Sample level.

14. The apparatus of claim 12, wherein the at least one chroma block comprises a first chroma block and a second chroma block, wherein the luma filter comprises a first luma filter and a second luma filter, and wherein determining the one or more cross-component prediction models based on the at least one of the filter parameters comprises:

determining a first subset of the one or more cross-component prediction models for the first chroma block based on at least one of the filter parameters of the first luma filter; and determining a second subset of the one or more cross-component prediction models for the second chroma block based on at least one of the filter parameters of the second luma filter.

15. The apparatus of claim 12, wherein the at least one of the filter parameters is determined based on a color format of the current picture.

16. The apparatus of claim 12, wherein determining the one or more cross-component prediction models based on the at least one of the filter parameters comprises:

selecting a plurality of sets of neighboring samples of the coding unit, wherein each set of the plurality of sets of neighboring samples is located on a top of the coding unit or a left of the coding unit and each set of the plurality of sets of neighboring samples comprises a neighboring chroma sample and at least one neighboring luma sample corresponding to the neighboring chroma sample, wherein the at least one neighboring luma sample is arranged in the current picture in accordance with the filter shape of the luma filter; and determining the one or more cross-component prediction models by performing a training process using the plurality of sets of neighboring samples as training data.

17. The apparatus of claim 16, wherein selecting the plurality of sets of neighboring samples of the coding unit comprises:

in response to determining that a sample value of a neighboring chroma sample or neighboring luma sample in a set of neighboring samples is unavailable, deriving the sample value of the neighboring chroma sample or neighboring luma sample from the sample value of at least one of available samples in the set of neighboring samples.

18. The apparatus of claim 16, wherein selecting the plurality of sets of neighboring samples of the coding unit comprises:

in response to determining that a sample value of a neighboring chroma sample or neighboring luma sample in a set of neighboring samples is unavailable, skipping using the set of neighboring samples to determine the one or more cross-component prediction models.

19. A non-transitory computer readable storage medium having stored therein a bitstream and instructions which when executed by a computing device having one or more processors, cause the one or more processors to perform operations to generate the bitstream, wherein the operations comprise:

obtaining a coding unit in a current picture, wherein the coding unit comprises a luma block and at least one chroma block; and in response to a determination that reconstructed luma samples in the luma block are not to be down-sampled:

determining one or more cross-component prediction models based on a luma filter, wherein the one or more cross-component prediction models comprise a convolutional cross-component model (CCCM);

obtaining, based on the luma filter, at least one reconstructed luma sample in the luma block that corresponds to a chroma sample in the at least one chroma block; and applying at least one of the one or more cross-component prediction models to the at least one reconstructed luma sample to predict the chroma sample.

20. A method for storing a bitstream, comprising:

generating a bitstream by performing a video coding operation including the method for video coding according to claim 1; and storing the bitstream.

* * * * *